(12) United States Patent
Ushirogouchi et al.

(10) Patent No.: US 7,387,380 B2
(45) Date of Patent: Jun. 17, 2008

(54) LIQUID INK AND RECORDING APPARATUS

(75) Inventors: Toru Ushirogouchi, Yokohama (JP);
Chiaki Tanuma, Yokohama (JP);
Kazuhiko Ohtsu, Mishima (JP); Ryozo Akiyama, Mishima (JP); Masashi Hiroki, Yokohama (JP); Yoshito Endo, Tagata (JP)

(73) Assignees: Toshiba Tec Kabushiki Kaisha (JP);
Kabushiki Kaisha Toshiba (JP)

( * ) Notice: Subject to any disclaimer, the term of this patent is extended or adjusted under 35 U.S.C. 154(b) by 0 days.

(21) Appl. No.: 11/502,874

(22) Filed: Aug. 11, 2006

(65) Prior Publication Data

US 2006/0274136 A1 Dec. 7, 2006

Related U.S. Application Data

(62) Division of application No. 11/095,710, filed on Mar. 31, 2005, now Pat. No. 7,108,367, which is a division of application No. 10/420,534, filed on Apr. 22, 2003, now Pat. No. 6,959,986.

(30) Foreign Application Priority Data

Apr. 24, 2002 (JP) ............................. 2002-122864
Jan. 10, 2003 (JP) ............................. 2003-004862

(51) Int. Cl.
*B41J 1/02* (2006.01)
(52) U.S. Cl. ..................... 347/102; 347/100; 347/101

(58) Field of Classification Search ................. 347/101, 347/102, 100, 95, 96; 106/31.6, 31.27, 31.13; 523/160
See application file for complete search history.

(56) References Cited

U.S. PATENT DOCUMENTS 2,506,486 A 5/1950 Bender et al.

(Continued)

FOREIGN PATENT DOCUMENTS

CN 1195356 10/1998

(Continued)

OTHER PUBLICATIONS

Communications from European Patent Office re: related applications.

(Continued)

*Primary Examiner*—Manish S Shah
(74) *Attorney, Agent, or Firm*—Harness, Dickey & Pierce, P.L.C.

(57) ABSTRACT

There is disclosed a liquid ink including a photo acid generating agent that generates an acid upon irradiation with light, a coloring component, and at least one kind of a solvent that is polymerized in the presence of an acid. It is preferable that the amount of the photo acid generating agent contained in the liquid ink falls within a range of between 1 part by weight and 10 parts by weight relative to 100 parts by weight of the solvent, the coloring component consists of a pigment, and the solvent contains at least 50 parts by weight of an acid polymerizable compound, the acid polymerizing compound polymerizing in the presence of the acid, having an alicyclic skeleton and/or an aliphatic skeleton having a viscosity of 50 mPa·s or less and a boiling point of 150° C. or more under room temperature and atmospheric pressure.

4 Claims, 5 Drawing Sheets

U.S. PATENT DOCUMENTS

| | | | |
|---|---|---|---|
| 3,150,166 A | 9/1964 | Pohlemann et al. | |
| 5,641,346 A | 6/1997 | Mantell et al. | |
| 5,691,101 A | 11/1997 | Ushirogouchi et al. | |
| 5,721,020 A | 2/1998 | Takami et al. | |
| 5,889,084 A | 3/1999 | Roth | |
| 6,054,501 A | 4/2000 | Taniguchi et al. | |
| 6,284,816 B1 | 9/2001 | Laksin et al. | |
| 6,306,555 B1 | 10/2001 | Schulz et al. | |
| 6,322,208 B1 | 11/2001 | Bugner et al. | |
| 2001/0038408 A1* | 11/2001 | Codos et al. | 347/102 |
| 2002/0024544 A1 | 2/2002 | Codos | |
| 2003/0043246 A1* | 3/2003 | Codos | 347/102 |
| 2003/0135059 A1 | 7/2003 | Matsumura et al. | |
| 2004/0166253 A1 | 8/2004 | Sasa | |
| 2005/0113483 A1 | 5/2005 | Takabayashi | |

FOREIGN PATENT DOCUMENTS

| | | |
|---|---|---|
| DE | 197 36 471 | 2/1999 |
| EP | 0 844 255 | 5/1998 |
| EP | 1 070 592 A1 | 1/2001 |
| EP | 1 083 055 A1 | 3/2001 |
| EP | 1 167 043 A1 | 1/2002 |
| EP | 1 188 806 A2 | 3/2002 |
| EP | 1 188 806 A3 | 6/2002 |
| EP | 1 243 629 | 9/2002 |
| JP | 2-47510 | 10/1990 |
| JP | 10-250052 | 9/1998 |
| JP | 2000-247026 | 9/2000 |
| JP | 2001-220526 | 8/2001 |
| JP | 2002 137375 | 5/2002 |
| JP | 2003-145745 | 5/2003 |
| JP | 2004-137302 | 5/2004 |
| WO | WO93/17867 | 9/1993 |
| WO | WO 02/18148 A1 | 3/2002 |
| WO | WO 02/078958 A1 | 10/2002 |

OTHER PUBLICATIONS

Database WPI, Section Ch, Week 200160, Derwent Publications Ltd., Lond, GB, Class A14, AN 2001-539146 XP002249320 and JP 2001 181385 A (Kansai Paint Co. Ltd.), Jul. 3, 2001 (abstract).
Fried, MJ et al, "Stabilisierung von Acrylmonomeren", Farbe+Lack, vol. 100, No. 8, Aug. 1994, pp. 604-609.
Partial European Search Report, EP Application No. 03009283.7.
Patent Abstracts of Japan for JP 08-143806.
Search Report from EPO re: counterpart application No. 03009283.7.
Communication from European Patent Office re: related application.
Communication from Chinese Patent Office re: related application (with English translation).
Communication from Chinese Patent Office re: related application (with English translation).
Communication (with translation) from Japanese Patent Office re: related application.

* cited by examiner

LIQUID INK AND RECORDING APPARATUS

CROSS-REFERENCE TO RELATED APPLICATIONS

This application is a divisional of U.S. Ser. No. 11/095,710 filed Mar. 31, 2005 now U.S. Pat. No. 7,108,367 which is a divisional of U.S. Ser. No. 10/420,534 filed Apr. 22, 2003, now U.S. Pat. No. 6,959,986 claiming priority to Japanese Patent Application No. 2002-122864 filed Apr. 24, 2002 and Japanese Patent Application No. 2003-004862 filed Jan. 10, 2003, all of which are incorporated herein by reference.

BACKGROUND OF THE INVENTION

1. Field of the Invention

The present invention relates to a liquid ink and an ink jet recording apparatus.

2. Description of the Related Art

A printing machine utilizing a printing plate has been used for the manufacture of a print requiring a reasonably large number of prints such as a local advertisement, materials for distribution within an enterprise, or a large poster. In recent years, an on-demand printing machine, which is capable of dealing with diversified needs and compressing the stock, has come to be used in place of such a conventional printing machine. An electrophotographic printing machine using a toner or a liquid toner or an ink jet printer capable of achieving a high quality printing with a high speed is expected to provide a satisfactory on-demand printing machine.

It is known to the art that a solvent system ink containing a pigment and an organic solvent or a solvent system liquid toner is used in the on-demand printing machine, as in the conventional printing machine using a printing plate. In this technique, however, an organic solvent is evaporated in an amount that cannot be neglected in the case of printing images on a reasonably large amount of paper sheets. As a result, the surrounding atmosphere is contaminated with the evaporated organic solvent, which makes it necessary to arrange an exhaust facility or a solvent recovery mechanism.

Incidentally, in the ink jet printer, the solvent system ink can be handled within a closed system until the ink is spurted onto the surface of the printing paper sheet. As a result, it is possible to suppress the contamination problem of the surrounding atmosphere to some extent by taking suitable exhaust measures. However, the ink used in the ink jet printer differs from that used in the printing machine utilizing a printing plate. To be more specific, it is necessary for the ink used in the ink jet printer to have a fluidity required for the spurting of the ink. Therefore, in the technique described above, it is necessary for the solvent concentration in the ink to be set at a sufficiently high level, with the result that it is essentially difficult for this technique to solve the contamination problem of the surrounding atmosphere caused by from the evaporated organic solvent.

It should also be noted that, in the case of using a solvent system ink, the printing surface of the printing paper sheet, etc., seriously effects the quality of the printed images. For example, the printing surface having a permeability tends to cause the printed images to be blurred, and it is difficult to fix the printed images to the printing surface that is not permeable. Further, a reasonably long time is required for the ink layer formed on the printing surface to be dried. Therefore, in the case of forming a thick image on a large printing surface, the image tends to be collapsed because of the fluidity of the ink. In addition, in the technique using a solvent described above, the printing surface tends to be deteriorated by the drying of the ink layer. It follows that it is not necessarily easy to obtain a high quality print by this technique.

A photosensitive ink and a printer system using the same have come to attract attention as a technique effective for overcoming the problems described above. In this technique, a photosensitive ink spurted onto the printing surface is irradiated with light for achieving a rapid photo-curing (=drying without emissions) of the ink. The photosensitive ink used in this technique typically contains a radical polymerizable monomer, a photopolymerization initiating agent, and a pigment.

According to the technique referred to above, it is possible to permit the ink layer to be rendered incapable of being fluidized by the irradiation with light so as to make it possible to obtain a print having a relatively high quality. However, the ink used in this technique contains a large amount of cancer-causing components such as a radical generating agent. In addition, the volatile acrylic acid derivative used as a radical polymerizable monomer is highly irritating to the skin and is highly odorous. Naturally, it is necessary to handle this ink carefully. Further, the radical polymerization is markedly inhibited by the presence of oxygen in the air. In addition, the pigment contained in the ink absorbs the light irradiating the ink layer, with the result that the dose of the light tends to be rendered insufficient in the deep portion of the ink layer. Under the circumstances, the conventional radical polymerizable ink is low in its sensitivity to light and, thus, a very large light exposure system is required for obtaining a high quality print by this technique.

A photo-cationic curable ink is being proposed as an ink that is less affected by the oxygen in the air. However, the conventional photosensitive ink of this type contains a solvent, which gives rise to the problem in terms of the release of the solvent into the environment. In addition, the ink tends to be easily cured spontaneously and change to be insoluble, giving rise to an additional problem that tends to plug ink-jet nozzle. Also another cationic polymerization type photosensitive composition for the coating of a CD-ROM has been reported, which is capable of being spurted in an ink jet system. The photosensitive composition that was actually found to be capable of being spurted by an ink jet system contained as main components vinyl ether and bisphenol A type epoxy resin that is considered to pose a problem in terms of, for example, a cancer generation. It follows that a serious problem remains unsolved in terms of the release of the photosensitive composition into the environment. Further proposed is an ink for ink jet consisting of cationic polymerization monomers having a specified component monomer ratio. The ink for ink jet also contains as an indispensable component a specified vinyl ether compound having a very high volatility, giving rise to a problem similar to that described above. Also, the ordinary vinyl ether compound, when used in combination with a pigment, gives rise to a problem that the compound is poor in polymerizability.

It is also known to the art to use a solid ink for ink jet in place of the liquid ink referred to above. In this technique, an ink that is a solid at room temperature is fluidized by heating, and the fluidized ink is spurted onto the printing surface of a printing paper sheet. In other words, this technique basically forms a non-solvent system and, thus, the environmental problem is suppressed. Also disclosed is an example in which a photosensitivity is imparted to the solid ink jet ink for fixing the ink layer formed after the spurting of the ink. However, a liquid plugging tends to take place easily in the case of using a pigment that is ordinarily dispersed as a coloring component. Also, it is difficult to uniformly disperse the pigment in the ink. Therefore, in this technique, there are the large problems in dispersing and in stabilizing pigments. Therefore, it is necessary to use a special high-cost micro capsule type pigment, or in usual case, coloring component is limited to a dye which tends to be de-colored with time.

On the other hand, in the ink jet system that is originally constructed such that ink droplets are spurted directly onto a paper sheet forming a printing medium so as to form an ink layer on the paper sheet, the printed image formed by the ink layer is generally blurred or the chromatic sensitivity of the printed image is changed by the printing medium. For overcoming these difficulties, proposed is an ink jet recording apparatus in which a photosensitive ink is once spurted onto a primary printing medium, followed by slightly curing the surface of the ink layer with light so as to cause the ink layer to lose fluidity and subsequently transferring the slightly cured ink layer onto a paper sheet or the like forming a secondary printing medium. In the printer and the ink used for this system, however, a subtle control of the light irradiation amount and the irradiating environment is required for obtaining a semi-set ink layer adapted for the transfer onto the secondary printing medium. In addition, the optimum light exposure amount differs depending on the color. It follows that the ink jet recording apparatus referred to above is not adapted essentially for the printing of a color image.

What should also be noted is that, particularly in the case where the printing surface is formed of an absorbent medium, a serious problem is generated that the conventional acrylic photo-curable ink jet ink is unlikely to be set inside the absorbing paper sheet.

Incidentally, the conventional cationic photo-curable ink jet ink gives rise to the problem that the viscosity of the ink is vigorously changed spontaneously. The problem is derived from the situation that, if an acid is once generated in the ink by the deterioration of the ink with time, the ink is unlikely to be deactivated so as to bring about much dark reactions in the ink. The problem is very serious because, if the viscosity is changed in the ink jet ink, a fatal situation such as a disturbance in the flying shape of the ink, a poor printing reproducibility and, in the worst case, a poor spurting of the ink and the ink plugging in nozzle tends to take place.

BRIEF SUMMARY OF THE INVENTION

An object of the present invention is to provide a liquid ink which does not necessitate the use of an organic solvent and which does not necessitate a bulky light exposure system for obtaining a high quality print.

Another object of the present invention is to provide an ink jet recording apparatus that permits obtaining a printed material by using a liquid ink.

According to a first aspect of the present invention, there is provided a liquid ink, comprising:

a photo acid generating agent that generates an acid upon irradiation with light;

a coloring component; and at least one kind of a solvent that is polymerized in the presence of an acid.

According to a second aspect of the present invention, there is provided a liquid ink, comprising:

a photo acid generating agent that generates an acid upon irradiation with light;

at least one kind of a powdery material selected from the group consisting of a conductive powder, an insulating powder, a magnetic powder, a dielectric powder, and an electromagnetic heat generating powder; and at least one kind of a solvent selected from the group consisting of an epoxy compound, a vinyl ether compound and an oxetane compound.

According to a third aspect of the present invention, there is provided an ink jet recording apparatus forming an ink image on a recording medium by using a liquid ink, the apparatus comprising:

transfer member transferring the recording medium;

an ink jet type recording head arranged above the transfer member, the ink jet type recording head spurting the liquid ink onto the recording medium to form an ink layer on the recording medium;

a light source irradiating the ink layer with light; and a heating member heating the ink layer.

Further, according to a fourth aspect of the present invention, there is provided an ink jet recording apparatus forming an ink image on a recording medium by using a liquid ink, the apparatus comprising:

transfer member transferring the recording medium;

an image carrier that is rotated in contact with the transfer member;

an ink jet type recording head spurting the liquid ink onto the image carrier so as to form an ink layer on the image carrier;

a light source irradiating the ink layer with light;

a heating member heating the ink layer; and a transfer mechanism transferring the ink layer after the heating from the image carrier onto the recording medium by utilizing pressure or both pressure and heat.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention, and together with the general description given above and the detailed description of the preferred embodiments given below, serve to explain the principles of the present invention.

DETAILED DESCRIPTION OF THE INVENTION

Figure 1:
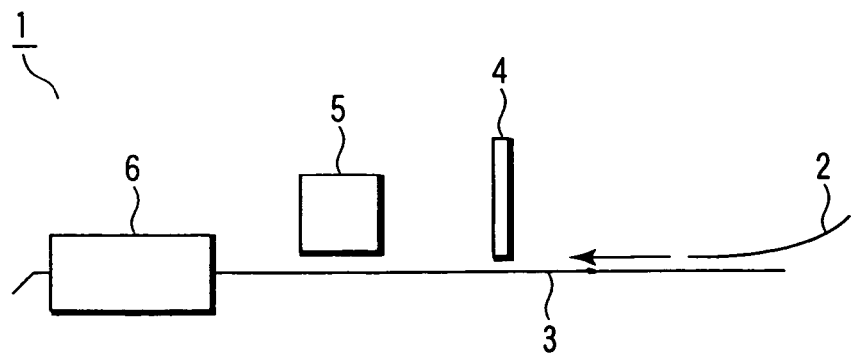
FIG. 1 schematically shows the construction of an ink jet recording apparatus according to one embodiment of the present invention.

Embodiments of the present invention will now be described with reference to the accompanying drawings. In the accompanying drawings, the constituting factors performing the same or similar functions are denoted by the same reference numerals so as to avoid an overlapping description.

The liquid ink according to a one embodiment of the present invention comprises a photo acid generating agent that generates an acid upon irradiation with light, a coloring component and at least one kind of solvent that is polymerized in the presence of an acid. In other words, the liquid ink according to one embodiment of the present invention represents a chemically amplified type photosensitive composition. Incidentally, the term "liquid ink" used herein represents an ink exhibiting a fluidity under room temperature. To be more specific, the liquid ink represents an ink having a viscosity of 50 cp or less, preferably 30 cp or less, at 25° C.

If the liquid ink of the present invention is irradiated with light, the photo acid generating agent generates an acid. The acid thus generated functions as a catalyst for the crosslinking reaction of the polymerizable compound. Also, the generated acid is diffused within the ink layer. In addition, the diffusion of the acid and the crosslinking reaction performed in the presence of the acid acting as a catalyst are promoted by the heating. Unlike the radical polymerization, the crosslinking reaction is not inhibited by the presence of oxygen. It follows that it is possible for a single photon to bring about a plurality of crosslinking reactions so as to realize a high sensitivity. In addition, it is possible to permit the crosslinking reaction to proceed rapidly even in the deep portion of the ink layer and inside the absorbing printing medium. As a result, the obtained ink layer is markedly superior in adhesivity, compared with the case of a radical polymerization.

Under the circumstances, in the case of using the liquid ink of one embodiment of the present invention, it is possible to permit the ink layer to be rendered incapable of being fluidized by the light irradiation and the heating applied to the ink layer formed by the spurting of the ink on the printing surface. In other words, it is possible to obtain a high quality printed material without requiring a bulky light exposure system. Incidentally, it is desirable for the ink layer incapable being fluidized to exhibit a thermo-plasticity, i.e., the re-flowability by heat, though the re-flowability can be maintained for a short time.

It should also be noted that, unlike the liquid ink utilizing a radical polymerization, the liquid ink of one embodiment of the present invention does not necessitate the use of a radical generating agent that may possibly generate cancer, or a radical polymerizable monomer that irritates the skin and is highly odorous. It follows that the liquid ink according to one embodiment of the present invention can be handled easily.

Further, in the liquid ink according to one embodiment of the present invention, the polymerizable compound referred to above is used as at least a part of the solvent. Typically, the substantially entire portion of the solvent is formed of the acid polymerizable compound, i.e., the compound that can be polymerized in the presence of an acid. Therefore, if the ratio of the polymerizable compound to the entire solvent is sufficiently high, the organic solvent is scarcely evaporated in the printing step. It follows that it is possible to prevent the problem in respect of the contamination of the surrounding atmosphere, which is derived from the evaporation of the organic solvent, so as to make it unnecessary to arrange an exhaust facility or a solvent recovery mechanism.

What should also be noted is that, in one embodiment of the present invention, it is unnecessary to use an organic solvent, and the ink layer can be promptly rendered incapable of being fluidized. It follows that the image can be fixed easily to printing surfaces of a wide range of properties, while preventing blurred images. In addition, the printing surface is unlikely to be deteriorated by the drying of the ink layer. What should also be noted is that a pigment used as a coloring component is contained in a high concentration in the liquid ink according to one embodiment of the present invention so as to make it possible to obtain a printed pattern that is clear and excellent in weatherability.

Each component of the liquid ink according to one embodiment of the present invention will now be described.

As described above, the liquid ink according to one embodiment of the present invention comprises a photo acid generating agent that generates an acid upon irradiation with light. The photo acid generating agent includes, for example, an onium salt, a diazonium salt, a quinone diazide compound, an organic halogen compound, an aromatic sulfonate compound, a bisulfone compound, a sulfonyl compound, a sulfonate compound, a sulfonium compound, a sulfamide compound, an iodonium compound, a sulfonyl diazo methane compound, and a mixture thereof.

Specific examples of the compounds referred to above include, for example, triphenyl sulfonium triflate, diphenyl iodonium triflate, 2,3,4,4-tetrahydro benzophenone-4-naphthoquinone diazide sulfonate, 4-N-phenyl amino-2-methoxy phenyl diazonium sulfonate, 4-N-phenyl amino-2-methoxy phenyl diazonium p-ethyl phenyl sulfate, 4-N-phenyl amino-2-methoxy phenyl diazonium-2-naphtyl sulfate, 4-N-phenyl amino-2-methoxy phenyl diazonium phenyl sulfate, 2,5-diethyoxy-4-N-4'-methoxy phenyl carbonyl phenyl diazonium-3-carboxy-4-hydroxy phenyl sulfonate, 2-methoxy-4-N-phenyl phenyl diazonium-3-carboxy-4-hydroxy phenyl sulfate, diphenyl sulfonyl methane, diphenyl sulfonyl diazo methane, diphenyl disulfone, α-methyl benzoin tosylate, pyrogallol trimesylate, benzoin tosylate, MPI-103 (CAS. NO. (87709-41-9) manufactured by Midori Kagaku Inc., BDS-105 (CAS. NO. (145612-66-4) manufactured by Midori Kagaku Inc., NDS-103 (CAS. NO. (110098-97-0) manufactured by Midori Kagaku Inc., MDS-203 (CAS. NO. (127855-15-5) manufactured by Midori Kagaku Inc., Pyrogallol tritosylate (CAS. NO. (20032-64-8) manufactured by Midori Kagaku Inc., DTS-102 (CAS. NO. (75482-18-7) manufactured by Midori Kagaku Inc., DTS-103 (CAS. NO. (71449-78-0) manufactured by Midori Kagaku Inc., MDS-103 (CAS. NO. (127279-74-7) manufactured by Midori Kagaku Inc., MDS-105 (CAS. NO. (116808-67-4) manufactured by Midori Kagaku Inc., MDS-205 (CAS. NO. (81416-37-7) manufactured by Midori Kagaku Inc., MBS-105 (CAS. NO. (149934-68-9) manufactured by Midori Kagaku Inc., TMS-105 (CAS. NO. (127820-38-6) manufactured by Midori Kagaku Inc., NB-101 (CAS. NO. (20444-09-1) manufactured by Midori Kagaku Inc., NB-201 (CAS. NO. (4450-68-4) manufactured by Midori Kagaku Inc., DNB-101 (CAS. NO. (114719-51-6) manufactured by Midori Kagaku Inc., DNB-102 (CAS. NO. ('509-55-2) manufactured by Midori Kagaku Inc., DNB-103 (CAS. NO. (132898-35-2) manufactured by Midori Kagaku Inc., DNB-104 (CAS. NO. (132898-36-3) manufactured by Midori Kagaku Inc., DNB-105 (CAS. NO. (132898-37-4) manufactured by Midori Kagaku Inc., DAM-101 (CAS. NO. (1886-74-4) manufactured by Midori Kagaku Inc., DAM-102 (CAS. NO. (28343-24-0) manufactured by Midori Kagaku Inc., DAM-103 (CAS. NO. (14159-45-6) manufactured by Midori Kagaku Inc., DAM-104 (CAS. NO. (130290-80-1) and CAS. No. (130290-82-3) manufactured by Midori Kagaku Inc., DAM-201 (CAS. NO. (28322-50-1) manufactured by Midori Kagaku Inc., CMS-105 manufactured by Midori Kagaku Inc., DAM-301 (CAS. NO. (138529-81-4) manufactured by Midori Kagaku Inc., SI-105 (CAS. NO. (34694-40-7) manufactured by Midori Kagaku Inc., NDI-105 (CAS. NO. (133710-62-0) manufactured by Midori Kagaku Inc., EPI-105 (CAS. NO. (135133-12-9) manufactured by Midori Kagaku Inc., and UVACURE 1591 manufactured by Dicel UCB Inc.

It is also possible to use the compounds given below as the photo acid generating agent:

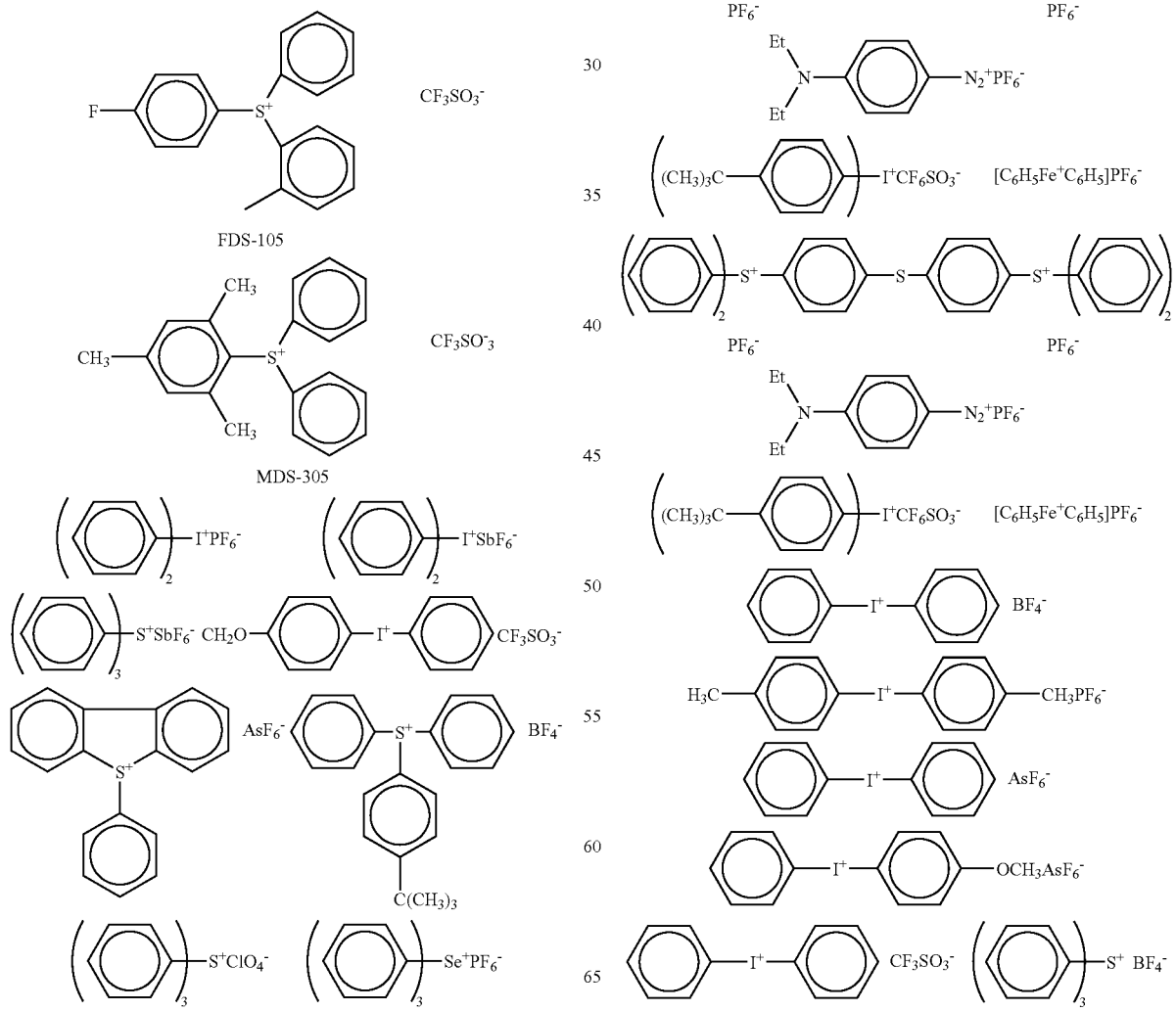

-continued
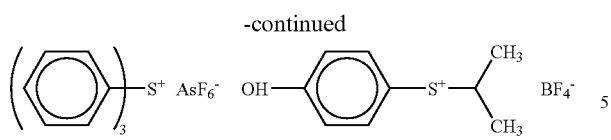
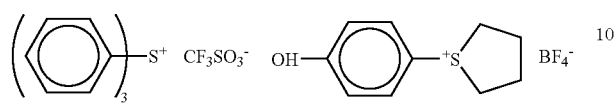
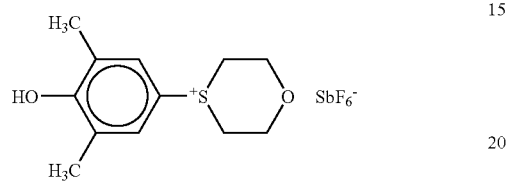
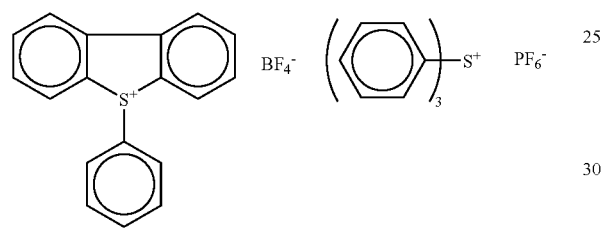
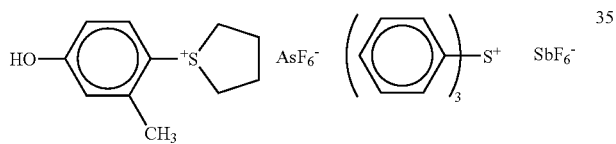
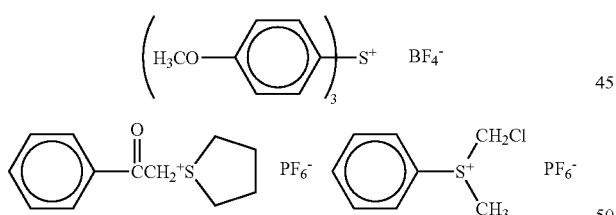
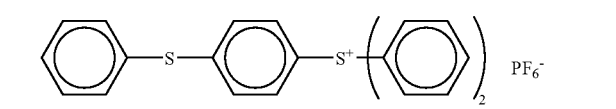
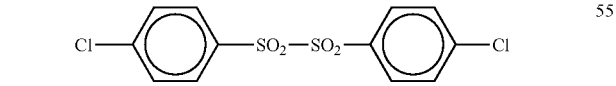
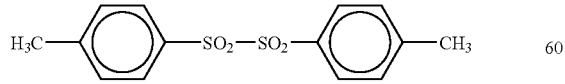
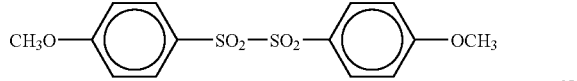
-continued
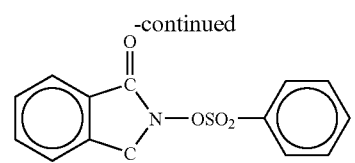
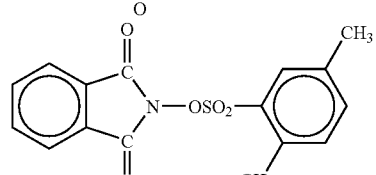
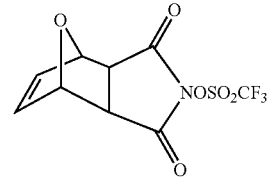
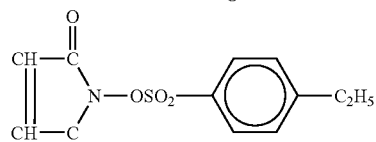
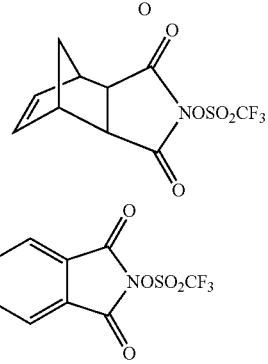
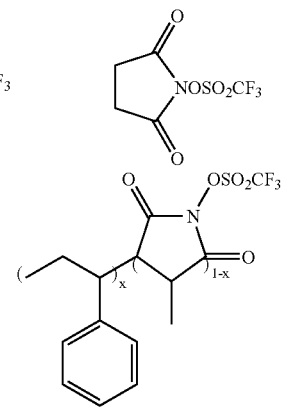
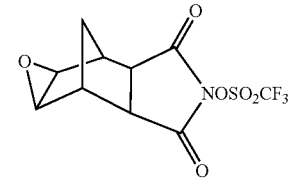
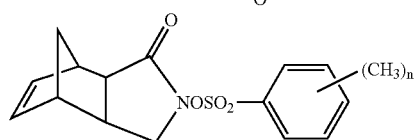
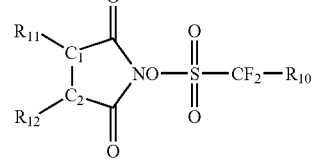

In the general formulas given above, each of $C_1$ and $C_2$ denotes a carbon atom forming a single bond or a double bond, $R_{10}$ denotes a hydrogen atom, a fluorine atom, an alkyl group or an aryl group, and each of $R_{11}$ and $R_{12}$ denotes a monovalent organic group. It is possible for $R_{11}$ and $R_{12}$ to be coupled with each other so as to form a ring structure.

It is also possible to use the compounds given below as the photo acid generating agent:

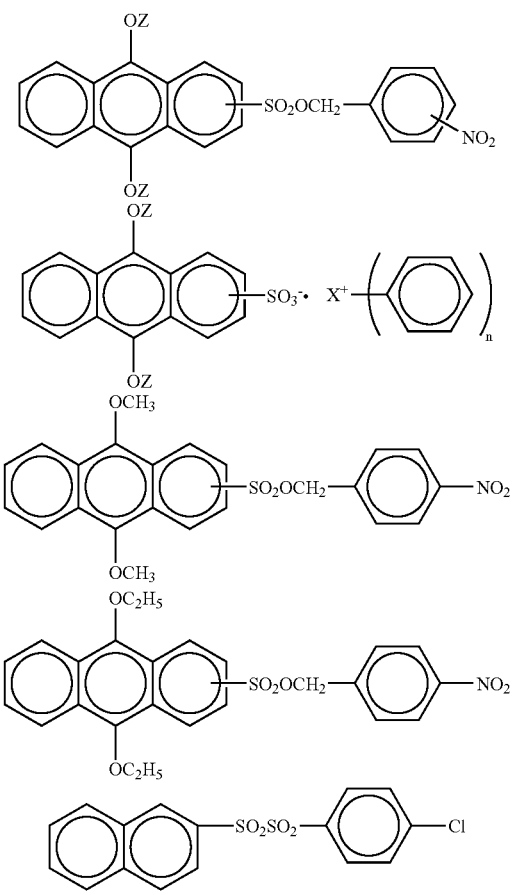

In the general formulas given above, Z denotes an alkyl group.

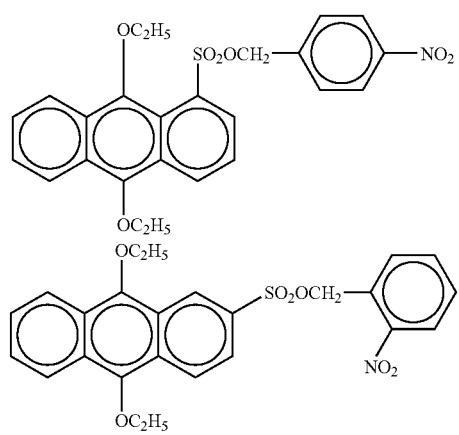

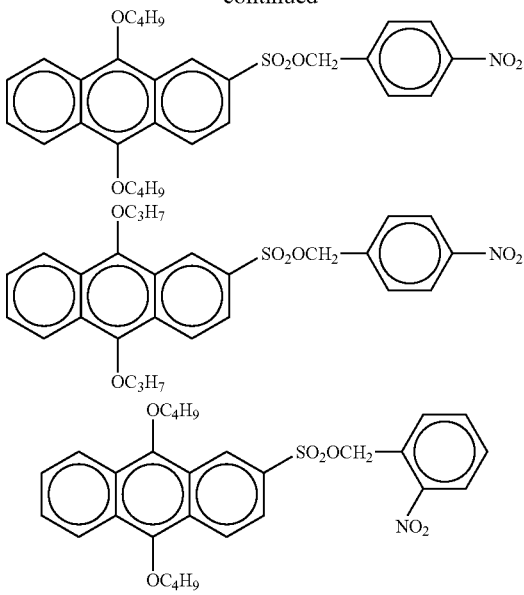

In particular, it is desirable to use an onium salt as the photo acid generating agent. The onium salts include, for example, a diazonium salt, a phosphonium salt and a sulfonium salt in which a fluoroboric acid anion, hexafluoro antimonic acid anion, hexafluoro arsenic acid anion, trifluoromethane sulfonate anion, para-toluene sulfonate anion, or para-nitro toluene sulfonate anion forms an anion of the paired ions. Particularly, it is desirable for the photo acid generating agent to contain the onium salt or the halogenated triazine compound represented by general formulas (4) and (5) given below:

$$R6-Cl^+-R7 \quad nA4^- \qquad (4)$$
$$|$$
$$R8$$

$$R9-C2^+-R10 \quad mA5^- \qquad (5)$$

In the general formulas given above, each of R6 to R10 denotes any one of an aromatic group and a functional group having a chalcogenide atom and an aromatic group, each of C1 and C2 denotes a chalcogenide atom, each of A4 and A5 denotes an anion species selected from the group consisting of $PF_6^-$, $SbF_6^-$, $BF_4^-$, $AsF_6^-$, $CF_3SO_3^-$, $C_4F_9SO_3^-$, and $CH_3SO_3^-$, and each of m and n denotes an integer. Incidentally, the term "chalcogenide atom" noted above represents a chalcogen atom and an atom having an electropositiveness higher than the chalcogen atom. Also, the term "chalcogen atom" denotes a sulfur atom, a selenium atom, a tellurium atom, a polonium atom or an iodine atoms.

The onium salt represented by general formula (4) or (5) given above exhibits a high curing reactivity and is excellent in stability under room temperature. As a result, it is possible for the onium salt referred to above to suppress the curing of the liquid ink of the one embodiment of the present invention that is not irradiated with light.

Where the compound represented by general formula (4) or (5) given above is used as a photo acid generating agent, it is desirable for a sulfur atom or an iodine atom to constitute the chalcogenide atom in terms of thermal stability and the stability relative to water. Also, in this case, it is desirable for the anion species to be a non-organic acid, particularly, to be PF$_6^-$ in view of the acidity and the thermal stability. Where the photosensitive performance is also taken into account, it is particularly desirable to use a hexafluoro phosphate compound having a phenyl sulfonium skeleton as the anion species.

It is possible for the photo acid generating agent to further contain a sensitizing coloring matter in some cases. The sensitizing coloring matters include, for example, an acridine compound, a benzofurabin compound, perylene, anthracene and a laser coloring matters.

Where quinone diazide compound is used as the photo acid generating agent, it is possible to use salts such as naphthoquinone diazide sulfonyl chloride and naphthoquinone diazide sulfonic acid.

The organic halogen compounds exemplified as compounds which can be used as the photo acid generating agent represent a compound forming a halogenated hydrogen acid. These organic halogen compounds are described in, for example, U.S. Pat. Nos. 3,515,552, 3,536,489, 3,779,778 and West German Laid-open Patent Publication No. 2,243,621. To be more specific, the organic halogen compounds which can be used as the photo acid generating agent include, for example, carbon tetra bromide, tetra(bromomethyl)methane, tetrabromo ethylene, 1,2,3,4-tetrabromo butane, trichloroethoxy ethanol, p-iodo phenol, p-bromo phenol, p-iodo biphenyl, 2,6-dibromo phenol, 1-bromo-2-naphthol, p-bromo aniline, hexachloro-p-xylene, trichloro acetanilide, p-bromo dimethyl aniline, tetrachloro hydronaphthalene, α,α'-dibromo xylene, α,α,α',α-tetrabromo xylene, hexabromo ethane, 1-chloro anthraquinone, ω,ω,ω-tribromo quinaldine, hexabromo cyclohexane, 9-bromo fluorene, bis(pentachloro) cyclopenta diphenyl, polyvinylidene chloride and 2,4,6-trichloro phenoxy ethyl vinyl ether, which are disclosed in U.S. Pat. No. 3,515,552, hexabromo ethane, α,α,α-trichloro acetophenone, tribromo trichloro ethane, and halomethyl-5-triazines, which are disclosed in U.S. Pat. No. 3,779,778. In particular, haromethyl-S-triazines such as 2,4-bis(trichloro methyl)-6-S-triazines and 2,4,6-tris(trichloro methyl)-6-S-triazines is preferable. Further, the organic halogen compound that can be used desirably includes a compound in which a vinyl halomethyl-5-triazine is substituted, which is disclosed in U.S. Pat. No. 3,987,037. The vinyl halomethyl-S-triazine compound, which is a photolytically degradable S-triazine compound having an atomic group in which at least one trihalomethyl group and at least one ethylenically unsaturated bond are conjugated to form a triazine ring, is represented by general formula (A) given below:

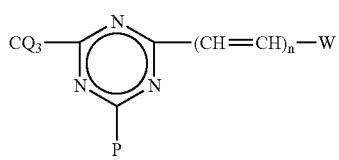

(A)

In general formula (A) given above, Q denotes a bromine atom or a chlorine atom, P represents a —CQ$_3$, an —NH$_2$, an —NHR, an —NR$_2$ or an —OR, R denotes a phenyl group or a lower alkyl group having 6 or less carbon atoms, n denotes an integer of 1 to 3, and W denotes an aromatic ring, a heterocyclic ring or an atomic group represented by general formula (B) given below:

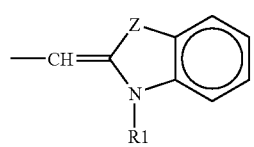

(B)

In general formula (B) given above, Z denotes an oxygen atom or a sulfur atom, and R1 denotes a lower alkyl group or a phenyl group.

It is possible for a substituting group to be substituted in the aromatic ring or the heterocyclic ring denoted by W in general formula (A) given above. The substituting group noted above includes, for example, a chlorine atom, a bromine atom, a phenyl group, a lower alkyl group having 6 or less carbon atoms, a nitro group, a phenoxy group, an alkoxy group, an acetoxy group, an acetyl group, an amino group and an alkyl amino group. Also, the specific examples of the vinyl halomethyl-S-triazine compound represented by general formula (A) given above include the compounds given below:

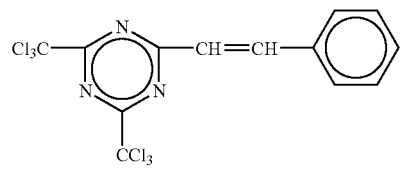

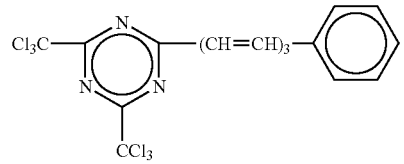

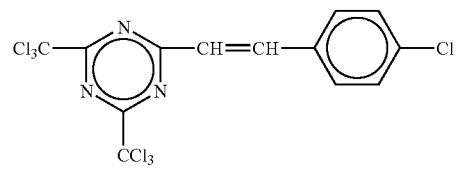

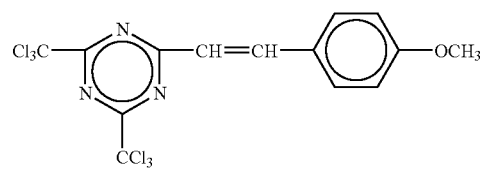

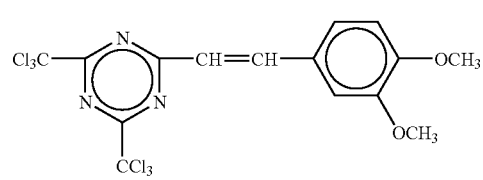

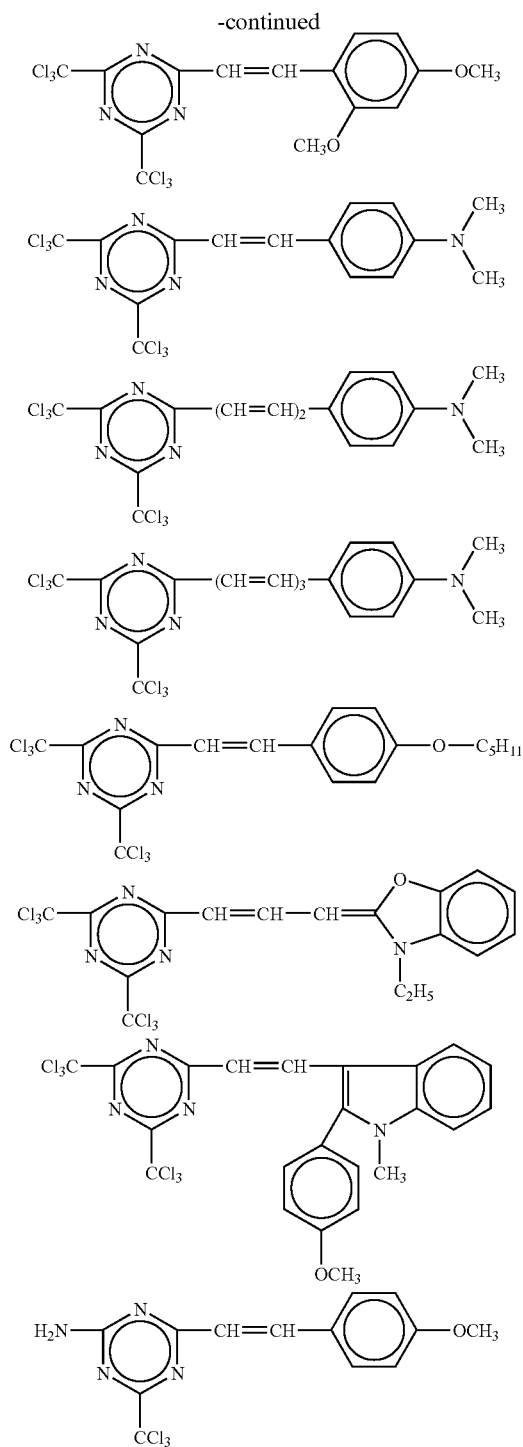

It is also possible to suitably use a compound having a triazine ring in which trihalomethane is introduced into the skeleton as a photo acid generating agent. Where the triazine ring has at least four conjugated double bonds, the wavelength of the light to which the compound is made sensitive is rendered longer. It follows that, in the case of using an ordinary high pressure mercury lamp or the like as a light source, it is desirable to use such a compound. Incidentally, the compound referred to above includes, for example, triazine and a condensed triazine compound.

It is also possible to suitably use an acid ester having a photodissociation capability as a photo acid generating agent. The particular acid ester includes, for example, an o-nitrobenzyl ester of aluminum silanol.

It is possible to determine the content of the photo acid generating agent in the liquid ink in accordance with, for example, the acid generating effect produced by the photo acid generating agent used and the amount of the coloring component added to the liquid ink. For example, where the pigment concentration is about 5% by weight, the photo acid generating agent is added generally in an amount of 1 to 10 parts by weight, preferably in an amount of 2 to 8 parts by weight, and more preferably in an mount of 2 to 6 parts by weight relative to 100 parts by weight of the solvent that is polymerized in the presence of the acid contained in the liquid ink. The amount of the photo acid generating agent falling within the range given above is desirable in terms of the storage stability of the ink and the capability of suppressing the corrosion of the pipe and the head member. If the amount of the photo acid generating agent is smaller than 1 part by weight relative to 100 parts by weight of the solvent, the sensitivity of the liquid ink is lowered. On the other hand, if the amount of the photo acid generating agent is larger than 10 parts by weight relative to 100 parts by weight of the solvent, the increase with time in the viscosity of the ink is rendered prominent, which lowers the film forming capability and the hardness of the ink film after the photo-curing process. Also, it is possible for the pipe and the head member of the recording apparatus to be corroded.

It is possible for the liquid ink of the present invention to contain a pigment and/or dye as a coloring component. It should be noted, however, that, in one embodiment of the present invention in which an acid is used in the photopolymerization mechanism, a pigment is preferred to a dye that is faded by the acid.

The pigment that can be utilized as a coloring component is not particularly limited, which makes it possible to use an optional pigment, as long as the pigment exhibits the required optical color developing and coloring functions. It is possible for the pigment used in the present invention to exhibit other properties, such as magnetic properties, fluorescent properties, electrical conductivity and dielectric properties, in addition to the color developing and coloring properties. In this case, it is possible to impart various functions to the printed image. It is also possible to add a powdery material that permits improving the heat resistance and the physical properties to the liquid ink of one embodiment of the present invention.

The pigment that can be used includes, for example, a light absorbing pigment. The light absorbing pigment includes, for example, a carbon-based pigment such as carbon black, carbon refined or a carbon nano tube; a metal oxide pigment such as iron black, cobalt blue, zinc oxide, titanium oxide, chromium oxide, or iron oxide; a sulfide pigment such as zinc sulfide; a phthalocyanine-based pigment; a pigment made of a metallic salt such as a sulfate, a carbonate, a silicate or a phosphate of a metal; and a pigment consisting of a metal powder, such as an aluminum powder, a bronze powder or a zinc powder.

It is also possible to use an organic pigment such as a nitroso pigment including a dye chelate, a nitro pigment, aniline black, and naphthol green B; an azo pigment (which includes an azo lake, an insoluble azo pigment, a condensed azo pigment and a chelate azo pigment) such as bordeaux 10B, lake red 4R or chromophthal red; a lake pigment such as peacock blue lake or rhodamine lake; a phthalocyanine pigment such as phthalocyanine blue; a polycyclic pigment such as perylene pigment, perinone pigment, anthraquinone pigment, quinacridone pigment, dioxane pigment, thio indigo pigment, isoindrinone pigment, or quinofranone pigment; a durene pigment such as thio indigo red or indatron blue; a quinacridone pigment; a quinacridine pigment; and isoindrinone pigment.

The pigment that can be used in a black ink includes, for example, Raven 5750, Raven 5250, Raven 5000, Raven 3500, Raven 1255, and Raven 7000, which are manufactured by Colombia Inc.; Regal 400R, Regal 330R, Regal 660R, Mogul L, Monarch 700, Monarch 800, Monarch 880, Monarch 900, Monarch 1000, Monarch 1100, Monarch 1300 and Monarch 1400, which are manufactured by Cabot Inc.; No. 2300, No. 900, MCF 88, No. 33, No. 40, No. 45, No. 52, MA 7, MA 8, MA 100 and No. 2200B, which are manufactured by Mitsubishi Kagaku K.K.; and a carbon black manufactured by Degussa Inc. such as Color Black FW 1, Color Black FW 2, Color Black FW 2V, Color Black FW 18, Color Black FW 200, Color Black S150, Color Black S160, Color Black S170, Printex 35, Printex U, Printex V, Printex 140U, Special Black 6, Special Black 5, Special Black 4A and Special Black 4.

The pigment that can be used in a yellow ink includes, for example, Yellow 128, C.I. Pigment Yellow 129, C.I. Pigment Yellow 129, C.I. Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, and Pigment Yellow 180. Among these yellow pigments, it is desirable to use Pigment Yellow 180 that is low in the color deterioration relative to an acid.

The pigment that can be used in a magenta ink includes, for example, C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48(Ca), C.I. Pigment. Red 48(Mn), C.I. Pigment Red 57(Ca), C.I. Pigment Red 57:1, and C.I. Pigment Red 112.

Further, the pigment that can be used in a cyan ink includes, for example, C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Pigment Blue 4, C.I. Vat Blue 4 and C.I. Vat Blue 60.

The white pigment including the natural clay, carbonated metals such as lead white, hydrozincite, and magnesium carbonate, and metal oxides such as oxides of barium and titanium are also useful as the coloring component. The liquid ink containing a white pigment can be used for not only the white printing but also for the correction of the printing and for the correction of the ground by the overwriting.

An inorganic fluorescent substance or an organic fluorescent substance phosphor can be used as a pigment exhibiting fluorescent properties. The material of the inorganic fluorescent substance includes, for example, salts of inorganic acids such as $MgWO_4$, $CaWO_4$, $(Ca, Zn)(PO_4)_2$, $Ti^+$, $Ba_2P_2O_7$:Ti, $BaSi_2O_5$:$Pb^{2+}$, $Sr_2P_2O_7$:$Sn^{2+}$, $SrFB_2O_{3.5}$:$Eu^{2+}$, $MgAl_{16}O_{27}$:$Eu^{2+}$, a tungstate, and a sulfate. On the other hand, the material of the organic fluorescent substance includes, for example, cyanine series pigments such as acridine orange, amino acridine, quinacrine, an anilino naphthalene sulfonic acid derivative, anthroyloxy stearic acid, ohramine O, chlorotetra cycline, melocyanine, and 1,1'-dihexyl-2,2'-oxacarbo cyanine; dansyl chloride derivatives such as dansyl sulfonamide, dansyl choline, dansyl galacside, dansyl tolidine, and dansyl chloride; as well as diphenyl hexatriene, eosine, ϵ-adenosine, ethidium bromide, fluorescein, formisine, 4-benzoylamide-4'-aminostilbene-2,2'-sulfonic acid, β-naphthyl triphosphoric acid, an oxonol coloring matter, a parinarine derivative, perylene, N-phenyl naphthyl amine, pyrene, safranine O, fluorescamine, fluorescein isocyanate, 7-chloro nitrobenzo-2-oxa-1,3-diazole, dansyl aziridine, 5-(iodo acetamide ethyl)amino naphthalene-1-sulfonic acid, 5-idodo acetamide fluorescein, N-(1-anilino naphthyl 4) maleimide, N-(7-dimethyl-4-methyl cumanyl)maleimide, N-(3-pyrene)mareimide, eosine-5-iodo acetamide, fluorescein mercury acetate, 2-(4'-(2"-iodo acetamide) aminonaphthalene-6-sulfonic acid, eosine, a rhodamine derivative, an organic EL coloring matter, an organic EL polymer or an organic EL crystal, and dendrimer.

The powdery material used for improving the heat resistance and the physical strength of the ink layer includes, for example, an oxide or nitride of aluminum and silicon, a filler and silicon carbide. Also, it is possible to add a powdery material such as a conductive carbon pigment, a carbon fiber, copper, silver, antimony and noble metals in order to impart an electrical conductivity to the ink layer. Iron oxide and a ferromagnetic powder are adapted for imparting magnetic properties to the ink layer. It is also possible to mix a metal oxide powder having a high dielectric constant, such as a tantalum oxide powder or a titanium oxide powder.

It is also possible to add a dye as an auxiliary component of the pigment to the liquid ink according to one embodiment of the present invention. For example, generally a dye low in acidity and basicity and high in solubility can be added to a solvent such as azoic dye, a sulfide (construction material) dye, a dispersion dye, a fluorescent brightening agent, and an oil-soluble dye. Particularly, oil-soluble dyes such as an azo type, triaryl methane type, anthraquinone type and azine type can be suitably used as an auxiliary component of the pigment. Specific materials as an auxiliary component of the pigment include, for example, C.I. Slovent Yellow-2, 6, 14, 15, 16, 19, 21, 33, 56, 61, 80, etc., Diaresin Yellow-A, F, GRN, GG, etc., C.I. Slovent Violet-8, 13, 14, 21, 27, etc., C.I. Disperse Violet-1, Sumiplast Violet RR, C.I. Solvent Blue-2, 11, 12, 25, 35, etc., Diresin Blue-J, A, K, N, etc., Orient Oil Blue-IIN, #603, etc. and Sumiplast Blue BG.

The pigments and the dyes enumerated above can be used singly or in combination in the form of a mixture. It is also possible to add both the pigment and the dye described above in order to improve the light absorbing properties, the chroma, the color sensation, etc. Further, it is possible to apply a coupling treatment with a high molecular weight binder and an encapsulating treatment to prepare microcapsules in order to improve the dispersion capability of the pigment.

It is desirable for the coloring component to be mixed in an amount of 1 to 25 parts by weight. Where the mixing amount of the coloring component is smaller than 1 part by weight, it is difficult to ensure a sufficient color concentration. On the other hand, if the mixing amount of the coloring component exceeds 25 parts by weight, the ink spurting properties are lowered. It is more desirable for the mixing amount of the coloring component to fall within a range of between 2 and 8 parts by weight.

It is desirable for the mixing amount of the powdery component to fall within a range of between 1 and 50% by weight. If the mixing amount of the powdery component is smaller than 1% by weight, the effect of powder, for example, conductivity of the print is insufficient. On the other hand, if the mixing amount of the powdery material exceeds 50% by weight, the resolution and the sensitivity are lowered.

It is desirable for the coloring component and the powdery material to have an average particle diameter as small as possible. The particle diameter of the coloring component and the powdery material is generally not larger than ⅓, and preferably about ⅒, of the diameter of the nozzle port for spurting the liquid ink. Incidentally, the diameter of the nozzle port noted above is generally 10 μm or less, and preferably 5 μm or less. The particle diameter adapted for the printing ink jet ink is 0.35 μm or less, and in general each of the coloring component and the powdery material has an average particle diameter falling within a range of between 0.1 and 0.3 μm.

It is possible for the solvent that is polymerized in the presence of an acid to consist essentially of the polymerizable compounds having the characteristics described above. The expression "the solvent consisting essentially of polymerizable compounds" covers solvents consisting of polymerizable compounds alone and solvents consisting of polymerizable compounds and traces of unavoidable impurities. It is possible for the traces of unavoidable impurities to be present in the entire solvent in the highest concentration not higher than 10% by weight. In general, the traces of unavoidable impurities are present in the solvent in an amount not larger than 5% by weight. If the unavoidable impurities are present in an amount larger than that referred to above, the residual solvent may disperse in the air, which raises problems of safety, or remains inside the photo-cured material, which lowers the curing performance.

It is desirable for the polymerizable compound that is crosslinked in the presence of an acid to have a viscosity not higher than about 100 cp (=mPa·s) under temperatures not higher than 50° C. The polymerizable compounds meeting the particular requirement include, for example, a compound having a molecular weight not higher than 1,000 and having a cyclic ether group such as an epoxy group, an oxetane group or an oxirane group, an acrylic or vinyl compound having the substituent noted above on the side chain, a carbonate series compound, a melamine compound having a low molecular weight, vinyl ethers, vinyl carbazoles, styrene derivatives, alpha-methyl styrene derivatives, vinyl alcohol esters such as an ester compound between vinyl alcohol and acrylic acid or methacrylic acid, and monomers having a vinyl bond capable of cationic polymerization. These polymerizable compounds can be used in combination.

Where the polymerizable compound that can be crosslinked in the presence of an acid has an aliphatic skeleton or an alicyclic skeleton, it is effective to add the other components described above in addition to the polymerizable compounds described above. Specifically, it is possible in this case to improve the transparency of the liquid ink in the light exposure step so as to impart a suitable thermoplasticity and re-solubility to the ink layer after the photo-curing. It follows that it is possible to improve the sensitivity, the fixing properties, the transfer properties, and the maintenance properties. Particularly, where the polymerizable compound consists of an epoxy compound having an alicyclic skeleton, it is possible to satisfy to some extent the requirements for both the high boiling point and the low viscosity simultaneously, in addition to the reactivity.

Further, it is possible for the solvent to contain a compound having a high viscosity, which is in the form of a solid under room temperature, if the addition amount of the compound is small and if the compound has a relatively high molecular weight. Where the solvent contains the particular compound, it is possible to improve the flexibility of the ink layer after the photo-curing step and to improve the dispersion capability of the pigment in the ink layer. Further, in the case of using a compound having a larger valence and a high reactivity, it is possible to improve the hardness and the solvent resistance of the ink layer after the photo-curing step. The particular compounds include, for example, a compound having a molecular weight not higher than 5,000 and having a cyclic ether group such as an epoxy group, an oxetane group or an oxirane group, which are coupled by a long chain alkylene group, an acrylic or vinyl compound having the substituent noted above on the side chain, a carbonate series compound, a melamine compound having a low molecular weight, vinyl ethers, vinyl carbazoles, styrene derivatives, alpha-methyl styrene derivatives, vinyl alcohol esters such as an ester compound between vinyl alcohol and acrylic acid or methacrylic acid, monomers having a vinyl bond capable of cationic polymerization, and oligomers formed by polymerization of at least one of these monomers.

Also, it is possible for the solvent to contain further a homopolymer or copolymer of vinyl alcohol, a resin having a molecular weight not higher than 50,000, said resin having an acid reactive-dehydration condensation reactive OH group, COOH group, acetal group etc., like casein and cellulose, a polycarbonate resin having a molecular weight not higher than 50,000, a polyamic acid, a polyamino acid or a copolymer between acrylic acid and a vinyl compound having an acid polymerizable double bond, i.e., a double bond that permits polymerization in the presence of an acid, on the side chain, a copolymer between vinyl alcohol and a vinyl compound having an acid polymerizable double bond on the side chain, and a methylolated melamine compound in addition to the compounds described above.

Particularly, in the case where the mixing amount of the photo acid generating agent is 1 part by weight or more and 10 parts by weight or less relative to 100 parts by weight of the solvent that is polymerized in the presence of the acids contained in the liquid ink and where a pigment is used as the coloring component, it is desirable for the solvent to contain at least 50 parts by weight of an acid polymerizable compound having an aliphatic skeleton and/or an alicyclic skeleton, said acid polymerizable compound having a viscosity not higher than 50 mPa·s under room temperature and atmospheric pressure, and a boiling point not lower than 150° C.

It is possible to improve the transparency of the liquid ink in the light exposure step by using an acid polymerizable compound having an aliphatic skeleton and/or an alicyclic skeleton. As a result, it is possible to impart suitable thermoplastic properties and re-solubility to the ink layer after the photo-curing, thereby improving the sensitivity, the fixing properties, the transfer properties and the maintenance characteristics. Particularly, in the case of using an epoxy compound having an alicyclic skeleton, it is possible to satisfy to some extent the requirements for both the high boiling point and the low viscosity simultaneously, in addition to the reactivity.

It should be noted that it is possible to impart a sufficient fluidity to the liquid ink by setting the viscosity of the acid polymerizable compound at a level not higher than 50 mPa·s under room temperature and atmospheric pressure. On the other hand, it is possible to markedly lower the amount of the volatile components contained in the liquid ink by setting the boiling point of the acid polymerizable compound at a level not lower than 150° C.

Where an epoxy compound constitutes the acid polymerizable compound, the epoxy compound includes, for example, a compound having a hydrocarbon group including a divalent aliphatic skeleton or alicyclic skeleton having about 1 to 15 carbon atoms or a compound having an epoxy group or an alicyclic epoxy group in one or both divalent groups having an aliphatic chain or an alicyclic skeleton in a part.

It is possible for the epoxy compound satisfying the conditions given above to exhibit its effect as far as the epoxy compound is contained in the solvent in an amount of at least 50 parts by weight. Incidentally, where the solvent consists of the epoxy compound alone, it is desirable for the amount of the solvent, i.e., the epoxy compound, to be not smaller than 30% by weight, preferably not smaller than 40% by weight, based on the entire liquid ink. Where the amount of the solvent is smaller than 30% by weight, the nozzle tends to be plugged and the thermoplasticity tends to be lowered.

The number of epoxy groups introduced into the molecular skeleton is not particularly limited. However, it is desirable for about at most 2 to 3 epoxy groups to be introduced into the molecular skeleton in order to impart a flexibility and a re-solubility to the ink layer after the photo-curing step. The particular epoxy compound includes, for example, the compounds represented by general formula (1) or (2) given below:

$$R1\text{-}A1\text{-}R2 \tag{1}$$

$$R3\text{-}A2 \tag{2}$$

where each of R1 to R3 denotes an epoxy group or an epoxy group having an alicyclic skeleton, and each of A1 and A2 denotes a functional group.

The compound represented by general formula (1) or (2) given above has in general a viscosity of about 1 mPa·s to 30 mPa·s. Therefore, these compounds are effective for sufficiently lowering the viscosity of the liquid ink. The epoxy compound having a low viscosity, if contained in an amount of at least 50 parts by weight based on the total amount of the solvent, permits producing its effect. It should be noted, however, that, if the epoxy resin having a low viscosity is contained in an excessively large amount, the spurting of the ink jet tends to be disturbed, or the volatility of the liquid ink tends to be increased. Such being the situation, it is desirable for the upper limit in the content of the epoxy compound having a low viscosity not to exceed 90 parts by weight.

It is desirable for the epoxy compound represented by general formula (1) or (2) given above to be used in combination with an alicyclic epoxy compound represented by general formula (3) given below. The alicyclic epoxy compound represented by general formula (3) is a high viscosity compound having a viscosity of generally about 20 mPa·s to 500 mPa·s. Therefore, it is effective to use the epoxy compound represented by general formula (3) for imparting a flexibility or, by contraries, a hardness to the ink layer after the photo-curing step.

$$R4\text{-}A3\text{-}(R5)_k \tag{3}$$

where each of R4 and R5 denotes an epoxy group or an epoxy group having an alicyclic skeleton, and A3 denotes a functional group having at least an alkylene group and/or an alicyclic skeleton and having a valency of k+1, "k" denoting a natural number.

In order to realize the minimum fluidity required for the spurting, i.e., a viscosity not higher than 30 mPa·s at 50° C., it is advantageous to add, for example, 50 to 90 parts by weight of an epoxy compound having a low viscosity and 10 to 40 parts by weight of an epoxy compound having a high viscosity relative to 100 parts by weight of the liquid ink. Particularly, it is desirable for the mixing ratio by weight of the low viscosity epoxy compound to the high viscosity epoxy compound to fall within a range of between about 1:1 and 10:1. Where the epoxy compound having a low viscosity is combined with the epoxy compound having a high viscosity in this fashion, it is desirable to use the compound represented by general formula (4) or (5) given previously as the photo acid generating agent and to mix the pigment in an amount of 1 to 25 parts by weight. In this case, it is possible to obtain a liquid ink satisfactory in all properties including a viscosity adapted for the spurting of the liquid ink, the photo-curing properties, the thermoplasticity, and the re-solubility.

Also, in the case of using an epoxy compound represented by general formula (6) given below in combination with a alicyclic epoxy compound, it is possible to improve the curing performance, particularly the adhesivity and the curing properties, of the liquid ink:

$$R^{11}\text{—}R^{12}\text{—}(R^{11})_j \tag{6}$$

where $R^{11}$ denotes a glycidyl ether group, $R^{12}$ denotes an alkylene group or a hydroxyl group-substituted alkylene group having 1 to 6 carbon atoms or an alkylene group having an alicyclic skeleton or a hydroxyl group-substituted alicyclic skeleton having 6 to 15 carbon atoms, and j is an integer of 1 to 3.

The aliphatic epoxy compounds include, for example, alicyclic epoxy compounds such as Celloxide 2021, Celloxide 2021A, Celloxide 2021P, Celloxide 2081, Celloxide 2000, and Celloxide 3000, which are manufactured by Dicel kagaku K.K.; Cyclmer A200 and Cyclmer M100, which is an acrylate compound or a methacrylate compound having an epoxy group; a methacrylate compound having a methyl glycidyl group such as MGMA; glycidol which is an epoxy compound having a low molecular weight; epoxidized soybean oil such as methyl epichlorohydrin, α-pinene oxide, α-olefin mono-epoxide having 12 to 14 carbon atoms, α-olefin mono-epoxide having 16 to 18 carbon atoms, and Dimac S-300K; an epoxidized linseed oil such as Dimac L-500; and poly-functional epoxy compounds such as Epolead GT301 and Epolead GT 401. It is also possible to use as the aliphatic epoxy compound an alicyclic epoxy compound Cyracure manufactured by Dow Chemical Inc., U.S.A., a compound prepared by substituting an atomic group having an epoxy group in the hydroxyl terminal group of a low molecular weight phenolic compound that is made aliphatic by hydrogenation, glycidyl ether compounds of polyhydric alcohol and alicyclic alcohol such as ethylene glycol, glycerin, neopentyl alcohol, hexane diol, and trimethylol propane as well as glycidyl esters of a hexahydro phthalic acid and a polyhydric carboxylic acid of a hydrogenated aromatic compound.

In order to improve the resistance of the printed image to chemicals, it is possible to add a transparent liquid epoxy resin having a high weatherability and a high Tg value such as epoxidized polybutadienes including Epolead PB 3600 and PB 3600M, which are manufactured by Dicel Kagaku K.K. as well as EHPE 3150 and EHPE 3150CE. It is also possible to add a lactone-denatured alicyclic epoxy resin to the transparent liquid epoxy resin referred to above. The lactone-denatured alicyclic epoxy resin referred to above includes, for example, Placcell GL61, GL62, G101, G102, G105, G401, G402 and G403X, which are manufactured by Dicel Kagaku K.K.

Particularly, in view of the viscosity and the volatility, it is desirable to use Celloxide 2000, Celloxide 3000, α-pinene oxide, glycidyl ethers denatured from alcohols such as neopentyl alcohol, ethylene glycol, glycerin, and hexane diol.

Particularly, where selected components are mixed at a prescribed mixing ratio as described below, it is possible to obtain a liquid ink quite satisfactory in any of the hardness, the adhesivity and the transfer properties of the ink layer after the photo-curing, in addition to the photosensitive performance. To be more specific, it is desirable for the combination of the compounds which are polymerized in the presence of an acid to comprise 30 to 70 parts by weight of an alicyclic epoxy compound having a terpenoid skeleton or a norbornane skeleton, 30 to 70 parts by weight of an epoxy compound in which at least two glycidyl ether groups form an aliphatic skeleton having at most 6 carbon atoms, 1 to 6 parts by weight of a hexafluoro phosphate compound having a phenyl sulfonium skeleton, which is used as a photo acid generating agent, and 1 to 10 parts by weight of a pigment used as a coloring component.

The particular alicyclic epoxy compound includes, for example, limonene (di)oxide, (di)oxa-bicyclo heptane and substituted compounds thereof. On the other hand, the epoxy compound having an aliphatic skeleton having at most 6 carbon atoms includes, for example, neopentyl glycol glycidyl ether, ethylene glycol glycidyl ether, glycerol di(tri) glycidyl ether, and 1,6-hexane diol glycidyl ether. Among these compounds, it is most desirable to use limonene dioxide and neopentyl glycol diglycidyl ether in combination. Incidentally, where the number of carbon atoms exceeds 6, it is possible for the hardness, the adhesivity and the transfer properties of the ink layer after the photo-curing step to be lowered. It should be noted in this connection that, even if the number of carbon atoms exceeds 6, it is possible to maintain the hardness of the ink after the photo-curing step, if the an alicyclic skeleton is included in the structure. In this case, it is possible to obtain similar properties until the maximum number of carbon atoms is increased to reach about 15. The particular compound meeting this requirement includes, for example, a hydrogenated bisphenol A and a glycidyl ether compound of biphenol. However, these compounds generally have a high viscosity and, thus, it is essentially desirable to use the former epoxy compound having at most 6 carbon atoms.

Where the epoxy compounds are combined as described above, the ink layer after the photo-curing step is re-fluidized at the lowest temperature of 50° C., preferably at about 80° C., so as to make it possible to carry out the fixing process and the transferring process satisfactorily. Further, in this case, it is possible for the ink layer after the photo-curing step to be dissolved again in the liquid ink or to be dissolved in an organic solvent consisting of a relatively safe lower alcohol such as ethanol or consisting of a petroleum component having a low boiling point such as Isopar. It follows that it is possible to suppress the plugging of a nozzle. Also, even if the nozzle is plugged, it is possible to resolve the plugging of the nozzle easily. In other words, the head maintenance operation can be markedly improved.

The properties required for the print are determined in accordance with the use of the print. For example, where the print is used for the wrapping of a can or a PET bottle or for the wrapping of a container made of an oily material, it is required for the printed image to exhibit a resistance to the solvent. Further, a higher polymerization speed is required in some cases for dealing with the printing at a higher speed.

In such a case, it is desirable to add epoxy compounds derived from compounds having phenolic hydroxyl groups, i.e., a general aromatic epoxy compound such as glycidyl ether compounds of bisphenol A, and glycidyl ether compounds of phenolic oligomers including phenol novolak, and polyhydroxy styrene, in addition to the alicyclic and aliphatic epoxy compounds described above.

Where such a high printing rate as scores of meters per minute is required and where a resistance to the solvent is required, it is desirable to use an aromatic oxetane compound as a solvent that can be polymerized in the presence of an acid. It should be noted, however, that, in the case of using mainly the aromatic oxetane compound, the viscosity is markedly increased. Therefore, it is desirable to add further an alicyclic epoxy compound and/or an aliphatic or alicyclic oxetane compound having a valency of at least 2. In this case, it is acceptable for the aliphatic oxetane compound to have a partial ether bond within the chemical structure. In view of the transfer capability and the desired viscosity, it is desirable for the aromatic oxetane compound to be added in an amount of 0 to 40 parts by weight. On the other hand, in view of the resistance to the solvent, it is desirable for the epoxy compound having an alicyclic skeleton to be added in an amount not larger than 50 parts by weight. Further, in view of the promotion of the photo-curing process, it is desirable for the total addition amount of the oxetane compound to be at least 40 parts by weight based on the amount of the liquid ink. Still further, in view of the hardness of the ink layer after the photo-curing, it is desirable for the total amount of the compounds having an alicyclic skeleton and an aromatic skeleton to be at least 30 parts by weight.

If the amounts of the oxetane compounds fail to fall within the ranges noted above, any of the photo-curing rate, the transfer performance, the spurting performance, and the resistance to the solvent tends to be impaired.

However, where the print is required to exhibit a higher resistance to a solvent, it is possible to increase the addition amount of the aromatic oxetane compound to exceed the ranges noted above. In this case, however, the increase in the viscosity gives rise to a serious problem and, thus, it is desirable to use a compound having an oxetane group on the acrylic side chain or a low viscosity compound such as a vinyl ether compound in combination with the aromatic oxetane compound.

The aliphatic or alicyclic oxetane compounds having a valency of at least 2 include, for example, di[1-ethyl(3-oxetanyl)]methyl ether, 3-ethyl-3-(2-ethyl cyclohexyl methyl) oxetane, [(1-ethyl-3-oxetanyl) methoxy]cyclohexane, bis [(1-ethyl-3-oxetanyl) methoxy]cyclohexane, a compound prepared by introducing at least one oxetane-containing group into an alicyclic ring such as bis [(1-ethyl-3-oxetanyl) methoxy]norbornane, and an ether compound obtained by the dehydration condensation carried out between an aliphatic polyhydric alcohol such as ethylene glycol, propylene glycol, or neopentyl alcohol and an oxetane-containing alcohol such as 3-ethyl-3-hydroxymethyl oxetane.

On the other hand, the oxetane compounds having an aromatic skeleton include, for example, 1,4-bis ((1-ethyl-3-oxetanyl)methoxy)benzene, 1,3-bis ((1-ethyl-3-oxetanyl)methoxy)benzene, 4,4'-bis ((3-ethyl-3-oxetanyl)methoxy) biphenyl, and phenol novolak oxetanes.

In the case of using an acrylic compound or a methacrylic compound having an oxetane group on the side chain, it is also possible to suppress the elevation of the viscosity and to obtain the photo-cure accelerating effect as in the case of using the oxetane compound.

Where a further decrease of the viscosity and a further improvement of the photo-curing rate are required in addition to the improvements in the photo-curing rate and in the resistance of the printed image to the solvent, it is desirable to add the vinyl ether compounds represented by general formula (7) given below, singly or in combination, to the liquid ink. In our knowledge, the cationic polymerization of a conventional vinyl ether compound bonded to the body skeleton via the methylene group, such as vinyl substituted aliphatic glycol derivative or cyclohexane dimethanol, is markedly inhibited by the pigment. In addition, the hardness of the photo-cured material is lowered, too. Such being the situation, it was difficult in the past to use the particular vinyl ether compound as a component of an ink. However, the compound represented by general formula (7) given below, in which a vinyl ether group is directly bonded to the alicyclic skeleton, the terpenoid skeleton or the aromatic skeleton, exhibits an excellent photo-curing performance even if used together with a pigment. In order to maintain the thermoplasticity, it is desirable for the mixing amount of the compound represented by general formula (7) to be not larger than 50 parts by weight based on the amount of the entire liquid ink. However, it is possible to increase the mixing amount of the particular compound to a level equal to the total amount of the solvent that is cured in the presence of an acid in the case where a higher resistance to the solvent and a higher hardness are required even if the thermoplasticity is impaired.

$$R^{13}\text{-}R^{14}\text{-}(R^{13})_p \tag{7}$$

where $R^{13}$ denotes at least one vinyl ether group, which is a substituting group selected from the group consisting of a vinyl ether group and a hydroxyl group, $R^{14}$ denotes an atomic group having a valency of $(p+1)$, which is selected from the an alicyclic group and a group having an aromatic ring, and "p" denotes a positive integer including 0. Where $R^{14}$ represents a cyclohexane ring skeleton and "p" is 0, at least one of the carbon atoms forming a ring has a ketone structure.

The organic group $R^{14}$ having a valency of $(p+1)$ includes, for example, an atomic group having a valency of $(p+1)$ including a benzene ring, a naphthalene ring or a biphenyl ring, and an atomic group having a valency of $(p+1)$ from which is derived, for example, a cycloalkane skeleton, a norbornane skeleton, an adamantane skeleton, a tricyclo dencane skeleton, a tetracyclo dodecane skeleton, a terpenoid skeleton or a cholesterol skeleton.

To be more specific, the compounds represented by general formula (7) include, for example, alicyclic polyols such as cyclohexane (poly)ol, norbornane (poly)ol, tricyclodecane (poly)ol, adamantane (poly)ol, benzene (poly)ol, naphthalene (poly)ol, anthracene (poly)ol, and biphenyl (poly)ol, and phenol derivative in which a vinyl group is substituted for the hydrogen atom included in the hydroxyl group of these compound. The compounds represented by general formula (7) also include a compound in which a vinyl group is substituted for the hydrogen atom included in the hydroxyl group of a polyphenol compound such as polyvinyl phenol or phenol novolak. The compound referred to above is desirable because the volatility is lowered even if the hydroxyl group partly remains unchanged and even if a substituent such as a ketone group is substituted for some of the methylene atoms included in the alicyclic skeleton.

Particularly, the cyclohexyl monovinyl ether compound is rich in volatility and, thus, in the case of using a cyclohexyl monovinyl ether compound, it is desirable for the cyclohexane ring to be oxidized into at least a cyclohexanone ring.

It is possible for a substituent such as an alkyl group or a halogen atom to be substituted for some of the hydrogen atoms on the vinyl ether.

The vinyl ether compounds described above can be suitably obtained by the method described on pages 1590 to 1591 of "J. AM. CHEM. Soc. VOL. 124, No. 8 (2002)".

Where the alicyclic skeletons included in the various acid polymerizable compounds, i.e., compounds which can be polymerized in the presence of an acid, described above have a terpenoid skeleton, it is possible to increase the safety of the liquid ink or the ink layer after the photo-curing step in respect of the human body and the environment. The particular epoxy compound includes, for example, a derivative of myrcene, ocimene, geraniol, nerol, linalool, citronellol, citral, menthene, limonene, dipentene, terpinolene, terpinene, phellandrene, silvestrene, piperitol, terpineol, menthenemonol, isopulegol, pelary aldehyde, piperitone, dihydro carvone, carvone, pinol, ascaridole, zabinene, carene, pimene, bornene, fenchene, camphene, carbeol, sesquiterpenes, diterpenes, or tripentenes. The terpene series compounds having an unsaturated bond are used as the starting materials of the derivatives noted above, and these derivatives are obtained by oxidizing and epoxidizing the unsaturated bond. It is also possible to use suitably an alicyclic oxetane compound prepared by the dehydration condensation between an alcohol having the skeleton described above and another alcohol having an oxetane skeleton so as to form an ether bond, and a vinyl ether compound prepared by substituting a vinyl group for the hydrogen atom of the alcohol having the skeleton described above. On the other hand, it is desirable in respect of the cost to use epoxy compounds, oxetane compounds and vinyl ether compounds having the norbornene skeleton, which are widely distributed in nature. It suffices for the compound having the terpenoid skeleton to be contained in an amount of at least 30% by weight in order to permit the particular compound to produce its effect sufficiently.

Various oxidizing methods in which is used an oxidizing agent such as peracetic acid can be utilized for the oxidation to prepare an epoxy compound. For example, the air oxidizing method using N-hydroxy phthalimide and a rare earth catalyst is most suitable for use.

The liquid ink according to one embodiment of the present invention is a photosensitive ink which needs heating and, thus, in view of the safety and odor, it is desirable for the volatility of the ink to be low. To be more specific, it is desirable for the evaporation rate after the light exposure step to be not higher than 0.2 mg/cm²·min at 80° C. The evaporation amount in, this case denotes the evaporation amount (mg) per minute in the case of heating a container having an open area of, for example, 10 cm². The value of the evaporation amount, which is dependent on the open area of the container, is defined to be a value obtained in the case of heating a petri dish having a diameter of 6 cm and housing 4 g of an ink under atmospheric pressure. An ink of the composition failing to fall within the range noted above exhibits an excessively high evaporating rate when the ink is heated. As a result, the safety is impaired, and the problem of the odor is rendered prominent. On the other hand, for an ink that is markedly poor in volatility, e.g., an ink having an evaporation rate not higher than 0.00001 mg/cm²·min, the viscosity of the ink is generally rendered high, which makes it difficult to spurt the ink from the nozzle in the ink jet operation.

As already described, it is desirable for the liquid ink according to one embodiment of the present invention to have a fluidity of at least 30 cP (=mPa·s). In order to satisfy the particular requirement, it is desirable for the composition containing a mixture of n-kinds of acid polymerizable compounds, i.e., compounds polymerizable in the presence of an acid, described above to have the value of $\eta_t$ represented by formula (1) given below, which falls within a range of between 3 (mPa·s) and 30 (mPa·s), preferably between 5 (mPa·s) and 25 (mPa·s):

$$\eta_t = \exp(\chi_1 \cdot \ln(\eta_1) + \chi_2 \cdot \ln(\eta_2) + \chi_3 \cdot \ln(\eta_3)i. + \ldots + \chi_n \cdot \ln(\eta_n)) \tag{1}$$

where $\chi_1, \chi_2, \chi_3, \ldots \chi_n$ denote the mixing ratio by weight of the components, and $\eta_1, \eta_2, \eta_3, \ldots \eta_n$ denote the viscosity of each component taken singly under room temperature and atmospheric pressure.

If the value of $\eta_t$ fails to fall within the range given above, it is difficult to spurt the ink. Alternatively, the printed image tends to be disturbed by the disturbance of the spurting of the ink.

The liquid ink according to one embodiment of the present invention is irradiated with light for the photo-curing purpose so as to form an ink layer. Where the ink layer after the photo-curing step has a sufficient thermoplasticity and a sufficient re-solubility, it is possible to transfer the ink layer formed by spurting the liquid ink onto an image carrier onto a recording medium. To be more specific, an ink layer is formed by spurting the liquid ink onto an image carrier, followed by irradiating the ink layer with light and heating the ink layer so as to cure the ink layer. Then, pressure or both pressure and heat are applied to the ink layer under the state that the ink layer is brought into contact with the recording medium so as to re-fluidize or plasticize the ink layer, thereby transferring the ink layer onto the recording medium.

Where the liquid ink is spurted directly onto the recording medium, it is possible for the ink layer formed on the recording medium to be irradiated with light and heated so as to cure or preliminarily cure the ink layer. Further, the ink layer is heated so as to cure the ink layer and fix the ink layer to the recording medium.

It is desirable for the liquid ink according to one embodiment of the present invention to have a high stability in respect of the ink jet spurting. However, the viscosity of the liquid ink generally tends to be increased with time at a high rate, with the result that the liquid ink is capable of retaining the required performance for only a short time. Such being the situation, it is desirable for the liquid ink to further contain at least one of a basic compound and a compound developing a basicity as a viscosity stabilizing agent. Where carbon black is used as a coloring component, the viscosity stabilizing agent produces its effect further prominently. The basic compound also produces the effect of markedly suppressing the corrosion caused by an acid inside the ink jet head of the recording apparatus and the metal portion of the ink pipe. Therefore, it is desirable to use generally a basic compound in the liquid ink according to one embodiment of the present invention.

It is possible to use an optional inorganic base and an optional organic base soluble in the acid-curable compound described above, though it is desirable to use an organic base in view of its solubility. The organic base includes, for example, ammonia, an ammonium compound, substituted or unsubstituted alkyl amine, substituted or unsubstituted aromatic amine, and organic amines having a hetero ring skeleton such as pyridine, pyrimidine and imidazole. To be more specific, the organic base includes, for example, n-hexyl amine, dodecyl amine, aniline, dimethyl aniline, diphenyl amine, triphenyl amine, diazabicyclo-octane, diazabicyclo-undecane, 3-phenyl pyridine, 4-phenyl pyridine, rutidine, 2,6-di-t-butyl pyridine, and sulfonyl hydrazides such as 4-methyl benzene sulfonyl hydrazide, 4,4'-oxybis (benzene sulfonyl hydrazide) and 1,3-benzene sulfonyl hydrazide.

It is possible to use an ammonium compound as the basic compound. The desirable ammonium compound is a quaternary ammonium salt represented by general formula (23) given below:

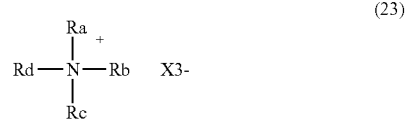

(23)

where each of $R_a$, $R_b$, $R_c$, and $R_d$ denotes an alkyl group, a cycloalkyl group, an alkyl aryl group, or an aryl group, in which an oxygen atom may be substituted for at least one aliphatic $CH_2$ group, and X3 denotes a basic anion.

In the compound represented by general formula (23) given above, it is desirable for each of $R_a$ to $R_d$ to denote any of a methyl group, an ethyl group, a propyl group, an isopropyl group, a butyl group, a dodecyl group, a phenyl group, and a benzyl group, for X3⁻ to denote an anion selected from the group consisting of a hydroxyl ion, ⁻OR in which R denotes a $C_1$ to $C_4$ alkyl group, ⁻OCOR' in which R' denotes an alkyl group, an aryl group or an alkyl aryl group, OCOO⁻, and OSOO⁻. Particularly, it is desirable to use a hydroxylated tetramethyl ammonium and a hydroxylated tetrabutyl ammonium as the compound represented by general formula (23). It is possible to use a single kind of the basic compound or a plurality of basic compounds in combination.

However, in the case of using an excessively strong basic compound such as imidazole, difficulties tend to take place. For example, polymerization of solvents tends to take place with time. Also, a side reaction such as decomposition of the photo acid generating agent also tends to take place easily. On the other hand, in the case of a compound having an excessively low basicity, it is difficult to obtain a sufficient effect of stabilizing the viscosity by the addition of the basic compound. For example, it is desirable to use a basic compound having at least 4 of the base dissociation constant pKb at 25° C. under the state of a suitable aqueous solution. Conversely, a basic compound having the base dissociation constant pKb exceeding 11 scarcely produces the desired effect. The basic compounds meeting the particular requirement include, for example, a pyridine derivative, an aniline derivative, an amino naphthalene derivative, and other nitrogen-containing hetero ring compounds and derivatives thereof.

The pyridine derivatives include, for example, 2-fluro pyridine, 3-fluoro pyridine, 2-chloro pyridine, 3-chloro pyridine, 3-phenyl pyridine, 2-benzyl pyridine, 2-formyl pyridine, 2-(2'-pyridyl) pyridine, 3-acetyl pyridine, 2-bromo pyridine, 3-bromo pyridine, 2-iodo pyridine, 3-iodo pyridine, and 2,6-di-tert-butyl pyridine.

The aniline derivatives include, for example, aniline, 4-(p-amino benzoyl) aniline, 4-benzyl aniline, 4-chloro-N,N-dimethyl aniline, 3,5-dibromo aniline, 2,4-dichloro aniline, N,N-dimethyl aniline, N,N-dimethyl-3-nitro aniline, N-ethyl aniline, 2-fluoro aniline, 3-fluoro aniline, 4-fluoro aniline, 3-iodo aniline, N-methyl aniline, 4-methyl thioaniline, 2-bromo aniline, 3-bromo aniline, 4-bromo aniline, 4-bromo-N,N-dimethyl aniline, 2-chloro aniline, 3-chloro aniline, 4-chloro aniline, 3-chloro-N,N-dimethyl aniline, 3-nitro aniline, 4-nitro aniline, 2-methoxy aniline, 3-methoxy aniline, diphenyl amine, 2-biphenyl amine, o-toluidine, m-toluidine, p-toluidine, 3,3'-diamino diphenyl sulfone, 4,4'-diamino diphenyl sulfone, and 4,4'-bis(4-amino phenoxy) diphenyl sulfone.

The amino naphthalene derivatives include, for example, 1-amino-6-hydroxy naphthalene, 1-naphthyl amine, 2-naphthyl amine, diethyl amino naphthalene, and N-methyl-1-naphthyl amine.

Further, the other hetero ring compounds and the derivatives thereof include, for example, sinoline, 3-acetyl piperidine, pyrazine, 2-methyl pyrazine, methyl amino pyrazine, pyridazine, 2-amino pyrimidine, 2-amino-4,6-dimethylpyrimidine, 2-amino-5-nitro pyrimidine, 2,4,6-triamino-1,3,5-triazine, pyrrole, pyrazole, 1-methylpyrazole, 1,2,4-triazole, indazole, benzotriazole, quinazoline, quinoline, 3-amino quinoline, 3-bromo quinoline, 8-carboxy quinoline, 3-hydroxy quinoline, 6-methoxy quinoline, 5-methyl quinoline, quinoxaline, thiazole, 2-amino thiazole, 3,4-diazaindole, purine, 8-aze purine, indole and indolizine.

Among these basic compounds, it is particularly desirable to use the aniline derivatives represented by general formula (21) given below in view of the stability of the viscosity, the volatility, the basicity and the low side reactivity:

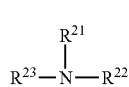

(21)

wherein at least one of $R^{21}$, $R^{22}$ and $R^{23}$, which may be the same or different, at least one denotes a substituted or unsubstituted aromatic group, with the others denoting a hydrogen atom, a hydroxyl group, a substituted or unsubstituted aromatic group, or a substituted or unsubstituted alkyl group.

It should be noted that the aniline compound represented by general formula (21) given above is low in its basicity. Therefore, it is undesirable to use the particular aniline compound in combination with an oxetane compound having a basicity. It is desirable to use the oxetane compound having a high basicity such that the base dissociation constant pKb at 25° C. falls within a range of between 3 and 7. For example, a basic compound such as an amine compound having an aliphatic skeleton or an amine compound having an alicyclic skeleton can be used suitably as the oxetane compound.

Also, where the basic compound described above forms a salt together with an anion as shown in general formula (22) given below and where the anion has a low acidity, the compound itself performs the function of a weak base and, thus, the particular compound can be used similarly:

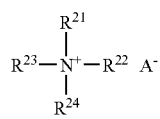

(22)

where $A^-$ denotes a compound having a sulfonate anion or a carboxyl anion, and each of $R^{21}$, $R^{22}$, $R^{23}$ and $R^{24}$, which may be the same or different, denotes a hydrogen atom, a hydroxyl group, a substituted or unsubstituted aromatic group or a substituted or unsubstituted alkyl group.

Since it is possible for the liquid ink of one embodiment of the present invention to be heated after the light exposure, it is desirable for the basic compound to have a volatility as low as possible. To be more specific, it is desirable for the particular basic compound to have a boiling point not lower than 150° C., preferably not lower than 180° C., under room temperature.

It is desirable for the basic compound or the compound exhibiting a basicity to be contained in the liquid ink of one embodiment of the present invention in an amount of between 1 and 30 mol %, preferably between 2 and 15 mol %, based on the total number of mols of the photo acid generating agent. If the amount of the basic compound or the compound exhibiting a basicity fails to fall within the range noted above, the sensitivity is markedly lowered or the compound fails to produce the effect of stabilizing the stability of the liquid ink.

In the case of using a photosensitive basic compound that is decomposed upon irradiation with light or radiation, it is desirable to add the photosensitive basic compound because the reduction of the sensitivity accompanying the addition of the basic compound can be suppressed.

A sulfonium compound and an iodonium compound can be used suitably as the photosensitive basic compound. For example, the sulfonium compound includes the compounds represented by general formulas (SS1) to (SS4) given below:

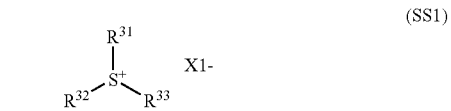

(SS1)

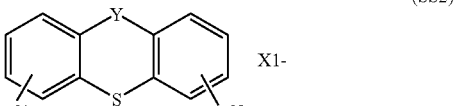

(SS2)

(SS3)

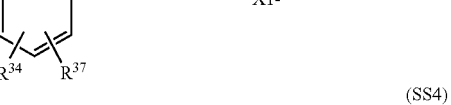

(SS4)

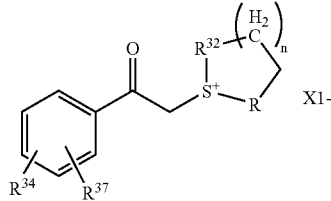

where each of $R^{31}$, $R^{32}$ and $R^{33}$ denotes an alkyl group, an aryl group, a hetero aryl group, or an aryl group in which is substituted an alkyl group, an alkyl aryl group, a halogen atom, an alkoxy group, a phenoxy group, a thio phenol group, a phenyl sulfonyl group or a phenyl sulfenyl group, Y denotes $CH_2$, O or S, each of $R^{34}$, $R^{35}$, $R^{36}$ and $R^{37}$ denotes an alkyl group, an alkoxy group or a halogen atom, $X1^-$ denotes a basic anion.

It is desirable for each of $R^{31}$, $R^{32}$ and $R^{33}$ to denote a methyl group, an ethyl group, a propyl group, an isopropyl group, a butyl group, a phenyl group, a biphenyl group, a tolyl group, a xylyl group, a chlorophenyl group, a bromophenyl group, a methoxyphenyl group, an ethoxyphenyl group, a propyloxyphenyl group, a butyloxyphenyl group, a tert-butyloxyphenyl group, a phenoxyphenyl group, a thiophenoxyphenyl group, a thiophenoxyphenyl group, and a phenylsulfonylphenyl group.

It is desirable for each of $R^{34}$, $R^{35}$, $R^{36}$ and $R^{37}$ to denote an alkyl group, a methoxy group, an ethoxy group, a chlorine atom or a bromine atom.

It is desirable for $X1^-$ to denote anions including a hydroxyl ion, $^-OR$ (in which R denotes a C1 to C4 alkyl group), $^-OCOR'$ (in which R' denotes an alkyl group, an aryl group or an alkyl aryl group), $OCOO^-$, and $OSOO^-$.

Further, it is desirable to use the compounds represented by general formulas (IS1) to (IS3) given below as the iodonium compound:

(IS1)

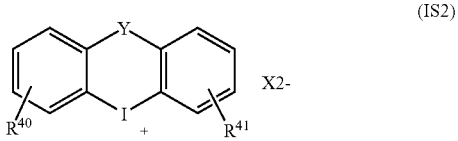
(IS2)

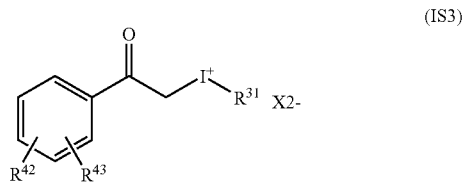
(IS3)

where each of $R^{38}$ and $R^{39}$ denotes an alkyl group, an aryl group, a hetero aryl group, or an aryl group in which is substituted any of an alkyl group, an aryl group, a halogen atom, an alkoxy group, a phenoxy group, a thiophenol group, a phenylsulfonyl group and a phenylsulfenyl group in any of mono-, di- or tri-substituted fashion, Y denotes $CH_2$, O or S, each of $R^{40}$, $R^{41}$, $R^{42}$ and $R^{43}$ denotes an alkyl group, an alkoxy group or a halogen atom, "n" is an integer of 5 or 6, and $X2^-$ denotes a basic anion.

It is desirable for each of $R^{38}$ and $R^{39}$ to denote a methyl group, an ethyl group, a propyl group, an isopropyl group, a butyl group, a phenyl group, a biphenyl group, a tolyl group, a xylyl group, a chlorophenyl group, a bromophenyl group, a methoxyphenyl group, an ethoxyphenyl group, a propyloxyphenyl group, a butyloxyphenyl group, a tert-butyloxyphenyl group, a phenoxyphenyl group, a thiophenoxyphenyl group, and a phenylsulfonylphenyl group.

It is desirable for each of $R^{40}$, $R^{41}$, $R^{42}$ and $R^{43}$ to denote an alkyl group, a methoxy group, an ethoxy group, a chlorine atom or a bromine atom.

Further, it is desirable for $X2^-$ to denote anions including a hydroxyl ion, $^-OR$ (in which R denotes a C1 to C4 alkyl group), $^-OCOR'$ (in which R' denotes an alkyl group, an aryl group or an alkyl aryl group), $OCOO^-$, and $OSOO^-$.

The sulfonium compounds and the iodonium compounds, which can be used suitably include, for example, triphenyl sulfonium acetate, hydroxylated triphenyl sulfonium, triphenyl sulfonium phenolate, hydroxylated tris-(4-methylphenyl)sulfonium, tris-(4-methylphenyl)sulfonium acetate, tris-(4-methylphenyl)sulfonium phenolate, hydroxylated diphenyl iodonium, diphenyl iodonium acetate, diphenyl iodonium phenolate, hydroxylated bis-(4-tert-butylphenyl) iodonium, bis-(4-tert-butylphenyl) iodonium acetate, bis-(4-t-butylphenyl) iodonium phenolate, thiophenyl-substituted triphenyl sulfonium acetate and thio phenyl-substituted triphenyl sulfonium hydroxide.

In addition to the specified basic compounds described above, it is also possible to add other basic compounds. Where an onium salt is used as the photo acid generating agent, it is desirable for the photo acid generating agent and the basic compound to be provided by the same kind of cation component. Where both the photo acid generating agent and the basic compound are provided by the sulfonium series compounds or the iodonium series compounds, a satisfactory effect can be obtained in respect of the sensitivity and the storage stability.

Further, where a compound, which is not a base originally, is decomposed with time so as to form a basic compound, it is desirable to use such a compound because the formed basic compound is capable of neutralizing the acid that is gradually generated. It is possible to use a compound, which generates a base upon heating, as such a compound. The particular compound includes, for example, NBC-101 (trade name, manufactured by Midori Kagaku K.K.) and a carbamate compound such as α,α-dimethyl-3,5-dimethoxy benzyl carbamate. It is also possible to suitably use the compounds represented by general formulas (TBG1) to (TBG8) given below:

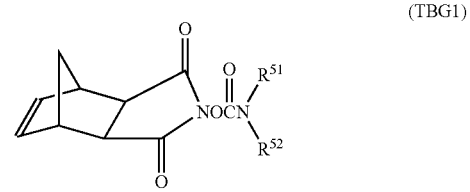
(TBG1)

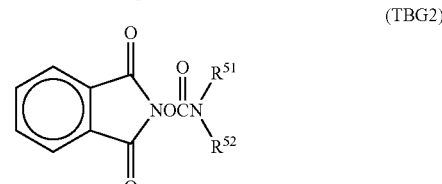
(TBG2)

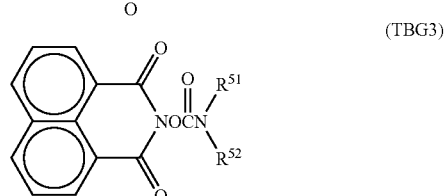
(TBG3)

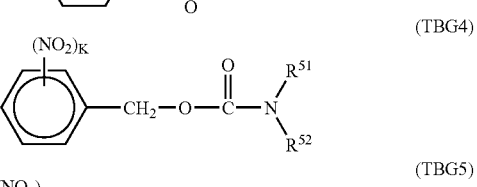
(TBG4)

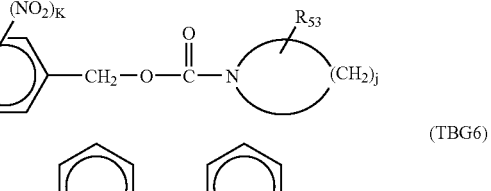
(TBG5)

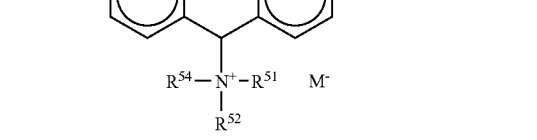
(TBG6)

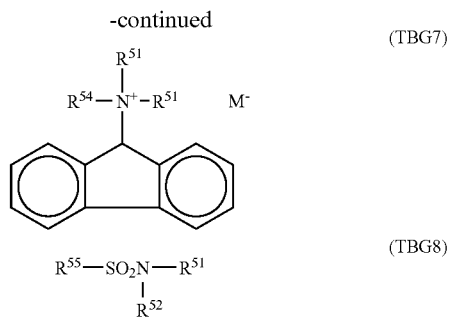

where $R^{51}$, $R^{52}$ and $R^{54}$ denote independently a hydrogen atom, a linear or branched alkyl group having 1 to 20 carbon atoms, or a cyclic alkyl group having 3 to 20 carbon atoms, it being possible for $R^{51}$ and $R^{52}$, for $R^{51}$ and $R^{54}$ and for $R^{52}$ and $R^{54}$ to be bonded to each other to form a cyclic structure, $R^{53}$ denotes a linear or branched alkyl group having 1 to 4 carbon atoms, $R^{55}$ denotes a hydrogen atom, a linear or branched alkyl group having 1 to 20 carbon atoms, a cyclic alkyl group having 3 to 20 carbon atoms, or an aryl group having 6 to 20 carbon atoms, M denotes iodonium or sulfonium, "j" denotes an integer of 2 to 10, and "k" denotes an integer of 1 to 3.

The linear or branched alkyl group having 1 to 20 carbon atoms, which is represented by $R^{51}$, $R^{52}$, $R^{54}$ or $R^{55}$, include, for example, a methyl group, an ethyl group, a n-propyl group, an iso-propyl group, a n-butyl group, a tert-butyl group, and n-dodecyl group. On the other hand, the cyclic alkyl group having 3 to 20 carbon atoms includes, for example, a cyclopropyl group, a cyclobutyl group, a cyclopentyl group, a cyclohexyl group, a cycloheptyl group, a cyclooctyl group, and a cyclododecyl group. Further, the aryl group having 6 to 20 carbon atoms includes, for example, a phenyl group, a naphtyl group and a pyrenyl group. Still further, the formed cyclic structure includes, for example, a piperidino group, a pyrrolidino group, a propylene imino group, and an acetidino group.

Further, the linear or branched alkyl group having 1 to 4 carbon atoms, which is represented by $R^{53}$, includes, for example, a methyl group, an ethyl group, a n-propyl group, an iso-propyl group, a n-butyl group and a tert-butyl group.

It is possible to add a small amount of a dispersant such as a nonionic or ionic surfactant and a charging agent to the liquid ink according to one embodiment of the present invention in order to improve the dispersion capability of, for example, the pigment. It is also possible to use suitably a high molecular weight system dispersant having similar properties, such as an acrylate or vinyl alcohol. It should be noted, however, that, in the case of using a cationic dispersant as a dispersing agent, it is desirable to select a compound lower in acidity than a carboxylic acid. This is because some of the cationic dispersants promote the dark curing reaction of the ink. Also, a dispersant having a strong basicity and a pigment, which lower the sensitivity of the ink, similarly promote the dark reaction. Such being the situation, it is desirable to use a neutral or nonionic dispersant.

Where the printing surface exhibits a strong basicity, or where the pigment or the printing surface tends to be affected by an acid, it is possible to suppress the effects of the acid by further adding, for example, a compound capable of radical polymerization to the liquid ink according to one embodiment of the present invention. The radical polymerizable compounds include, for example, an acrylic or methacrylic monomer, a styrene-based monomer, and a vinyl compound having a plurality of polymerizable atomic groups. Also, where a vinyl ether series compound is contained in the liquid ink, the compound is combined with an acrylic monomer so as to carry out a radical polymerization. Further, the vinyl ether series compound is capable of a radical polymerization by itself. Similarly, where a compound capable of both a cationic polymerization and a radical polymerization such as CEL 2000 manufactured by Dicel Kagaku K.K., glycidyl methacrylate or an ester compound between vinyl alcohol and an acrylic or methacrylic acid is further added to the liquid ink, it is possible to obtain the merit that both the radical polymerization and the cationic polymerization can be performed. In this case, it is possible to simultaneously add to the liquid ink a photo radical polymerization initiating agent, such as Michler's ketone, known under a trade name of Irugacure or benzophenone, and a photo crosslinking type radical generating agent such as bis-azide. This technique can also be applied to the case where it is desired to impart a higher resistance to chemicals to the ink layer after the photo-curing step.

It is desirable in general to prepare the liquid ink according to one embodiment of the present invention in a manner to suppress, as much as possible, the content of the volatile components such as water and organic solvent in the prepared liquid ink. However, it is acceptable for the organic solvents used in the step of preparing the raw materials, i.e., the organic solvents such as methyl ethyl ketone, propylene glycol series solvent and ethyl lactate, to be unavoidably contained in the prepared liquid ink. Also, in the case of arranging, for example, a solvent recovery mechanism, it is acceptable for the prepared liquid ink to contain a small amount of the organic solvent, to obtain a desired print. In this case, it is desirable to use water, alcohols such as ethanol and propanols, and petroleum components such as Isopar and terpene, in view of safety.

As described previously, the image forming capability of the liquid ink according to one embodiment of the present invention is dependent on the chemically amplified mechanism. To reiterate, the light exposure treatment causes the photo acid generating agent to generate an acid, and the acid thus generated is diffused by heating so as to perform the function of a catalyst in the crosslinking reaction. Therefore, a prominent presence of a basic ion causes the sensitivity of the liquid ink to be lowered. It follows that it is desirable to take measures for preventing a large amount of basic ions from being contained in the liquid ink in the process of preparing the liquid ink and in the process of preparing each of the components of the liquid ink.

An ink jet recording apparatus according to one embodiment of the present invention will now be described with reference to the accompanying drawings.

FIG. 1 schematically shows the construction of an ink jet recording apparatus 1 according to one embodiment of the present invention. As shown in the drawing, the ink jet recording apparatus 1 comprises a transfer member 3 for transferring a recording medium 2. An ink jet type recording head 4, a light source 5 and a heater 6 used as a heating means (heating member) are arranged in the moving direction of the transfer member 3 in the order mentioned as viewed from the upstream side toward the downstream side.

The recording medium 2 (i.e., a medium on which an image is printed) is not particularly limited in the present invention, as long as an image can be printed on the printing medium 2. To be more specific, the recording medium 2 includes, for example, a paper sheet, an OHP sheet, a resin film, an unwoven fabric, a porous film, a plastic plate, a circuit board and a metal plate.

The transfer member 3 transfers the recording medium 2 such that the recording medium 2 is allowed to face successively the recording head 4, the light source 5 and the heater 6 in the order mentioned. As apparent from an arrow shown in the drawing, the transfer member 3 transfers the recording medium 2 from the right side toward the left side in the drawing. It is possible for the transfer member 3 to be formed of a belt and/or roller for moving the recording medium 2 and a driving mechanism for driving the belt and/or roller. It is also possible for the transfer member 3 to be provided with a guide member for assisting the movement of the recording medium 2.

The recording head 4 spurts a liquid ink onto the recording medium 2 in accordance with image signals, so as to form an ink layer on the recording medium 2. It is possible to use, as the recording head 4, a serial scanning type head mounted to a carriage, or a line scanning type head having a width larger than the width of the recording medium 2. In view of printing at a high speed, the latter is superior in general to the former. The method for spurting the liquid ink from the recording head 4 is not particularly limited. For example, it is possible for the ink droplets to be spurted from the recording head 4 by utilizing the pressure of steam generated by a heat generating body, or for the ink droplets to be spurted from the recording head 4 by utilizing the mechanical pressure generated by a piezoelectric element.

The ink layer formed on the recording medium 2 is irradiated with the light emitted from the light source 5 so as to cause an acid to be generated within the ink layer. The light source 5 includes, for example, a mercury lamp such as a low, medium or high pressure mercury lamp, a tungsten lamp, an arc lamp, an excimer lamp, a semiconductor laser, a YAG laser, a laser system utilizing in combination a laser and a nonlinear optical crystal, a high frequency-induced ultraviolet light generating apparatus, an electron beam irradiating apparatus, and an X-ray irradiating apparatus. Particularly, it is desirable to use, for example, a high frequency-induced ultraviolet light generating apparatus, a high or low pressure mercury lamp, or a semiconductor laser in order to simplify the system. Also, it is possible to mount a light-collecting mirror or a scanning optical system to the light source 5.

The heater 6 serves to heat the ink layer formed on the recording medium 2 so as to promote the crosslinking reaction carried out in the presence of an acid acting as a catalyst. The heater 6 includes, for example, an infrared ray lamp, a roller having a heat generating body housed therein, i.e., a heat roller, and a blower blowing warm air or hot air.

An image can be printed on the recording medium 2 by using the ink jet recording apparatus 1 by, for example, the method described below.

In the first step, the recording medium 2 is transferred by the transfer member 3 from the right side toward the left side in the drawing. The moving speed of the recording medium 2 is set to fall within a range of between, for example, 0.1 m/min and 100 m/min.

When the recording medium 2 is transferred to face the front surface of the recording head 4, the liquid ink is spurted from the recording head 4 onto the recording medium 2 in accordance with image signals. As a result, an ink layer is formed on the recording medium 2.

Then, the recording medium 2 is further transferred to face the front surface of the light source 5. When the recording medium 2 is passed through the front surface of the light source 5, the ink layer formed on the recording medium 2 is irradiated with the light emitted from the light source 5, with the result that an acid is generated within the ink layer. Incidentally, the intensity of the irradiating light on the surface of the ink layer, which differs depending on, for example, the wavelength of the light emitted from the light source used, generally falls within a range of between several $mW/cm^2$ and 1 $kW/cm^2$. It is possible to set appropriately the amount of the light irradiating the ink layer in accordance with, for example, the sensitivity of the liquid ink and the moving speed of the printing surface (i.e., the transfer speed of the recording medium 2).

Then, the recording medium 2 is transferred into the heater 6 or to a region in the vicinity of the heater 6. When the recording medium 2 is passed through the heater 6 or through a region in the vicinity of the heater 6, the heater 6 heats the ink layer formed on the recording medium 2 so as to promote the crosslinking reaction carried out within the ink layer. Incidentally, in the ink jet recording apparatus 1 shown in FIG. 1, the heating time of the heater 6 is relatively short, i.e., the heating time is several seconds to tens of seconds. Therefore, in order to permit the photo-curing reaction carried out within the ink layer to proceed substantially completely by the heating with the heater 6, the heating should be performed at a relatively high temperature such that the highest heating temperature is not higher than about 200° C., preferably falls within a range of between 80° C. and 200° C. or between 60° C. and 180° C.

Then, the recording medium 2 is transferred into a container (not shown), thereby finishing the printing operation.

The heating means for heating the ink layer is not limited to the heater 6 arranged downstream of the light source 5 as shown in FIG. 1. For example, it is possible to utilize the light source 5 as heat source by moving the light source 5 so as to be positioned in the vicinity of the recording medium 2 such that the printing surface is not impaired in the step of exposing the ink layer to the light. It is also possible to utilize the light source as the heat source by not mounting a heat removing mechanism, such as a cold mirror, in the light source. In the case of a high output bulb of hundreds of watts, the bulb also includes a cooling mechanism. Therefore, the heat removing mechanism is partly modified, and a mechanism for intentionally returning the heat to the paper sheet is arranged in the bulb. As a result, it is possible to heat the ink layer by utilizing the heat generated from the light source.

To be more specific, a light source having an output higher than 100 W, which comprises a mechanism for introducing the air stream, used for cooling the light source, back onto the surface of a paper sheet or into a transfer/holding mechanism, for the heating purpose, corresponds to the high output bulb noted above. It suffices for the recording medium to be heated by the heat returning from the light source to the temperature at which the effect substantially equal to that obtained by the heating by the heater described above can be obtained. It is generally desirable for the temperature of the recording medium to reach at least 60° C., and more desirably, to reach 80° C. to 100° C. Also, in the case of a high rate light exposure, e.g., several m/sec., it is possible to perform the heating at a high temperature of about 180° C. because the heating is performed instantly.

In the case of using a light source that permits emitting, for example, an infrared ray in addition to the visible light as the light source 5, the heating can be performed simultaneously with the light irradiation. The use of this kind of light source is desirable because photo-curing can be promoted.

If the ink layer is irradiated with light, the ink layer is heated by the heat generated from the light source 5. As a result, it is not absolutely necessary to arrange a heating means as an independent member like the heater 6. However, a long heating time is required for completely curing the ink layer in the case where the ink layer is left to stand under room temperature, such that the ink layer is cured by only the heat generated from the light source 5. Therefore, it is desirable to employ the technique of leaving the ink layer to stand under room temperature in the case where a sufficiently long time can be secured before complete curing. For example, it is possible to secure a long curing time of about 4–24 hours in the case of a printed advertisement that is delivered the next day with a newspaper. In this case, the ink layer can be cured completely, even in the case of leaving the ink layer to stand under room temperature.

Figure 2:
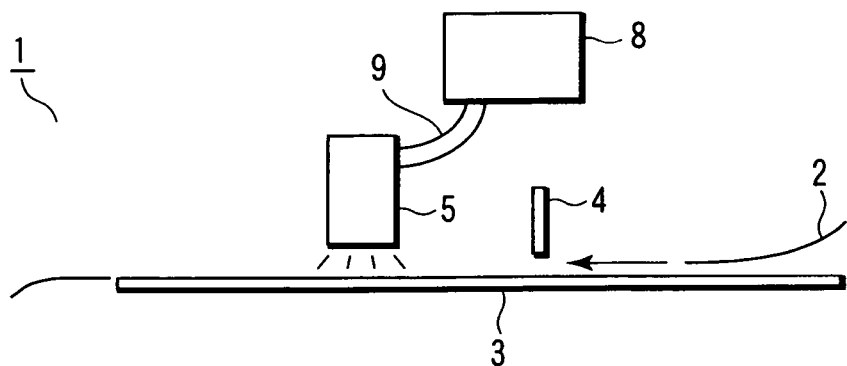
FIG. 2 schematically shows the construction of an ink jet recording apparatus according to another embodiment of the present invention.

FIG. 2 exemplifies the construction of the ink jet recording apparatus 1 in which the ink layer is heated by utilizing the light source 5 as a heat source. In the ink jet recording apparatus 1 shown in the drawing, an air blower 8 for supplying a gaseous material (air) is connected to the light source 5 with an air blowing hose (a gaseous material passage) 9 interposed therebetween. The gaseous material supplied from the air blower 8 is heated by the heat exchange when the gaseous material passes through the light source 5, and the heated gaseous material is supplied onto the ink layer formed on the recording medium 2. It follows that the ink layer is heated simultaneously when the ink layer is irradiated with light.

Figure 3:
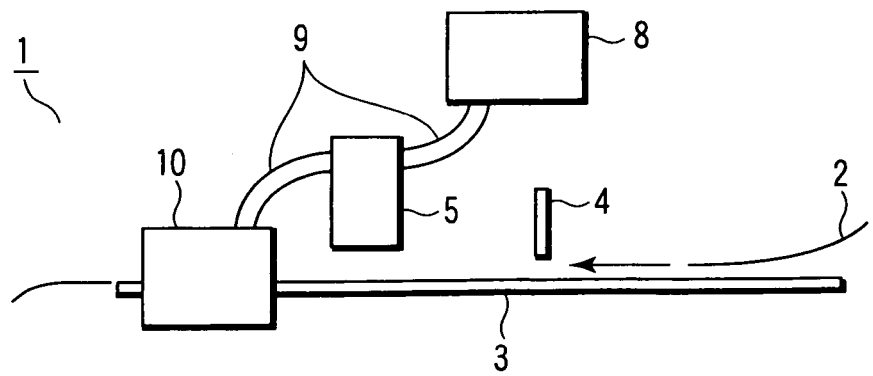
FIG. 3 schematically shows the construction of an ink jet recording apparatus according to another embodiment of the present invention.
Figure 4:
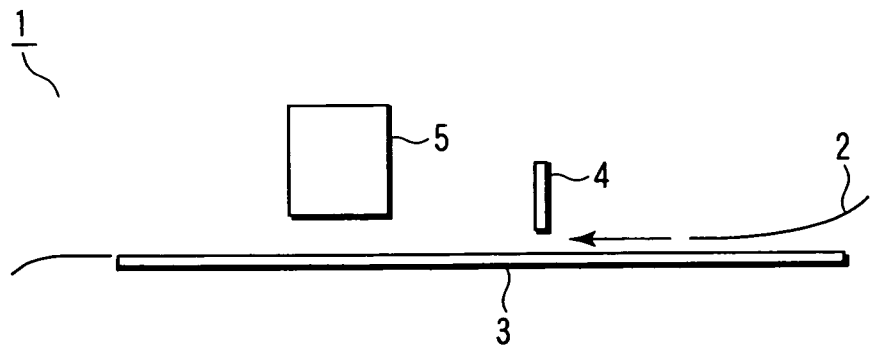
FIG. 4 schematically shows the construction of an ink jet recording apparatus according to another embodiment of the present invention.
Figure 5:
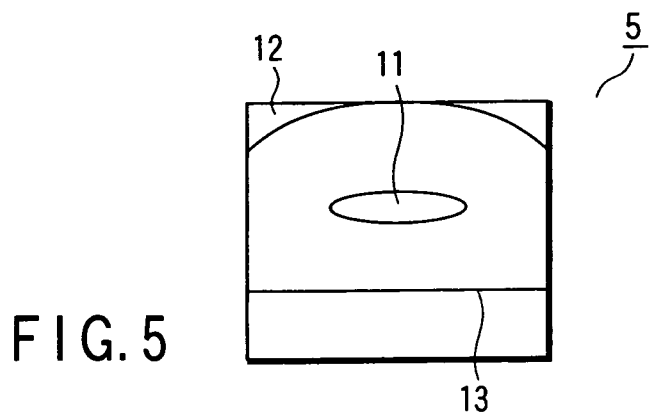
FIG. 5 schematically shows the construction of a light source.

The ink jet recording apparatus shown in FIG. 2 can be modified as shown in FIG. 3. In the ink jet recording apparatus 1 shown in FIG. 3, a heating hood 10 into which the gaseous material after the heat exchange is introduced is arranged to communicate with the light source 5 via the air blowing hose 9. The recording medium 2 bearing the ink layer after the light irradiation is transferred into the heating hood 10, with the result that the ink layer is heated. In the case of employing the particular construction, the ink layer can be heated by efficiently utilizing the gaseous material after the heating.

Where the light source 5 generates an infrared ray together with the visible light, it is possible to use the infrared ray directly as the heat source. FIG. 4 exemplifies the system of the ink jet recording apparatus of the particular construction. In the ink jet recording apparatus shown in the drawing, the light source 5 that also performs the function of a heat source is arranged downstream of the recording head 4. FIG. 5 is a cross sectional view schematically showing the construction of the light source 5.

As shown in FIG. 5, a reflecting plate 12 capable of reflecting not only the ultraviolet light but also the infrared ray is arranged above a lamp 11, and a window 13 that permits transmitting the ultraviolet light and the infrared ray is arranged below the lamp 11. The ink layer formed on the recording medium is irradiated directly with the infrared ray generated from the light source 5 so as to heat the ink layer. The heating effect can be sufficiently enhanced by using in combination the infrared ray reflecting plate 12 and the window 13 permitting the transmission of the infrared ray and the ultraviolet light. However, it is possible to use any one of the infrared ray reflecting plate 12 and the window 13.

The heating by the heating means can be performed within a container housing a plurality of recording media after the light irradiation.

Figure 6:
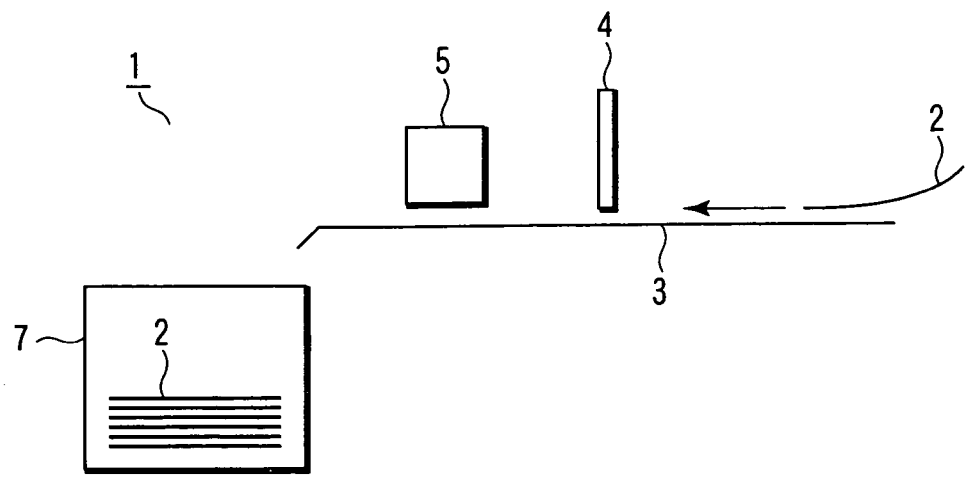
FIG. 6 schematically shows the construction of an ink jet recording apparatus according to another embodiment of the present invention.

FIG. 6 schematically shows the construction of an ink jet recording apparatus according to another embodiment of the present invention. The ink jet recording apparatus 1 shown in the drawing is substantially equal in construction to the ink jet recording apparatus 1 shown in FIG. 1, except that a heater is arranged within a container 7 in the apparatus 1 shown in FIG. 6.

The container 7 is capable of housing a plurality of recording media 2 after the light exposure step and is also capable of allowing the recording medium 2 after the light exposure step to be maintained for a certain time at a temperature not lower than, for example, about 40° C., desirably at a temperature falling within a range of about 50° C. and 120° C., and more desirably between about 60° C. and 100° C. or between about 50° C. and 80° C.

In the apparatus 1 of the construction shown in FIG. 1, the heater 6 is arranged in the transferring route of the recording medium 2 and, thus, it is difficult to heat the individual recording medium 2 for a long time. In the apparatus 1 shown in FIG. 6, however, the heater is housed in the container 7 and, thus, the individual recording media 2 can be heated easily for a long time. In addition, since plural recording media 2 can be collectively heated within the container 7, this construction is advantageous in view of power consumption, too. Further, where the individual recording media 2 can be heated for a long time, an additional advantage can be obtained as described below.

Specifically, it is possible for the re-fluidization of the ink layer to increase due to heating at a high temperature for a short time, which deteriorates the printed image, and this depends on the recording medium 2 and the liquid ink used. Since the deterioration of the printed image is derived from the re-fluidization of the ink layer under high temperatures, it is possible to prevent the deterioration of the printed image by heating the ink layer under a relatively low temperature for a long time. For example, it is possible to cure substantially completely the ink layer without bringing about the deterioration of the printed image by maintaining the recording medium 2 after the light exposure at the temperature of about 50° C. to 80° C. for at least several minutes within the container 7.

It is desirable to provide the container 7 with a discharge mechanism for successively discharging to the outside the recording medium 2 held heated for a prescribed time. The time during which the recording medium 2 is kept heated can be determined in accordance with, for example, the heating temperature of the liquid ink used. Where the heating temperature is set at, for example, 50° C. to 100° C., it is desirable to set the heating time at about 0.5 to 10 minutes. On the other hand, where the heating by the heater is not carried out, it is possible to set the heating time during which the recording medium 2 is kept heated for several hours.

It is possible to arrange further the heater 6 upstream of the container 7, as shown in FIG. 1. Where the curing of the ink layer does not proceed sufficiently before the recording medium 2 is transferred into the container 7, plural recording media 2 may contact each other within the container 7, which causes disturbance of the printed image. In the case of arranging the heater 6 upstream of the container 7, it is possible to suppress the disturbance of the printed image, because individual recording media 2 are heated by the heater 6 before the recording media 2 are housed in the container 7.

Figure 7:
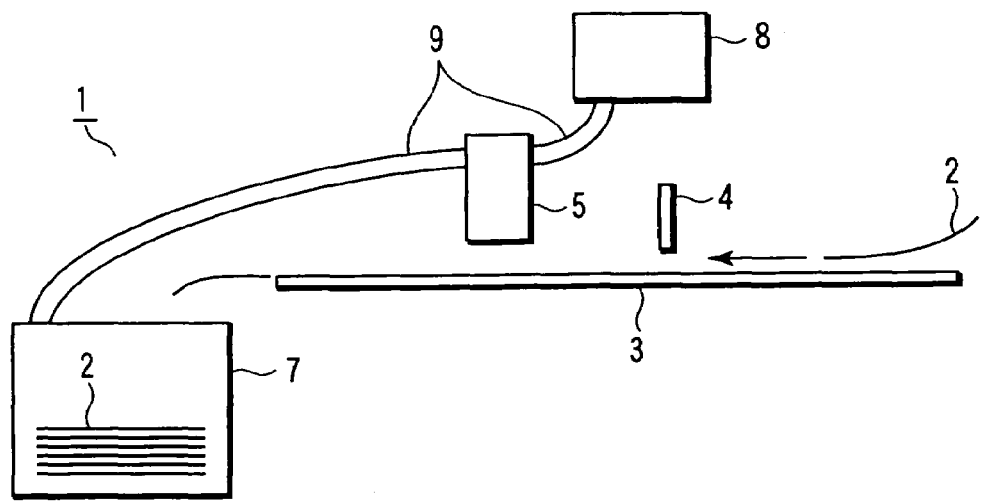
FIG. 7 schematically shows the construction of an ink jet recording apparatus according to another embodiment of the present invention.

FIG. 7 exemplifies another construction of the ink jet recording apparatus 1 in which the ink layer is heated within the container 7. In the ink jet recording apparatus 1 shown in the drawing, the air blower 8 is connected to the light source 5 via the air blowing hose 9 so as to carry out heat exchange of the air. The air from the heat exchange is introduced through the air blowing hose 9 into the container 7 into which light irradiated recording media are transferred. In this fashion, the ink layer can be heated by the heated air within the container 7.

Figure 8:
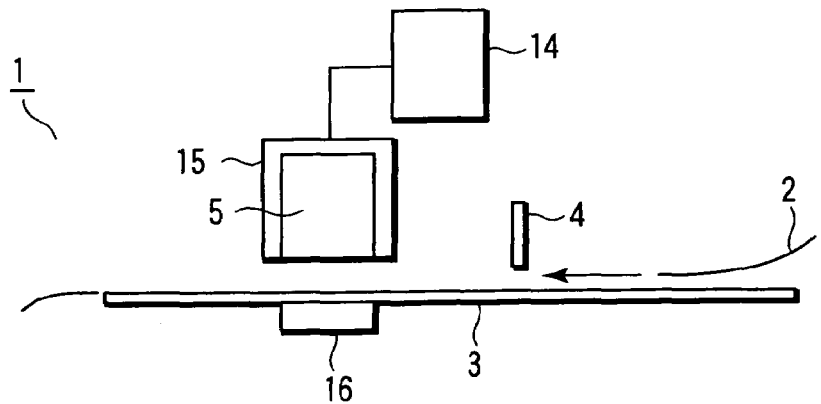
FIG. 8 schematically shows the construction of an ink jet recording apparatus according to another embodiment of the present invention.

FIG. 8 shows the construction of the ink jet recording apparatus 1 according to another embodiment of the present invention. In the ink jet recording apparatus 1 shown in the drawing, used is a light source 5 that is caused to emit light by a high frequency electromagnetic wave. The light source 5 is covered with an electromagnetic shield 15, which is connected to a high frequency generating apparatus 14, except the surface facing the transfer member 3. A heat generating medium 16, which generates heat upon exposure to the high frequency electromagnetic wave, is arranged on the back side of the region of the transfer member 3 which faces the light source 5. It is not absolutely necessary for the electromagnetic shield to be positioned around the bulb. It is possible for the entire apparatus to be covered with the electromagnetic shield, depending on the situation. It is possible for the heat generating medium 16 to be formed of, for example, a microwave inducing heat generating body, a ceramic material, a microwave inducing heat generating silicone resin, or a boiling mechanism. Also, where such a ceramic material or a silicone resin is finely pulverized and the pulverized powdery material is contained in the liquid ink, heat is generated from the ink itself and, thus, the heat generating medium 16 can be omitted.

The high frequency electromagnetic wave generated from the high frequency generating means 14 permits the light source 5 to emit light, and the heat generating means 16 is irradiated with the high frequency electromagnetic wave generated from the high frequency generating means 14. As a result, heat is generated from the heat generating medium 16 so as to heat the ink layer formed on the recording medium 2 via the transfer member 3.

Incidentally, where the transfer member 3 is formed of a material that is caused to generate heat by the high frequency, the transfer member 3 performs the function of the heat generating medium 16. It follows that it is not absolutely necessary to arrange separately the heat generating medium 16 on the back side of the transfer member 3 as shown in FIG. 8. A magnetron used in an ordinary electronic cooking stove can be used suitably as the high frequency generating means. The high frequency generated in this case has a typical frequency of about 2.45 GHz, and the input power is about 0.3 kW. The light source available on the market, which is constructed as described above, includes, for example, the Light Hammer Series, manufactured by Fusion UV System Inc.

Figure 9:
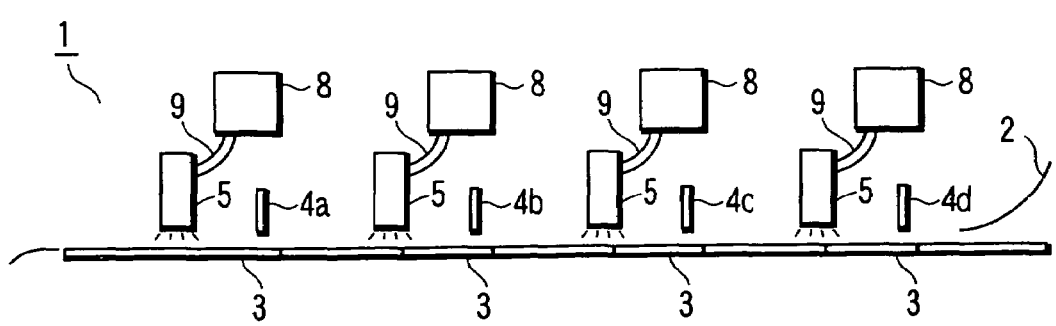
FIG. 9 schematically shows the construction of an ink jet recording apparatus according to another embodiment of the present invention.

It is possible for the ink jet recording apparatus according to the embodiment of the present invention to be provided with a plurality of recording heads capable of spurting liquid inks having different colors, so as to make the recording apparatus adapted for color printing. FIG. 9 exemplifies the construction of an ink jet recording apparatus 1 adapted for color printing.

In the ink jet recording apparatus 1 shown in the drawing, arranged are four recording heads 4a, 4b, 4c and 4c capable of spurting liquid inks of different colors, i.e., a cyan liquid ink, a yellow liquid ink, a magenta liquid ink and a black liquid ink. Arranged immediately downstream of each of the recording heads is the light source 5 that is connected to the air blower 8 via the air blowing hose 9 as already described. Therefore, if the liquid ink is spurted from the recording head so as to form an ink layer on the recording medium 2, the light irradiation and/or the heating is applied to each ink layer. The particular construction is desirable because it is possible to markedly suppress the nonuniformity of the color caused by the mixing of the inks of different colors. It should be noted, however, that some of the inks containing an aromatic oxetane compound or an aromatic vinyl ether compound can be sufficiently cured by the light irradiation alone in some cases. In such a case, it is not absolutely necessary to apply the heating every time the ink is spurted and the light exposure treatment is applied to the formed ink layer. In other words, it is possible to apply the heating collectively in the final step.

Figure 10:
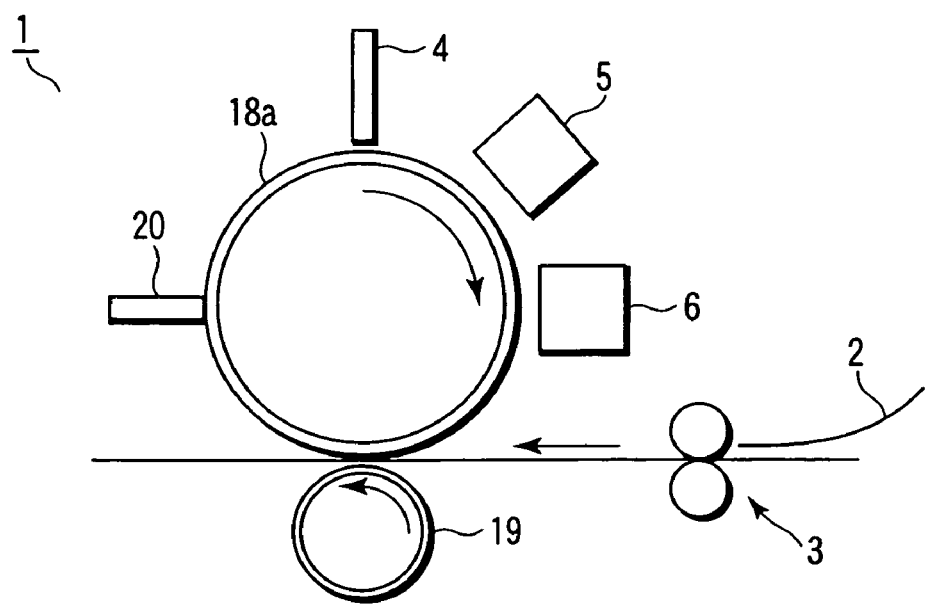
FIG. 10 schematically shows the construction of an ink jet recording apparatus according to another embodiment of the present invention.

FIG. 10 schematically shows the construction of an ink jet recording apparatus 1 according to another embodiment of the present invention. The ink jet recording apparatus 1 shown in the drawing comprises a drum 18a acting as an image carrier. The drum 18a can be rotated by a driving mechanism (not shown) in the clockwise direction in the drawing. Arranged around the drum 18a are a recording head 4, a light source 5, a heater 6 used as a heating means, a transfer roller 19 used as a transfer mechanism, and a cleaner 20 in the order mentioned in the clockwise direction. Further, a transfer member 3 is arranged to permit the recording medium 2 to be inserted through the clearance between the drum 18a and the transfer roller 19.

It is desirable for that surface of the drum 18a which faces the recording head 4, etc., i.e., the image carrying surface, to be formed of a material having a sufficient resistance to the ink, pressure, light and heat and capable of realizing a sufficient releasability for transfer of the image onto the recording medium 2. The material meeting the particular requirement includes, for example, a metal and polytetrafluoro ethylene. Also, it is possible to form a layer containing a photo catalyst, such as $TiO_2$, on the image carrying surface of the drum 18a. In this case, the hydrophilic nature can be increased in the light irradiation stage so as to enhance the freedom of controlling the wet-ability and the releasability. Also, in order to improve the ink-holding capability and the releasability, it is desirable to use a sheet of Teflon or its derivative, preferably a PTFE porous sheet, on the image carrying surface of the drum 18a.

The transfer roller 19 applies pressure, typically both pressure and heat, to the drum 18a with the recording medium 2 interposed therebetween so as to transfer the ink layer from the drum 18a onto the recording medium 2. In general, a heat generating body is housed in the transfer roller 19 so as to heat the recording medium 2 in the transferring stage of the ink layer such that the highest temperature reached by the recording medium 2 is not higher than 200° C., preferably falls within a range of between about 60° C. and 180° C. Where a heat generating body is housed in the transfer roller 19, the transfer roller 19 plays the role of promoting the curing of the ink layer.

Where the ink layer immediately after the transferring stage is not sufficiently cured, it is desirable to arrange further a heater in the transfer roller 19 on the downstream side of the transfer route. Alternatively, it is desirable to utilize the container 7 housing a heater as already described.

It is not absolutely necessary to arrange the cleaner 20. However, in the case of arranging the cleaner 20, it is possible to clean the image carrying surface of the drum 18a. It follows that it is possible to obtain a print of a higher quality. It is possible to use, for example, a squeegee or a wiper as the cleaner 20.

The construction shown in FIG. 10 can be modified in various fashions. For example, it is possible to use a plurality of drums 18a in combination in order to avoid the interference among the constituting members. Also, in order to cure without fail the ink layer transferred onto the recording medium 2, it is possible to arrange further the heater 6 shown in FIG. 1 and/or the container 7 housing a heater, which is shown in FIG. 6, in the ink jet recording apparatus 1 shown in FIG. 10. Further, it is possible to combine the light source 5 and the heater 6 so as to form an integral structure acting as both a light source and a heat source, as already described.

The operating conditions of the ink jet recording apparatus 1 shown in FIG. 10 are as follows.

Used is an aluminum drum 18a having a diameter of 250 mm, and the drum 18a is rotated at a peripheral speed of 25 m/min. The recording head 4 is capable of spurting ink droplets of about 40 pL at a dot density of 300 dpi. An F300 type UV light source manufactured by Fusion UV Systems Inc. is used as the light source 5. The central wavelength of the light source 5 is 360 nm, and the output of the light source 5 is 150 W/cm. A halogen lamp heater QIR-105 type manufactured by Nippon Heater K.K. is used as the heater 6. The maximum value of the radiation energy spectrum of the heater 6 falls within a range of between 0.9 µm and 1.6 µm. The lamp has the output of 500 W, the length of 225 mm, the effective length of 155 mm, and the diameter of 10 mm.

Figure 11:
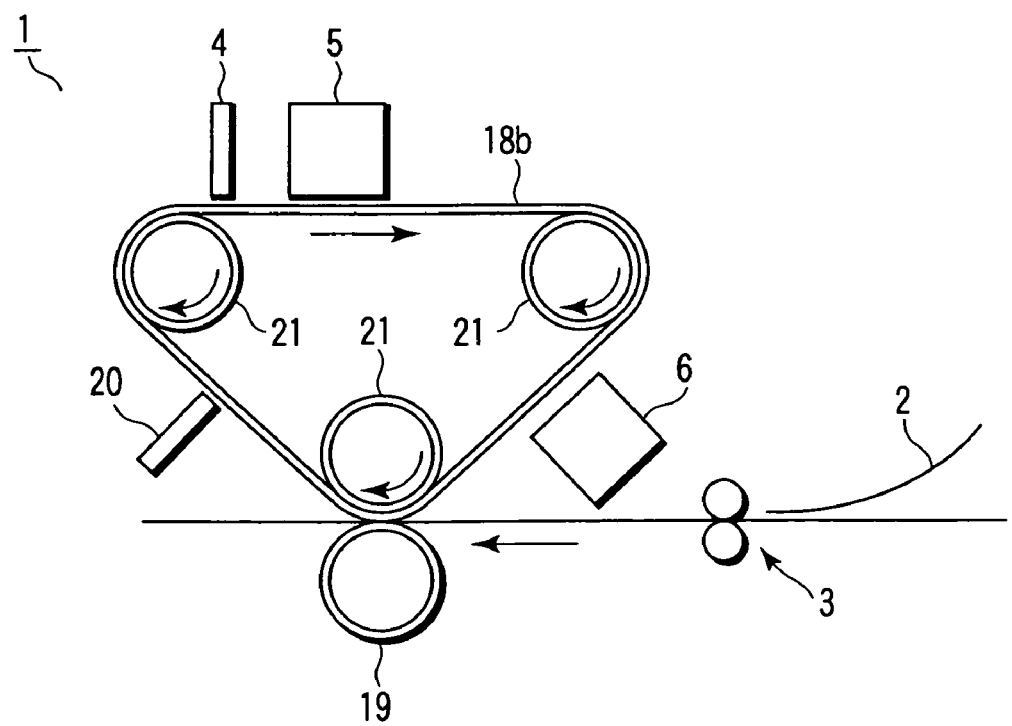
FIG. 11 schematically shows the construction of an ink jet recording apparatus according to still another embodiment of the present invention.

FIG. 11 schematically shows the construction of an ink jet recording apparatus 1 according to still another embodiment of the present invention. The ink jet recording apparatus 1 shown in the drawing comprises an endless belt 18b as an image carrier. The endless belt 18b is stretched among a plurality of rollers 21. The rollers 21 can be rotated in the clockwise direction in the drawing by a driving mechanism (not shown). In accordance with rotation of these rollers 21, the endless belt 18b is rotated in the clockwise direction in the drawing. Arranged around the endless belt 18b are a recording head 4, a light source 5, a heater 6, a transfer roller 19 acting as a transfer mechanism, and a cleaner 10 in the order mentioned in the clockwise direction. Further, a transfer member 3 is arranged to permit the recording medium 2 to be transferred through the clearance between the endless belt 18b and the transfer roller 19.

It is desirable for that surface of the endless belt 18b which faces the recording head 4, etc., i.e., the image carrying surface, to be formed of a material having a sufficient resistance to the ink, pressure, light and heat and capable of realizing a sufficient releasability for transfer of the image onto the recording medium 2. The material meeting the particular requirement includes, for example, a metal and polytetrafluoro ethylene. Also, it is possible to form a layer containing a photo catalyst such as $TiO_2$ on the image carrying surface of the endless belt 18b. In this case, the hydrophilic nature can be increased in the light irradiation stage so as to enhance the freedom of controlling the wettability and the releasability.

In the case of using the endless belt 18b as an image carrier, it is possible to make a part of the image carrying plane flat. As a result, it is possible to arrange easily a plurality of recording heads 4 in series and to incline the recording head 4 in the rotating direction. Also, even in the case where the perimeter of the endless belt 18b is large, the recording head 4 and the other members can be arranged relatively freely by arranging the rollers 21 appropriately. It follows that the degree of freedom in the design is improved in the case of using the endless belt 18b as the image carrier.

The construction shown in FIG. 11 can be modified in various fashions. For example, it is possible to use a plurality of endless belts 18b in combination in order to avoid the interference among the constituting members. Also, in order to cure without fail the ink layer transferred onto the recording medium 2, it is possible to provide the apparatus 1 shown in FIG. 11 with the heater 6 shown in FIG. 1 and/or the container 7 having a heater housed therein, which is shown in FIG. 6.

The operating conditions, etc., of the ink jet recording apparatus 1 shown in FIG. 11 will now be described.

Used is a stainless steel endless belt 18b having a perimeter of 760 mm. The peripheral speed of the endless belt 18b is set at 25 m/min. Used is a recording head 4 capable of spurting ink droplets of about 40 pL in a dot density of 300 dpi. Further, used as the light source 5 and the heater 6, respectively, are F300 type UV light source manufactured by Fusion UV Systems Inc. and a halogen lamp heater QIR-105 type manufactured by Nippon Heater K.K., which were referred to previously in conjunction with FIG. 10.

The heater 6 is used as the heating means in the ink jet recording apparatus shown in each of FIGS. 10 and 11. However, the heating means is not limited to the heater 6. As already described, it is possible to utilize the light source 5 as a heat source by employing various techniques. It is also possible to arrange a plurality of recording heads capable of spurting liquid inks of different colors so as to achieve a multi-color recording. The plural recording heads can be arranged in series in, for example, the rotating direction of the image carrier. In this case, a light source and a heating means are arranged immediately downstream of each of the recording heads. Alternatively, it is possible to arrange a plurality of recording heads in the same position and to arrange a single light source and a single heating means. To be more specific, the liquid ink of a first color is spurted from a single recording head so as to form an ink layer, followed by irradiating the ink layer with light and heating the ink layer. Then, the image carrier is rotated, and the liquid ink of a second color is spurted so as to form an ink layer, followed by carrying out the light irradiation and the heating by using the same light source and heating means. The operation described above is repeated a desired number of times so as to form a desired number of ink layers, and the light irradiation and heating are applied so as to form a colored ink layer. What should be noted is that some of the inks exhibit a high photo-curing performance as described previously. In such a case, it is possible to carry out collectively the heating treatment after the printing and light exposure treatments for each color. Further, where an image is printed on, for example, an absorbing medium, the color mixing can be markedly suppressed. Therefore, it is possible to spurt simultaneously a plurality of liquid inks differing from each other in color, followed by applying the light exposure and heating treatments to the ink layer forming a full color image so as to achieve a full color printing. The liquid ink according to one embodiment of the present invention is advantageous in this respect, too, because the permeating ink can also be cured sufficiently.

In the ink jet recording apparatus 1 described above, a mechanism for transferring the recording medium 2 is arrange for moving the recording medium 2 relative to the recording head 4, etc. Alternatively, it is possible to move the recording head 4, etc. while maintaining stationary the recording medium 2. It is also possible to move both the recording medium 2 and the recording head 4, etc. The construction to permit the recording head 4, etc. to be moved is advantageous for the formation of an ink image on a three dimensional recording medium 2 such as a bottle or a can. Further, the apparatus 1 described above can be utilized not only as a printing machine but also as a copying machine.

As described previously, it is possible for the pigment used in the liquid ink according to the embodiment of the present invention to exhibit the color developing and coloring properties and other properties such as the magnetic properties, fluorescent properties, electrical conductivity, dielectric properties, and electromagnetic heat generating properties. In the case of using a liquid ink containing the particular pigment, it is possible to impart various functions to the printed material. Some examples will now be described.

A first example covers the case where the liquid ink contains a pigment exhibiting magnetic properties. In this case, prepared is a liquid ink containing a powdery pigment exhibiting magnetic properties. The particular liquid ink can be obtained by adding a magnetic powder such as a powdery material of iron, cobalt, nickel, an alloy thereof or an oxide thereof to the solvent described previously together with a photo acid generating agent and a high molecular weight compound or a high molecular weight powdery material for improving the dispersion capability.

In the next step, the liquid ink is spurted onto a recording medium in a manner to depict a pattern such as a bar code pattern. After the spurting of the liquid ink, the resultant ink layer is promptly irradiated with light such as ultraviolet light. The irradiation amount, which can be determined in accordance with the pigment content of the liquid ink and the photosensitivity of the liquid ink, is generally hundreds of mJ to one thousand and hundreds of mJ. The viscosity and the fluidity of the ink layer are lost even under the state immediately after the light irradiation. However, the ink layer can be cured completely if the ink layer is put in a container in which the temperature is controlled to fall within a range of between room temperature and 60° C. Since the cured ink layer is allowed to exhibit magnetic properties in this fashion, it is possible to read the secondary information other than the image information by a magnetic detection mechanism such as the magnetic head.

A second example covers the case where the liquid ink contains an electrically conductive pigment. In this case, prepared is a liquid ink containing as a pigment a powdery material exhibiting an electrical conductivity. This liquid ink can be prepared by adding to the solvent described previously a conductive pigment such as a powdery material of silver, gold, copper, aluminum, carbon, nickel, iron, cobalt, lead, tin, antimony, an alloy of some of these metals, and a composite body containing the powdery material and an organic material together with a photo acid generating agent and high molecular weight compound or a high molecular weight powdery material for improving the dispersion capability. In order to decrease the amount of the resin contained in the ink layer that is obtained finally so as to increase the electrical conductivity of the ink layer, it is possible to decrease the amount of the polymerizable compound contained in the liquid ink and to add an organic solvent to the liquid ink.

In the next step, the liquid ink is spurted onto a recording medium such as an insulating substrate in a manner to depict a pattern such as a wiring pattern. After the spurting of the ink, the resultant ink layer is promptly irradiated with light such as ultraviolet light. The irradiation amount, which can be determined in accordance with the pigment content of the liquid ink and the photosensitivity of the liquid ink, is generally hundreds of mJ to one thousand and hundreds of mJ. The viscosity and the fluidity of the ink layer are lost even under the state immediately after the light irradiation. However, the ink layer can be cured completely if the ink layer is put in a container in which the temperature is controlled to fall within a range of between room temperature and 60° C. Also, if heat and pressure are applied to the ink layer, the electrical conductivity can be further increased. Further, in the case where a powdery alloy having a relatively low melting point is used as the conductive pigment, it is possible to obtain a conductive pattern by heating the ink layer to the fluidizing temperature. The printed pattern thus obtained exhibits an electrical conductivity and, thus, can be used as a circuit pattern or a resistance pattern.

Further, in the case of using a liquid ink containing as a pigment a dielectric powder such as a powdery material of barium, lead, bismuth, iridium, ruthenium, tantalum, platinum, titanium, strontium, chromium, an alloy thereof, an oxide thereof or a ceramic powder, it is possible to form the dielectric layer for a capacitor or an inductor. In this case, the characteristics can be improved depending on the situation by applying calcination after the pattern formation. Also, in the case of using a liquid ink containing a pigment producing a photo catalytic function or a bactericidal action such as a titanium oxide powder, it is possible to form a printed pattern producing such functions. The electromagnetic heat generating powder includes, for example, an electromagnetic heat generating ceramic material and a silicon resin and can be used for the selective heating of the printed portion by the electromagnetic wave. Such a powder can be used for improving the general electromagnetic heating performance of the liquid ink according to the embodiment of the present invention.

Further, an overlapping printing can be achieved and a printed pattern having a relatively large thickness can be formed by utilizing appropriately the techniques described above in conjunction with the embodiments of the present invention. To be more specific, prominent effects can be obtained by repeating several times the spurting of the liquid ink onto a prescribed region of the recording medium and the curing of the resultant ink layer. For example, it is possible to correct partially the printed image, to form an image having an embossed portion that permits the image recognition by the tactual sense, to form a printed patter for a handicapped person such as raised letters, to form a printed pattern with varied thicknesses conforming with contour lines such as a map, and to form a part of a device having a thickness not smaller than scores of micrometers.

The embodiments of the present invention will now be described more in detail with reference to Examples of the present invention.

EXAMPLE I

Example I-1

Compositions a1 to j1 were prepared by mixing acid polymerizable compounds (and resins) Ep1 to Ep16 given below, i.e., compounds polymerizable in the presence of an acid, in the mixing ratio given in Table 1:

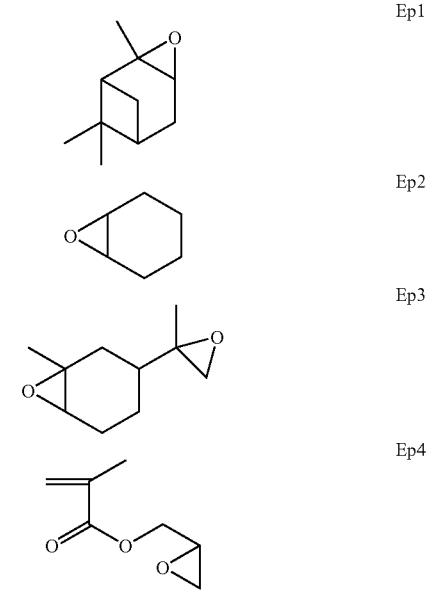

-continued

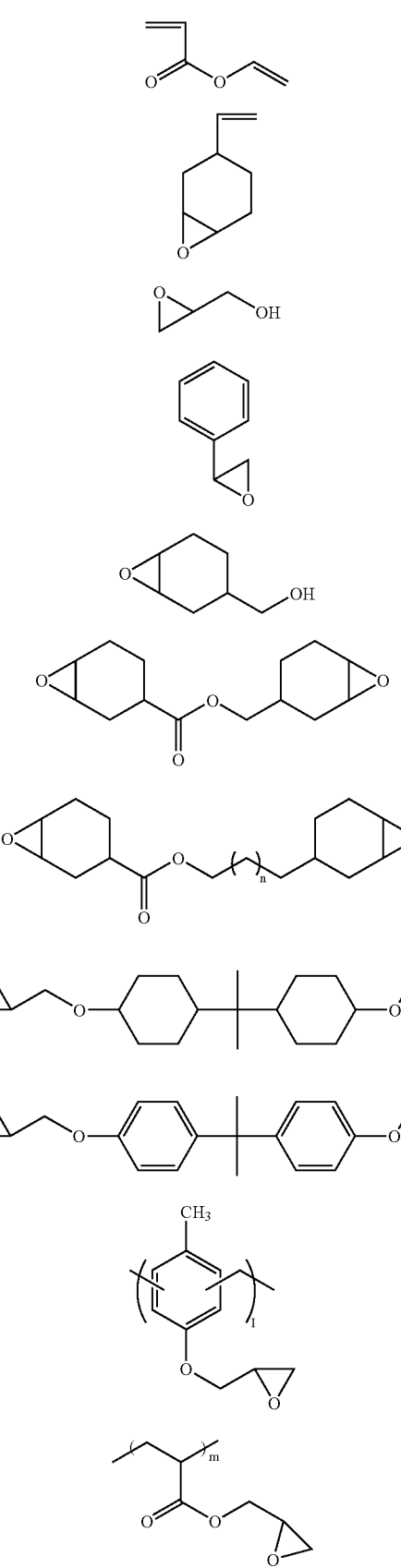

Ep5

Ep6

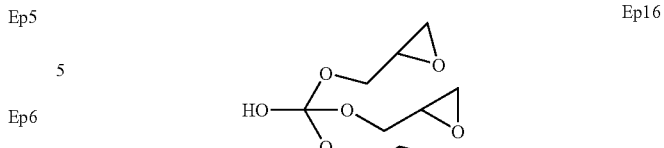

Ep7

Ep8

Ep9

Ep10

Ep11

Ep12

Ep13

Ep14

Ep15

Each of l, m and n in the general formulas given above denotes an integer falling within a range of between 1 and 20.

TABLE 1

| Epoxy composition | Epoxy compounds (% by weight) | | | |
|---|---|---|---|---|
| a1 | Ep3(100) | | | |
| b1 | Ep3(87.5) | Ep11(12.5) | | |
| c1 | Ep3(80) | Ep11(10) | Ep16(10) | |
| d1 | Ep2(70) | Ep10(20) | Ep12(10) | |
| e1 | Ep1(80) | Ep9(10) | Ep16(10) | |
| f1 | Ep7(50) | Ep3(30) | Ep10(10) | Ep16(10) |
| g1 | Ep3(40) | Ep8(30) | Ep13(10) | Ep14(10) |
| h1 | Ep3(40) | Ep4(40) | Ep11(12.5) | Ep15(7.5) |
| i1 | Ep6(50) | Ep3(30) | Ep11(10) | Ep16(10) |
| j1 | Ep5(30) | Ep3(40) | Ep12(20) | Ep15(10) |

A pigment and a photo acid generating agent were added to each of the compositions a1 to j1 by the prescriptions shown in Table 2 below, and a dispersion treatment was applied for 24 hours by using a paint shaker. The mixture after the dispersion treatment was filtered by using a PTFE filter of 5 μm so as to obtain liquid inks (1) to (20).

TABLE 2

| Liquid ink | Epoxy composition | Pigment (% by weight) | Acid generating agent solution (% by weight) |
|---|---|---|---|
| (1) | a1 | BL(5%) | PAG5(8%) |
| (2) | b1 | BL(5%) | PAG5(8%) |
| (3) | c1 | BL(5%) | PAG5(8%) |
| (4) | d1 | BL(5%) | PAG5(8%) |
| (5) | e1 | BL(5%) | PAG5(8%) |
| (6) | f1 | BL(5%) | PAG5(8%) |
| (7) | g1 | BL(5%) | PAG5(8%) |
| (8) | h1 | BL(5%) | PAG5(6%) + Iruga cure(2%) |
| (9) | i1 | BL(5%) | PAG5(8%) |
| (10) | j1 | BL(5%) | PAG5(6%) + Iruga cure(2%) |
| (11) | b1 | Y(5%) | PAG5(8%) |
| (12) | b1 | C(5%) | PAG5(8%) |
| (13) | b1 | M(5%) | PAG5(8%) |
| (14) | b1 | BL(5%) | PAG5(4%) |
| (15) | b1 | BL(5%) | PAG5(16%) |
| (16) | b1 | BL(5%) | PAG1(8%) |
| (17) | b1 | BL(5%) | PAG2(8%) |
| (18) | b1 | BL(5%) | PAG3(8%) |
| (19) | b1 | BL(5%) | PAG4(8%) |
| (20) | b1 | BL(10%) | PAG5(8%) |

Incidentally, carbon black, C.I. Pigment Yellow 128, C.I. Pigment Blue 15 and C.I. Pigment Red 123 were used as a black pigment, a yellow pigment, a cyan pigment and a magenta pigment, respectively. In each of these cases, a mill base was prepared by kneading the pigment in advance, and the mill base thus prepared was added to the epoxy composition together with 200 ppm of a nonionic surfactant manufactured by Sumitomo 3M Inc. Incidentally, a dispersant available on the market, i.e., Ajisper (trade name, manufactured by Ajinomoto Fine Technology Inc.) was added to the epoxy composition depending on the dispersion capability.

Compounds represented by chemical formulas given below were used as optical acid generating agents PAG1 to PAG4, and the photo acid generating agent was added in the form of a solution prepared by dissolving the photo acid generating agent in propylene carbonate in a concentration of 50%:

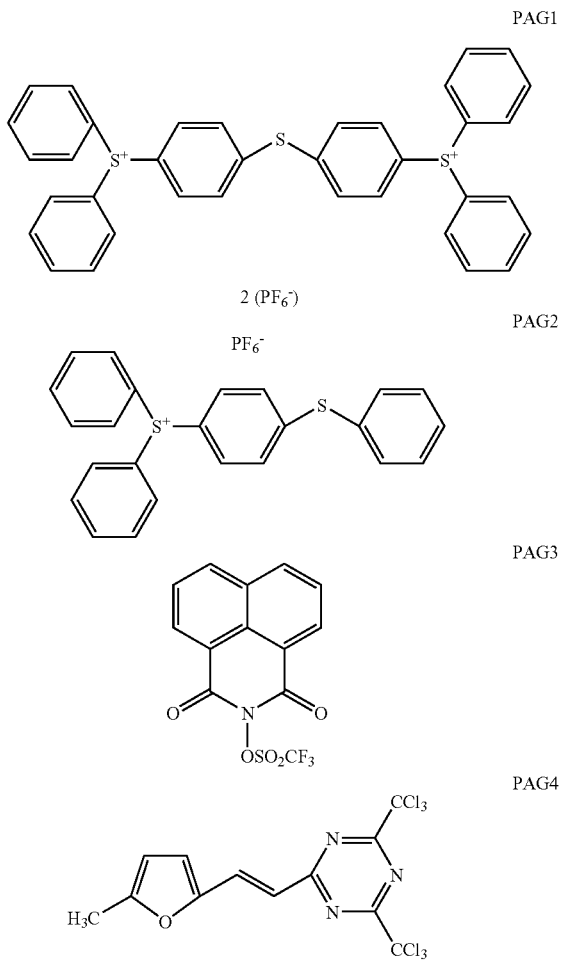

A solution "UVACURE 1591" manufactured by Dicel UCB Inc. was used as PAG5, which is a solution prepared by dissolving a mixture of PAG1 and PAG2 in propylene carbonate in a concentration of 50%.

For comparison, prepared was a photo radical generation type liquid ink. To be more specific, mixed were 5 parts by weight of isobornyl acrylate, 25 parts by weight of tripropylene glycol diacrylate and 15 parts by weight of trimethylol propane ethoxylate triacrylate. Then, added to the resultant mixture were 5 parts by weight of Irugacure (No. 2959, manufactured by Nagase Sangyo K.K.), 5 parts by weight of carbon black pigment, and traces of acrylic dispersant and surfactant. The mixture thus obtained was subjected to a dispersion treatment for 5 hours by using a homogenizer, followed by filtering the homogenized mixture by using a PTFE filter of 5 μm. The photo radical generation type liquid ink thus obtained is called herein liquid ink (21).

Further, a solid ink was also prepared for comparison. To be more specific, paraffin having an average molecular weight of 3000 was melted by heating, and a carbon black pigment was added to the molten paraffin, which was held at 100° C., together with traces of acrylic dispersant and surfactant. The mixture thus obtained was subjected to a dispersion treatment for 5 hours at 100° C. by using a homogenizer equipped with a heating member. The resultant composition was filtered under a heated state of 100° C. by using a porous glass filter of 5 μm, followed by cooling the filtrate so as to obtain a solid ink, which is called herein liquid ink (22).

The performance test for each of liquid inks (1) to (21) was carried out by using the ink jet recording apparatus 1 shown in each of FIGS. 1 and 6. An ordinary lustrous paper sheet was used as the recording medium 2, and an ultra high pressure mercury lamp having an output of 230 W was used as the light source 5. The temperature of the spurting head was kept at 45° C.

The pencil hardness of the ink layer and the print quality were measured as the performance of the liquid inks (1) to (21). Table 3 shows the results together with the light exposure amount.

TABLE 3

| Liquid ink | Light exposure amount (mJ/cm$^2$) | Pencil hardness | | | | Print quality etc. |
| | | Immediately after light exposure | Container | Left to stand at room temperature | Heat roller | |
|---|---|---|---|---|---|---|
| (1) | 340 | B | H | H | collapsed | blurred |
| (2) | 450 | B | F | F | HB | particularly good |
| (3) | 500 | B | F | F | F | particularly good |
| (4) | 640 | 2B | HB | HB | HB | good |
| (5) | 750 | 2B | B | B | collapsed | blurred |
| (6) | 540 | B | H | H | HB | good |
| (7) | 340 | HB | H | H | H | print exhibited high resistance to solvent |
| (8) | 750 | B | F | F | F | paper exhibited resistance to base |
| (9) | 450 | B | F | F | F | good |
| (10) | 600 | B | F | F | HB | paper exhibited resistance to base |
| (11) | 350 | B | F | F | HB | particularly good |
| (12) | 400 | B | F | F | HB | particularly good |

TABLE 3-continued

| Liquid ink | Light exposure amount (mJ/cm$^2$) | Immediately after light exposure | Container | Left to stand at room temperature | Heat roller | Print quality etc. |
|---|---|---|---|---|---|---|
| | | Pencil hardness | | | | |
| (13) | 270 | B | F | F | HB | particularly good |
| (14) | 450 | 2B or less | B | F | B | blurred |
| (15) | 450 | 2B or less | B | B | B | |
| (16) | 350 | B | F | F | F | particularly good |
| (17) | 780 | B | F | F | F | particularly good |
| (18) | 800 | 2B or less | F | F | F | |
| (19) | 1000 | 2B or less | F | F | F | |
| (20) | 900 | B | F | F | F | good, thick |
| (21) | 1750 | not cured | not cured | not cured | not cured | |

The pencil hardness shown in Table 3 denotes the values measured for the ink layer under the conditions given below.

Immediately after light exposure: Ink layer immediately after the light exposure.

Container: The ink layer formed by using the printer shown in FIG. 6. After the light exposure, the ink layer was held at 80° C. for 3 minutes within the container.

Left to stand at room temperature: After the light exposure, the ink layer was left to stand at room temperature (25° C.) for 8 hours.

Heat roller: After the light exposure, the ink layer was heated by a heat roller heated to 160° C.

In the case of using the photo radical generation type liquid ink (21), it was impossible to cure the ink layer in spite of the situation that the light exposure amount was markedly increased, as shown in Table 3. In order to cure the ink layer with the light exposure rate of 1,000 mJ/cm$^2$, it was necessary to lower the pigment concentration in the liquid ink to 3% by weight. The pencil hardness in this case was HB, and the obtained print was light in color and exhibited a strong resin luster.

On the other hand, in the case of using any of the liquid inks (1) to (20), it was possible to cure the ink layer under a relatively low light exposure rate and under various heating conditions. The sensitivity of each of these liquid inks (1) to (20) was about 1.5 to 3 times as high as that of liquid ink (21). Also, in the case of using any of liquid inks (1) to (20), the resultant print was free from the resin luster inherent in the photosensitive ink and was satisfactory. Also, where the ink jet recording apparatus was constructed as shown in FIG. 7, it was possible to maintain the same temperature, and it was possible to obtain a performance substantially equal to that obtained in the case of using the ink jet recording apparatus constructed as shown in FIG. 6. In this case, it has been confirmed that the total power consumption of the system was lowered by about 0.5 to 1 kW, compared with the case of using the other heater.

In the next step, recording was performed on a mat paper sheet for an ink jet by using the ink jet recording apparatus 1 shown in FIG. 2 in order to test the performance of liquid ink (2). Included in the ink jet recording apparatus used was an air blowing apparatus capable of blowing air at a rate of 1 m$^3$/min.

As a result, it has been confirmed that liquid ink (2) was simultaneously heated under the light exposure rate of 500 mJ/cm$^2$ so as to cure the ink layer to a pencil hardness F and to obtain a curing performance substantially equal to that in the case of using a heat roller. In this case, the temperature of the recording plane was confirmed to have been elevated to 80° C. when the temperature elevation of the recording plane was confirmed by a thermal color change seal. Also, it has been confirmed that the total power consumption of the system was lowered by about 0.5 to 1 kW, compared with the case of using the other heater.

In the next step, recording was performed on a mat paper sheet for an ink jet by using the ink jet recording apparatus 1 shown in FIG. 3 in order to test the performance of liquid ink (2). Also, included in the ink jet recording apparatus used was an air blowing apparatus capable of blowing the air at a rate of 1 m$^3$/min.

As a result, it has been confirmed that liquid ink (2) was simultaneously heated under the light exposure rate of 540 mJ/cm$^2$ so as to cure the ink layer to a pencil hardness F and to obtain a curing performance substantially equal to that in the case of using a heat roller. In this case, the temperature of the recording plane was confirmed to have been elevated to 80° C. when the temperature elevation of the recording plane was confirmed by a thermal color change seal. Also, it has been confirmed that the total power consumption of the system was lowered by about 0.5 to 1 kW, compared with the case of using the other heater.

Further, recording was performed on an OHP sheet by using the ink jet recording apparatus 1 constructed as shown in FIG. 4. In the ink jet recording apparatus used, the heater 6 was stopped and, a structure prepared by detaching the cold mirror from the ordinary ultra high pressure mercury lamp having an output of 230 W was used as a light source. Also, arranged was an aluminum reflecting plate so as to permit the recording plane to be heated directly by an infrared ray emitted from the light source.

As a result, it has been confirmed that liquid ink (2) was simultaneously heated under the light exposure rate of 480 mJ/cm$^2$ so as to cure the ink layer to a pencil hardness F and to obtain a curing performance substantially equal to that in the case of using a heat roller. In this case, the temperature of the recording plane was confirmed to have been elevated to 120° C. when the temperature elevation of the recording plane was confirmed by a thermal color change seal. Also, it has been confirmed that the total power consumption of the system was lowered by about 0.5 to 1 kW, compared with the case of using the other heater.

In the next step, a performance test was applied to each of liquid inks (2) to (4), (6) and (8) to (13) by using the ink jet recording apparatus 1 constructed as shown in FIG. 10. In this case, the ink jet recording apparatus 1 used was provided with a container housing the recording medium 2 after the ink image transfer thereonto. An ordinary lustrous paper sheet was used as the recording medium 2, and an ultra high pressure mercury lamp having an output of 230 W was used as the light source 5. The pressure and the temperature in the transfer step were set at 10 kg/cm² and 120° C., respectively. The recording medium after the transfer step was housed in the container so as to be maintained at 80° C. for 3 minutes. As a result, the image quality before the transfer step was not deteriorated after the transfer step so as to support a good transfer in any of the cases. It has also been found that substantially the same transfer performance can be obtained in the case of using the ink jet recording apparatus constructed as shown in FIG. 11.

On the other hand, prepared were comparative inks by the same procedure as the inks (1) to (7) except that using 40% by weight of an aromatic novolak series epoxy compound, which is relatively low in its plasticity, i.e., Ep14, and 60% by weight of Ep8 used as a reactive solvent.

A transfer test was applied similarly to each of the comparative inks thus prepared by using the ink jet recording apparatus 1 constructed as shown in FIG. 10. The ordinary lustrous paper sheet was used as the recording medium 2, and the light exposure rate was controlled by throttling the output of the light source 5 such that the recording medium 2 would be irradiated with light at an irradiating rate of 200 mJ/cm² so as to render viscous the primarily cured ink layer. After the light exposure step, a transfer test was conducted under a pressure of 10 kg/cm² without applying heat, with the result that the transfer not performed uniformly. Further, printing was tried by using a colored ink having the same photosensitive composition, with the pigment alone changed to Y, C and M. The transfer performance was found to be different depending on the color, resulting in failure to achieve a uniform transfer.

Then, a continuous printing test was conducted by using a solid ink (liquid ink (22)). Used in this test was a solid ink jet printer manufactured by Hewlett-Packard Inc. It has been found that the nozzle was plugged in 30 minutes after start-up of the printing operation, resulting in failure to continue the printing operation.

Similarly, a continuous printing test was applied to each of liquid inks (1) to (20) by using the ink jet recording apparatus constructed as shown in FIG. 1, 6, 10 or 11. It has been found that no problem was generated in the printing even 500 hours after start-up of the printing operation.

Further, each of liquid inks (2) to (11), (12) and (13) was loaded in the printing head 5, and a color printing performance test was conducted by using the ink jet recording apparatus 1 constructed as shown in FIG. 9. The ink jet recording apparatus used in this test was constructed such that the air used for cooling the light source after transfer of each color was blown against the paper sheet. An OHP transparent film was used as the recording medium 2, and an ultra high pressure mercury lamp having an output of 230 W was used as each of the light sources 5. The recording medium was heated to 80° C., and the air was blown against the recording medium 2 at a blowing rate of about 1 m³/min so as to prevent the disturbance of the ink image. As a result, deterioration of the image quality caused by the mixing of the inks was not found after the printing, supporting that it was possible to perform the ink transfer satisfactorily. Further, in order to look into the effect produced by the cooling air, the cooling air for each of the light sources was shielded with a window material, and the printing was performed such that the recording medium was not heated. The recording medium after the printing was heated by using a hot plate so as to collectively cure the ink layers, with the result that the "mottle" phenomenon, i.e., the phenomenon that various colors are mixed irregularly, was produced. In other words, it has been confirmed that the image is rendered nonuniform.

EXAMPLE I-2

In the first step, compositions aa to ap were prepared by mixing acid polymerizable compounds (and resins) Ep21 to Ep38 given below in the mixing ratios shown in Table 4:

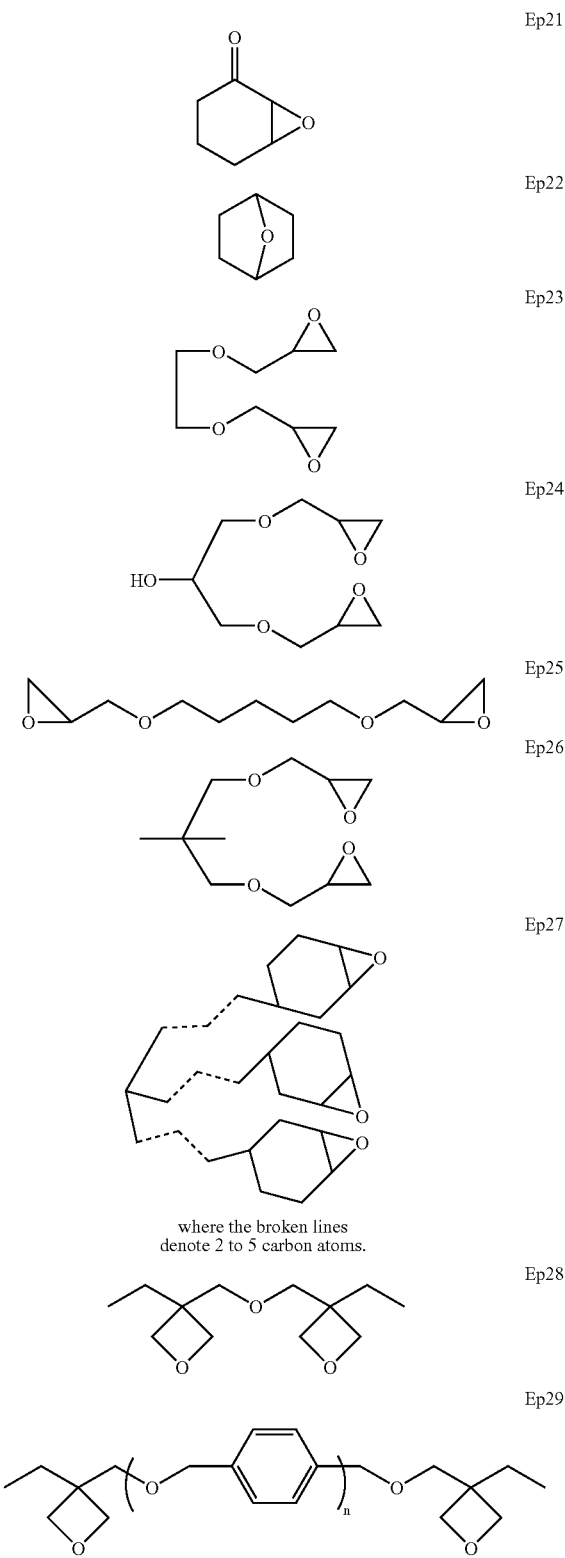

where the broken lines denote 2 to 5 carbon atoms.

-continued

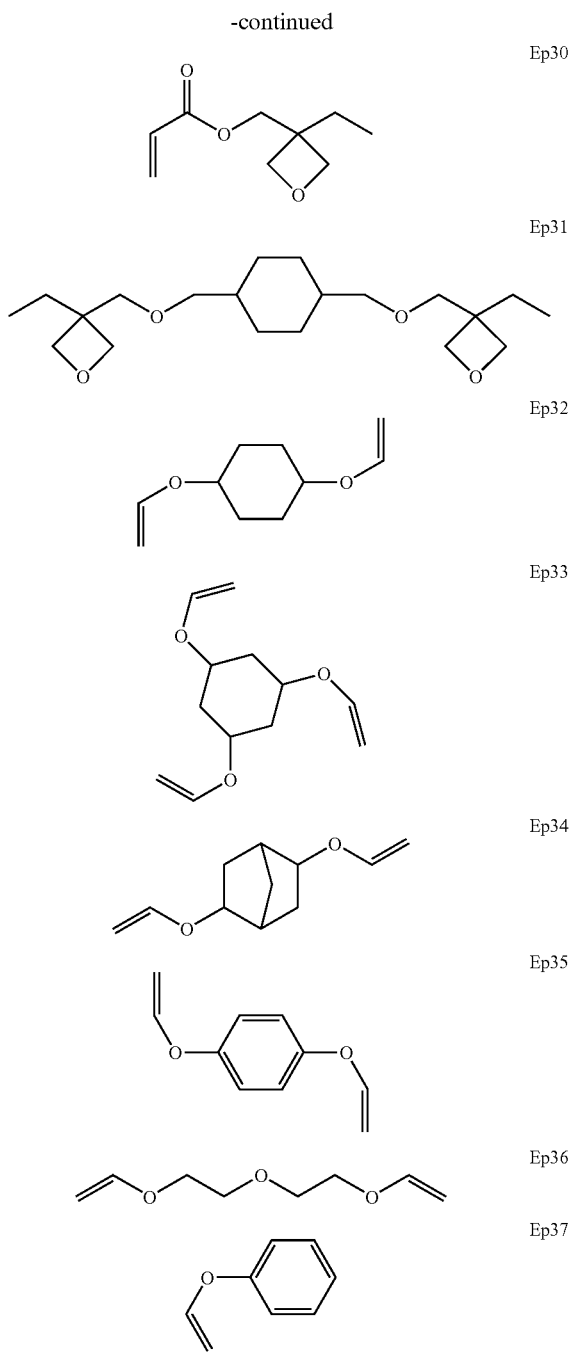
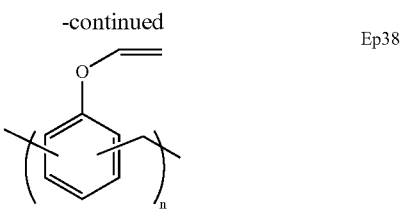

TABLE 4

| Compositions | Compounds (% by weight) | | | Liquid inks |
|---|---|---|---|---|
| aa | Ep21(87.5) | Ep11(12.5) | | (41) |
| ab | Ep22(87.5) | Ep11(12.5) | | (42) |
| ac | Ep3(50) | Ep23(50) | | (43) |
| ad | Ep3(50) | Ep24(50) | | (44) |
| ae | Ep3(90) | Ep27(10) | | (45) |
| af | Ep3(50) | Ep26(50) | | (46) |
| ag | Ep3(40) | Ep25(30) | Ep28(30) | (47) |
| ah | Ep3(35) | Ep28(35) | Ep29(30) | (48) |
| ai | Ep3(40) | Ep30(40) | Ep29(20) | (49) |
| aj | Ep3(40) | Ep28(60) | | (50) |
| ak | Ep3(40) | Ep31(40) | Ep32(30) | (51) |
| al | Ep3(40) | Ep33(40) | Ep34(30) | (52) |
| am | Ep3(40) | Ep32(40) | Ep37(30) | (53) |
| an | Ep3(40) | Ep26(40) | Ep36(30) | (54) |
| ao | Ep3(40) | Ep32(40) | Ep35(30) | (55) |
| ap | Ep3(40) | Ep37(30) | Ep38(30) | (56) |

Added to each of the compositions aa to ap were 5% by weight of carbon black used as a pigment and 8% by weight of UVACURE 1591 used as a photo acid generating agent, and each of the resultant mixtures was subjected to a dispersion treatment for 24 hours by using a paint shaker. The mixtures after the dispersion treatment were filtered by using a PTFE filter of 5 μm so as to obtain liquid inks (41) to (56).

Incidentally, the carbon black was kneaded in advance with an acrylic resin series dispersant so as to prepare a mill base, and the mill base thus prepared was added to the composition together with 200 ppm of a nonionic surfactant manufactured by Sumitomo 3M Inc. and Ajisper (trade name of a dispersant manufactured by Ajinomoto Fine Technology Inc. and available on the market).

In the next step, a performance test was applied to each of liquid inks (41) to (54) by using the ink jet recording apparatus 1 constructed as shown in FIG. 1 or 7. The ordinary lustrous paper sheet was used as the recording medium 2, and an ultra high pressure mercury lamp having an output of 230 W was used as the light source 5.

The pencil hardness of the ink layer and the print quality were measured as the performance of the liquid inks (41) to (56). Table 5 shows the results together with the light exposure amount.

TABLE 5

| | | Pencil hardness | | | | |
|---|---|---|---|---|---|---|
| Liquid ink | light exposure amount (mJ/cm$^2$) | Immediately after light exposure | Container | Left to stand at room temperature | Heat roller | print quality, etc. |
| (41) | 450 | 2B | F | F | F | good |
| (42) | 450 | 2B | F | F | F | good |
| (43) | 500 | 2B | HB | F | F | good |
| (44) | 540 | 2B | B | F | F | good |
| (45) | 450 | 2B | HB | HB | HB | |
| (46) | 350 | B | H | H | H | particularly good |
| (47) | 280 | B | H | H | H | particularly good |

TABLE 5-continued

| Liquid ink | light exposure amount (mJ/cm$^2$) | Pencil hardness | | | | print quality, etc. |
| | | Immediately after light exposure | Container | Left to stand at room temperature | Heat roller | |
|---|---|---|---|---|---|---|
| (48) | 290 | B | H | H | 2H | print exhibited resistance to solvent |
| (49) | 350 | B | H | H | H | print exhibited resistance to solvent |
| (50) | 300 | B | H | H | 2H | print exhibited resistance to solvent |
| (51) | 300 | B | F | F | F | print exhibited resistance to solvent |
| (52) | 290 | B | H | H | H | print exhibited resistance to solvent |
| (53) | 280 | B | H | H | 2H | print exhibited resistance to solvent |
| (54) | 350 | 2B or less | HB | HB | HB | high volatility and blurring |
| (55) | 320 | B | H | H | 2H | print exhibited resistance to solvent |
| (56) | 250 | B | 2H | H | 3H | print exhibited resistance to solvent |

The pencil hardness shown in Table 5 denotes the values measured for the ink layer under the conditions given below.

Immediately after light exposure: Ink layer immediately after the light exposure.

Container: The ink layer formed by using the printer shown in FIG. 7. After the light exposure, the ink layer was held at 80° C. for 3 minutes within the container.

Left to stand at room temperature: After the light exposure, the ink layer was left to stand at room temperature (25° C.) for 8 hours.

Heat roller: After the light exposure, the ink layer was heated by a heat roller heated to 160° C.

In the case of using any of liquid inks (48) to (53), (55) and (56), it was possible to cure the ink layer under a relatively low light exposure rate so as to obtain a sensitivity about 3 to 8 times as high as that in the case of using liquid ink (21). Also, in the case of using any of liquid inks (48) to (53), (55) and (56), the odor was not left on the printing surface, and a resin luster inherent in the photosensitive ink was not observed so as to support a good printing quality.

Particularly, liquid ink (46) containing epoxy compound Ep26 having an alicyclic skeleton and an aliphatic skeleton was found to be high in sensitivity and excellent in the curing performance. Also, a composition containing oxetane or vinyl ether was found to be excellent in general in the curing performance.

The printing was found to be resistant to an alcoholic solvent and to exhibit an increased hardness in the case of using any of liquid inks (48) to (53), (55) and (56) containing oxetane having an aromatic skeleton or a compound having a vinyl ether skeleton.

On the other hand, the ink containing vinyl ether available on the market, which has an aliphatic skeleton and was referred to previously in conjunction with liquid ink (54), was found to be low in its sensitivity and to contain a large amount of volatile components so as to cause the ink image to be blurred.

EXAMPLE I-3

Kneaded was a mixture comprising a Co-γ-Fe$_2$O$_3$ powder pulverized to have a particle diameter of 500 nm, an acrylic dispersion used as a dispersant, an amphoteric resin used as an electrostatic processing agent, and traces of a metal soap, followed by dispersing the kneaded mass in the epoxy compound (Ep2) by using a paint shaker such that kneaded mass was contained in an amount of 5% by weight relative to the epoxy compound (Ep2). Further, PAG5 used as a photo acid generating agent was added in an amount of 8% by weight based on the epoxy compound, and the resultant mixture was filtered by using a PTFE filter of 5 μm so as to obtain a functional ink composition 1.

The functional ink composition thus obtained was spurted onto an absorbing medium, followed by exposing the absorbing medium to light at an exposing rate of 500 mJ/cm$^2$ and subsequently heating the absorbing medium at 100° C. for 3 minutes. As a result, a magnetic pattern was formed on the medium. The magnetic pattern thus formed was scanned with a magnetic head so as to detect signals conforming with the thickness of the image.

Then, a fine powder used as a pigment, which contained a silver paste and a nickel powder, was pulverized further finely by using a sand mill, and a polyester series dispersant was adsorbed on the surface of the finely pulverized powdery particle. A solid powder obtained by condensing the solution was dispersed by using a paint shaker in an amount of 5% by weight based the epoxy compound (Ep1). Further, PAG5 used as a photo acid generating agent was added in an amount of 8% by weight based on the epoxy compound, followed by filtering the resultant mixture by using a PTFE filter of 5 μm so as to obtain a functional ink composition 2.

The functional ink composition thus obtained was spurted on an absorbing medium, followed by exposing the absorbing medium to light at an exposing rate of 700 mJ/cm$^2$. Then, the absorbing medium was heated at 100° C. for 5 minutes, followed by compressing the absorbing medium at 150° C. for 30 seconds. As a result, a conductive pattern was formed on the absorbing medium. The conductive pattern thus formed was measured with a tester so as to detect an electrical conduction along the pattern. The resistance was found to be about 100 mΩ/cm in an image having a width of 100 microns. Similarly, it was possible to form an insulating pattern by using a filler (SiO$_2$) powder.

EXAMPLE I-4

Figure 12:
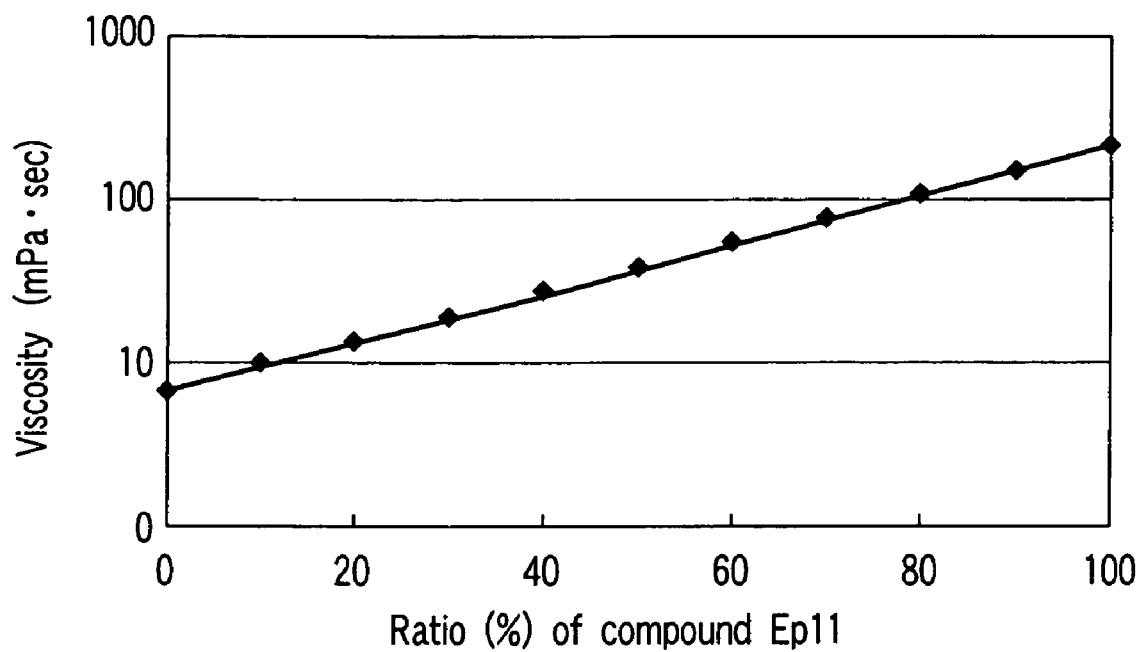
FIG. 12 is a graph showing the relationship between the content of a compound Ep11 and the viscosity.

As shown in Table 1 referred to previously, the epoxy composition b1 contains the epoxy compound Ep3 and the epoxy compound Ep11. FIG. 12 is a graph showing the relationship between the viscosity and the ratio (%) of the epoxy compound Ep11 to the epoxy compound Ep3 in the epoxy composition b1, covering the case where a photo acid generating agent was added in an amount of 8% by weight. In the graph of FIG. 12, the ratio of the epoxy compound Ep11 is plotted on the abscissa, with the viscosity (mPa·sec) being plotted on the ordinate. As apparent from FIG. 12, the relationship noted above is represented by a straight line in the case where the viscosity is plotted by a logarithmic scale. It is also seen that the viscosity is rendered higher than 50 mPa·sec in the case where the addition amount of the epoxy compound Ep3 is smaller than 40% so as to make it impossible to spurt the ink by using a recording head.

It has also been found that formula (1) given below is established in the composition containing the epoxy compound Ep3 and the epoxy compound Ep11, and that the intrinsic viscosity $\eta_t$ falls within a range of between 3 mPa·sec and 30 mPa·sec at room temperature in the case where the ink can be spurted satisfactorily from the recording head:

$$\eta_t = \exp(\chi_1 \cdot \ln(\eta_1) + \chi_2 \cdot \ln(\eta_2) + \chi_3 \cdot \ln(\eta_3) ii. + \ldots + \chi_n \cdot \ln(\eta_n)) \quad (1)$$

Further, the viscosity was measured in scores of points in respect of the combination with any of the epoxy compounds (Ep1) to (Ep9), (Ep10), (Ep11) and (Ep12). In each of these cases, formula (1) given above was found to be established, and the intrinsic viscosity $\eta_t$ was found to fall within a range of between 3 mPa·sec and 30 mPa·sec at room temperature in the case where the ink can be spurted satisfactorily from the recording head.

EXAMPLE I-5

The ratio of the compound (Ep3) to the compound (Ep26) in the composition "af" shown in Table 4 referred to previously was changed, with the result that the viscosity was not higher than 20 mPa·sec in each of these cases. This indicates that formula (1) given above is also established in the composition containing the compound (Ep3) and the compound (Ep26), and that the intrinsic viscosity $\eta_t$ falls within a range of between 3 mPa·sec and 30 mPa·sec at room temperature in the case where the ink can be spurted satisfactorily from the recording head.

Ten kinds of compositions were prepared by changing the ratio of the compound (Ep26). Added to each of the compositions thus prepared were 5% by weight of carbon black used as a pigment and 8% by weight of PAG5 used as a photo acid generating agent, and the resultant composition was subjected to a dispersion treatment for 24 hours by using a paint shaker. The mixture after the dispersion treatment was filtered by using a PTFE filter of 5 μm so as to obtain a liquid ink.

Incidentally, the carbon black was kneaded in advance with an acrylic resin series dispersant so as to prepare a mill base, and the mill base thus prepared was added to the composition together with 200 ppm of a nonionic surfactant manufactured by Sumitomo 3M Inc. and Ajisper (trade name of a dispersant manufactured by Ajinomoto Fine Technology Inc. and available on the market).

A performance test was applied to each liquid ink by using the ink jet recording apparatus constructed as shown in FIG. 8. To be more specific, the pencil hardness and the image quality were measured in respect of the cured image. Table 6 shows the result together with the ratio of the compound (Ep26):

The ordinary lustrous paper sheet was used as the recording medium 2, and a light hammer lamp manufactured by Fusion UV Systems Inc. was used as the light source 5. Also, a microwave heat generating ceramic material was used as a heat generating plate 18. As a result, it has been found that the lustrous paper sheet can be sensitized at a sensitivity of 350 mJ/cm$^2$, which is substantially equal to that for liquid ink (46) in the case of using the ink jet recording apparatus 1 constructed as shown in FIG. 1. It has also been found that the performance can be singularly improved in the case where each of the compound (Ep26) and the compound (Ep3) is contained in an amount of at least 30% by weight, as shown in Table 6. The particular tendency was also observed in the combinations of the compounds (Ep3), (Ep1), (Ep6), (Ep21) and (Ep22) with the compounds (Ep23), (Ep24), (Ep25) and (Ep26).

EXAMPLE I-6

The ratio of the alicyclic compound (Ep3) to the alicyclic compound (Ep28) in the composition "ah" shown in Table 4 was set constant (equivalent), and the ratio of the compounds (Ep3+Ep28) to the compound (Ep29) was changed.

Five kinds of compositions were prepared by changing the ratio of the compound (Ep29). Added to each of the compositions thus prepared were 5% by weight of carbon black used as a pigment and 8% by weight of PAG5 used as a photo acid generating agent, and the resultant composition was subjected to a dispersion treatment for 24 hours by using a paint shaker. The mixture after the dispersion treatment was filtered by using a PTFE filter of 5 μm so as to obtain a liquid ink.

Incidentally, the carbon black was kneaded in advance with an acrylic resin series dispersant so as to prepare a mill base, and the mill base thus prepared was added to the composition together with 0.200 ppm of a nonionic surfactant manufactured by Sumitomo 3M Inc. and Ajisper (trade name of a dispersant manufactured by Ajinomoto Fine Technology Inc. and available on the market).

A performance test was applied to each liquid ink by using the ink jet recording apparatus constructed as shown in FIG. 1. The ordinary lustrous paper sheet was used as the recording medium 2, and the heating after the light exposure step was carried out at 60° C. for 5 minutes within a container. An ultra high pressure mercury lamp having an output of 230 W was used as the light source 5. Table 7 shows the viscosity of the ink, the sensitivity of the cured image, and the sputring performance of the ink in this case together with the ratio of the compound (Ep29). As apparent from Table 7, it has been found that the oxetane-containing ink containing an aromatic oxetane compound in an amount exceeding 40% is inferior in the spurting performance.

TABLE 6

| | Ratio (%) of Ep26 | | | | | | | | | |
| --- | --- | --- | --- | --- | --- | --- | --- | --- | --- | --- |
| | 10 | 20 | 30 | 40 | 50 | 60 | 70 | 80 | 90 | 100 |
| Pencil hardness | F | F | H | H | H | H | F | HB | B | 2B |
| Image | blurring | blurring | good | particularly good | particularly good | particularly good | good | repelling | repelling | repelling |

TABLE 7

| | Ratio (%) of Ep29 | | | | |
|---|---|---|---|---|---|
| | 10 | 20 | 30 | 40 | 50 |
| viscosity (mPa·s) | 12.0 | 16.4 | 22 | 28.7 | 37.8 |

TABLE 7-continued

| | Ratio (%) of Ep29 | | | | |
|---|---|---|---|---|---|
| | 10 | 20 | 30 | 40 | 50 |
| Sensitivity (mJ/cm$^2$) | 390 | 350 | 320 | 300 | 280 |
| Properties and spurting | low in sensitivity | good | particularly good | sight disturbance of image | plugging in spurting and no thermoplasticity so as to make transfer impossible |

It has been confirmed that the relationship represented by formula (1) given previously is established in this case, too, and it has been found that the inherent viscosity $\eta_t$ falls within a range of between 3 mPa·sec and 30 mPa·sec at room temperature in the case where the ink can be spurted satisfactorily from the recording head.

EXAMPLE I-7

The ratio of the compound (Ep3) to the compound (Ep28) in the composition was changed.

Ten kinds of compositions were prepared by changing the ratio of the compound (Ep3). Added to each of the compositions thus prepared were 5% by weight of carbon black used as a pigment and 8% by weight of PAG5 used as a photo acid generating agent, and the resultant composition was subjected to a dispersion treatment for 24 hours by using a paint shaker. The mixture after the dispersion treatment was filtered by using a PTFE filter of 5 μm so as to obtain a liquid ink.

Incidentally, the carbon black was kneaded in advance with an acrylic resin series dispersant so as to prepare a mill base, and the mill base thus prepared was added to the composition together with 200 ppm of a nonionic surfactant manufactured by Sumitomo 3M Inc. and Ajisper (trade name of a dispersant manufactured by Ajinomoto Fine Technology Inc. and available on the market).

A performance test was applied to each liquid ink by using the ink jet recording apparatus constructed as shown in FIG. 1. The ordinary lustrous paper sheet was used as the recording medium 2, and the heating after the light exposure step was carried out at 60° C. for 5 minutes within a container. An ultra high pressure mercury lamp having an output of 230 W was used as the light source 5. Table 8 shows the result in respect of the hardness and the sensitivity of the cured image and the spurting performance together with the ratio of the compound (Ep3).

As apparent from Table 8, it has been found that, if the ratio of the compound (Ep3) exceeds 60% or is not higher than 30%, the resistance to the solvent tends to be lowered and the curing performance tends to be lowered.

TABLE 8

| | Ratio (%) of Ep3 | | | | | | | | | |
|---|---|---|---|---|---|---|---|---|---|---|
| | 10 | 20 | 30 | 40 | 50 | 60 | 70 | 80 | 90 | 100 |
| Pencil hardness | B | B | HB | F | H | H | F | F | F | F(HB) |
| Resistance to solvent | excellent | excellent | excellent | good | good | poor | bad | bad | bad | bad |

Further, scores of samples were tested by changing the mixing ratios of the compounds (Ep3), (Ep28) and (Ep29). It has been found that it is possible to obtain the ink characteristics satisfactory in respect of the resistance to the solvent, the capability of holding good thermal transfer characteristics, the pencil hardness not lower than HB, and the spurting performance in the cases where the aromatic oxetane compound is contained in an amount not larger than 40 parts by weight, where the epoxy compound having an alicyclic skeleton is contained in an amount not larger than 60 parts by weight, where the total addition amount of the compounds having an oxetane skeleton is not smaller than 40 parts by weight, and where the total addition amount of the compound having both of an alicyclic skeleton and an aromatic skeleton is not smaller than 30 parts by weight.

EXAMPLE I-8

Four grams of each of all the ink compositions prepared in the Examples described above was housed in a petri dish having an inner diameter of 5.9 cm and a diameter of 6 cm so as to measure the evaporating rate at the time when the petri dish is heated to 80° C. under the atmospheric pressure. It has been found that the evaporating rate for each of the ink compositions (6), (8), (41), (43), (44), (46) to (53), (55) and (56) was not higher than 0.2 mg/cm$^2$·min. Also, when the ink compositions were heated at 60° C. for 5 minutes after the light exposure step, a prominent odor was not recognized so as to support good properties.

EXAMPLES I-9

Various liquid inks were prepared as in preparation of the liquid ink (46), except that, in the composition "af" shown in Table 4, the addition amount of the photo acid generating agent was changed to 1% by weight, 2% by weight, 4% by weight, 6% by weight and 10% by weight, respectively. The initial viscosity was found to be about 17 mPa/s for each of the liquid inks.

A performance test was applied to each of these liquid inks by using the ink jet recording apparatus 1 constructed as shown in FIG. 1. Table 9 shows the sensitivity and the change in the spurting state after the accelerating test conducted for one week by the heating at 60° C. together with the addition ratio of the photo acid generating agent (net addition amount, % by weight, excluding the solvent):

TABLE 9

| | Addition ratio of acid generating agent | | | | | |
|---|---|---|---|---|---|---|
| | 1 | 2 | 4 | 6 | 8 | 10 |
| Sensitivity (mJ/cm²) | 790 | 400 | 360 | 350 | 350 | 350 |
| Viscosity* (mPa·sec) | 20 | 23 | 29 | 35 | 50 | 83 |
| Spurting capability | good | good | good | good | scarcely possible | impossible |
| Ni corrosion | none | none | traces of corrosion | low corrosion | corroded | high corrosion |

*after storage for one month at 60° C.

As apparent from Table 9, the sensitivity was low under 1% by weight of the concentration of the photo acid generating agent. It is also seen that the viscosity is much increased in the case where the concentration of the photo acid generating agent is increased to reach 10% by weight. Table 9 also shows the corrosion in the case where Ni metal used for forming the pipe or the electrode is dipped in the ink. It has been found that the corrosion is increased if the addition amount of the acid generating agent is not smaller than 8%.

EXAMPLE II

Epoxy compositions a2 to g2 were prepared by mixing the epoxy compositions in accordance with the recipe shown in Table 10. The epoxy compounds used in this Example are equal to those used in Example I described above.

TABLE 10

| Epoxy compositions | Epoxy compounds (% by weight) | | | |
|---|---|---|---|---|
| a2 | Ep3(87.5) | Ep10(12.5) | | |
| b2 | Ep3(50) | Ep26(50) | | |
| c2 | Ep3(60) | Ep29(40) | | |
| d2 | Ep3(40) | Ep28(40) | Ep31(20) | |
| e2 | Ep3(50) | Ep32(25) | Ep33(25) | |
| f2 | Ep3(40) | Ep37(30) | Ep38(30) | |
| g2 | Ep3(40) | Ep26(20) | Ep31(30) | Ep35(10) |

A pigment, a photo acid generating agent, and a viscosity stabilizing agent were added to each of the epoxy compositions a2 to g2 shown in Table 10 in accordance with the recipe shown in Table 11, and the resultant mixture was subjected to a dispersion treatment for 24 hours by using a paint shaker. The mixture after the dispersion treatment was filtered by using a PTFE filter of 5 μm so as to obtain liquid inks (61) to (82).

Incidentally, carbon black, C.I. Pigment Yellow 180, C.I. Pigment Blue 15, and C.I. Pigment Red 123 were used as the black pigment, the yellow pigment, the cyan pigment and the magenta pigment, respectively. Each of these pigments was kneaded in advance with an acrylic resin series dispersant so as to prepare a mill base, the mill base thus prepared was added to the epoxy composition together with 200 ppm of a nonionic surfactant manufactured by Sumitomo 3M Inc. and Ajisper (trade name of a dispersant manufactured by Ajinomoto Fine Technology Inc. and available on the market).

The compounds described previously were used as the photo acid generating agents PAG1 to PAG5. Also, the basic compounds or the basicity-developing compounds represented by general formulas BS1 to BS7 given below were added as a viscosity stabilizing agent in a molar % based on the net amount of the photo acid generating agent, e.g., 8.3 mol % corresponds to about 1% by weight in the combination of BS3 and PAG5.

TABLE 11

| Liquid ink | Epoxy composition | Pigment (% by weight) | Acid generating agent solution (% by weight) | Viscosity stabilizing agent (mol %) |
|---|---|---|---|---|
| 61 | a2 | BL(5%) | PAG5(8%) | BS1(8.3%) |
| 62 | a2 | BL(5%) | PAG5(8%) | BS2(8.3%) |
| 63 | a2 | BL(5%) | PAG5(8%) | BS3(8.3%) |
| 64 | a2 | BL(5%) | PAG5(8%) | BS4(8.3%) |
| 65 | a2 | BL(5%) | PAG5(8%) | BS5(8.3%) |
| 66 | a2 | BL(5%) | PAG5(8%) | BS6(8.3%) |
| 67 | a2 | BL(5%) | PAG5(8%) | BS7(8.3%) |
| 68 | b2 | BL(5%) | PAG5(8%) | BS3(8.3%) |
| 69 | c2 | BL(5%) | PAG5(8%) | BS1(8.3%) |
| 70 | d2 | BL(5%) | PAG5(8%) | BS1(8.3%) |
| 71 | e2 | BL(5%) | PAG5(8%) | BS3(8.3%) |
| 72 | f2 | BL(5%) | PAG5(8%) | BS3(8.3%) |
| 73 | g2 | BL(5%) | PAG5(8%) | BS1(8.3%) |
| 74 | a2 | Y(5%) | PAG5(8%) | BS5(8.3%) |
| 75 | a2 | C(5%) | PAG5(8%) | BS5(8.3%) |
| 76 | a2 | M(5%) | PAG5(8%) | BS5(8.3%) |
| 77 | b2 | BL(5%) | PAG1(8%) | BS7(8.3%) |
| 78 | b2 | BL(5%) | PAG2(8%) | BS7(8.3%) |
| 79 | b2 | BL(5%) | PAG3(8%) | BS7(8.3%) |
| 80 | b2 | BL(5%) | PAG4(8%) | BS7(8.3%) |
| 81 | a2 | — | PAG5(8%) | — |
| 82 | a2 | BL(5%) | PAG5(8%) | — |

BS1

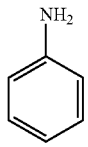
BS2

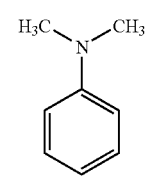
BS3

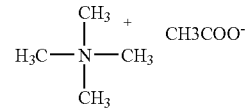
BS4

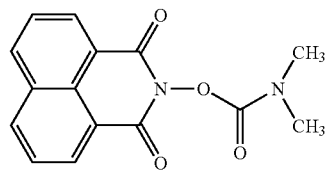
BS5

-continued

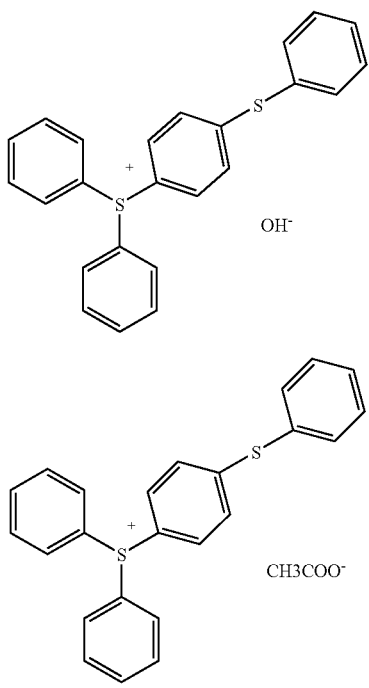

BS6

BS7

Inks in which a pigment or a viscosity stabilizing agent was not mixed were prepared similarly so as to obtain liquid inks (81) and (82).

Table 12 shows the initial viscosity of the ink and the viscosity after the liquid ink was left to stand under room temperature for 6 months for each of all the liquid inks shown in Table 11:

TABLE 12

| Liquid ink | Viscosity (mPa · s) | | Change in other properties |
|---|---|---|---|
| | Initial | After liquid ink was left to stand under room temperature for 6 months | |
| 61 | 19.4 | 23.4 | slightly nonuniform coating |
| 62 | 19.4 | 21.4 | |
| 63 | 19.4 | 19.9 | |
| 64 | 19.4 | 21.3 | |
| 65 | 19.4 | 19.4 | |
| 66 | 19.4 | 21.6 | |
| 67 | 19.4 | 19.8 | |
| 68 | 20.7 | 21.5 | |
| 69 | 24.0 | 24.9 | |
| 70 | 12.6 | 13.0 | |
| 71 | 6.1 | 6.8 | |
| 72 | 7.7 | 7.5 | |
| 73 | 6.1 | 6.8 | |
| 74 | 18.3 | 17.9 | |
| 75 | 20.4 | 21.7 | |
| 76 | 19.8 | 21.2 | |
| 77 | 18.8 | 19.5 | |
| 78 | 17.6 | 18.8 | |
| 79 | 20.2 | 25.5 | |
| 80 | 19.5 | 19.7 | |
| 81 | 14.4 | 33.64 | |
| 82 | 19.3 | 103.1 | nonuniform coating |

As shown in Table 12, the viscosity was markedly increased in each of liquid inks (81) and (82) in which the viscosity stabilizing agent was not mixed. Particularly, the viscosity was singularly increased in liquid ink (82) that contained a carbon black series pigment.

In the next step, a performance comparison test for comparison between the initial performance and the performance 6 months later was applied to each of the liquid inks (61) to (80) and (82) by using the ink jet recording apparatus 1 constructed as shown in FIG. 6. The ordinary lustrous paper sheet was used as the recording medium 2, and an ultra high pressure mercury lamp having an output of 230 W was used the light source 5. Also, the pencil hardness of the ink layer (i.e., the hardness of the ink layer maintained at 80° C. for 3 minutes within a container after the light exposure step), and the printing quality were measured as the performance of each of the liquid inks (61) to (80). Table 13 shows the results together with the light exposure amount:

TABLE 13

| | 80° C. for 3 minutes after light exposure | | 6 months later | | |
|---|---|---|---|---|---|
| Liquid ink | Light exposure amount (mJ/cm²) | Pencil hardness | Light exposure amount (mJ/cm²) | Pencil hardness | Printing quality, etc. |
| 61 | 600 | F | 650 | HB | good |
| 62 | 550 | F | 550 | F | good |
| 63 | 550 | F | 550 | F | good |
| 64 | 530 | F | 530 | F | good |
| 65 | 480 | F | 480 | F | good |
| 66 | 450 | F | 460 | HB | good |
| 67 | 480 | F | 480 | F | good |
| 68 | 390 | H | 390 | H | good |
| 69 | 290 | H | 290 | H | good |
| 70 | 310 | H | 310 | H | good |
| 71 | 280 | 2H | 280 | 2H | good |
| 72 | 320 | H | 320 | H | good |
| 73 | 320 | H | 320 | H | slightly nonuniform |
| 74 | 640 | F | 650 | F | good |
| 75 | 550 | F | 540 | F | good |
| 76 | 520 | F | 550 | F | good |
| 77 | 350 | F | 350 | F | good |
| 78 | 780 | F | 780 | F | good |
| 79 | 800 | F | 800 | F | good |
| 80 | 1000 | F | 1000 | F | good |
| 82 | 450 | F | — | — | incapable of being spurted |

As shown in Table 13, the viscosity of the liquid ink was markedly increased so as to make it impossible to spurt the liquid ink from the recording head. On the other hand, the viscosity was markedly stabilized in the case of each of liquid inks (61) to (80) containing a basic compound or a basicity-developing agent as a viscosity stabilizing agent. Also, in the case of using each of liquid inks (61) to (79), it was possible to cure the ink layer with a relatively small light exposure amount, and the stability of the ink was markedly improved. Further, in the case of using the basic compound of BS6 or BS7 that can be decomposed upon irradiation with light, the sensitivity was particularly high and, thus, the ink was satisfactory.

Also examined was the corrosiveness of the nickel metal used for forming the pipe or the head member in the case of bringing the nickel metal into contact with the liquid ink. The nickel metal was found to be completely free from the corrosiveness. On the other hand, the nickel metal was found to have been corroded slightly when the nickel metal was brought into contact with each of liquid inks (81) and (82) which did not contain the viscosity stabilizing agent, supporting that the viscosity stabilizing agent also performs the function of an anticorrosion agent.

In the next step, prepared were several kinds of additional ink compositions substantially equal in composition to liquid ink (68) except that changed was the addition amount (mol % based on the photo acid generating agent) of the basic compound BS3 used as a viscosity stabilizing agent. The pencil hardness and the increasing rate of the viscosity 6 months later were measured for each of these additional ink compositions. Table 14 shows the results together with the ratio of the compound BS3:

TABLE 14

| | Ratio of BS3 (molar %) | | | | | | | | |
|---|---|---|---|---|---|---|---|---|---|
| | 1 | 2 | 7 | 14 | 28 | 56 | 70 | 75 | 100 |
| Pencil hardness | F(H) | F | F (HB) | HB (F) | B | <2B | — | — | — |
| Viscosity increasing rate | 505 (5 times the initial value) | 34 | 7 | 5 | 3 | 2 | 3 | 1 | 2 |

As shown in Table 14, it has been found that the ink is hardly stabilized in the case of adding the viscosity stabilizing agent in an amount of 1 mol based on the photo acid generating agent. It has also been found that the curing properties of the ink are lowered if the addition amount of the viscosity stabilizing agent exceeds about 28 mol %.

As described above, according to one embodiment of the present invention, there is provided a high performance liquid ink which does not require an organic solvent and which does not necessitate a large scale light exposure system for obtaining a high quality print. Also, according to another embodiment of the present invention, there is provided an ink jet recording apparatus capable of manufacturing a printed material by using a liquid ink.

Additional advantages and modifications will readily occur to those skilled in the art. Therefore, the invention is its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system for printing using an inkjet recording apparatus and a liquid ink forming an ink image on a recording medium, said apparatus comprising:

a transfer member for transferring said recording medium;

an ink jet type recording head arranged above said transfer member, said ink jet type recording head spurting said liquid ink onto said recording medium to form an ink layer on said recording medium;

a light source irradiating said ink layer with light; and a heating member heating the ink layer, wherein said light source emits an infrared ray together with the light and has a reflecting plate reflecting the infrared and/or a transmitting window transmitting the infrared ray, and said heating member includes said light source and said reflecting plate and/or said transmitting window, and wherein said ink comprises a photo acid generating agent that generates an acid upon irradiation with the light, a coloring component, at least one solvent that is polymerized in the presence of the acid, and at least one basic compound and a compound developing a basicity, the solvent containing at least 50 parts by weight of an acid polymenzable compound, said acid polymerizing compound polymerizing in the presence of the acid having an alicyclic skeleton and/or aliphatic skeleton and having a viscosity of 50 mPa·s or less and boiling point of 150° C. or more under room temperature and atmospheric pressure.

2. The system according to claim 1, wherein:

said light source emits light under a high frequency electromagnetic wave;

said apparatus further comprises a generator supplying a high frequency electromagnetic wave to said light source, an electromagnetic shield surrounding the periphery of said light source having an opening formed in at least the surface positioned to face said transfer member, and a heat generating medium arranged on the back surface of said transfer member so as to generate heat upon irradiation with said high frequency electromagnetic wave; and said heating member includes said light source emitting light and an electromagnetic wave simultaneously, said high frequency electromagnetic wave generator, and said heat generating medium.

3. The system according to claim 1, wherein a plurality of the ink jet type recording heads are arranged for spurting a plurality of inks differing from each other in color so as to form a plurality of ink layers having differing colors, and said light irradiation and/or said heating are carried out every time a single ink layer is formed.

4. The system apparatus according to claim 1, wherein the infrared ray emitted from the light source heats the ink layer to at least 60° C.

* * * * *